Figure 11:
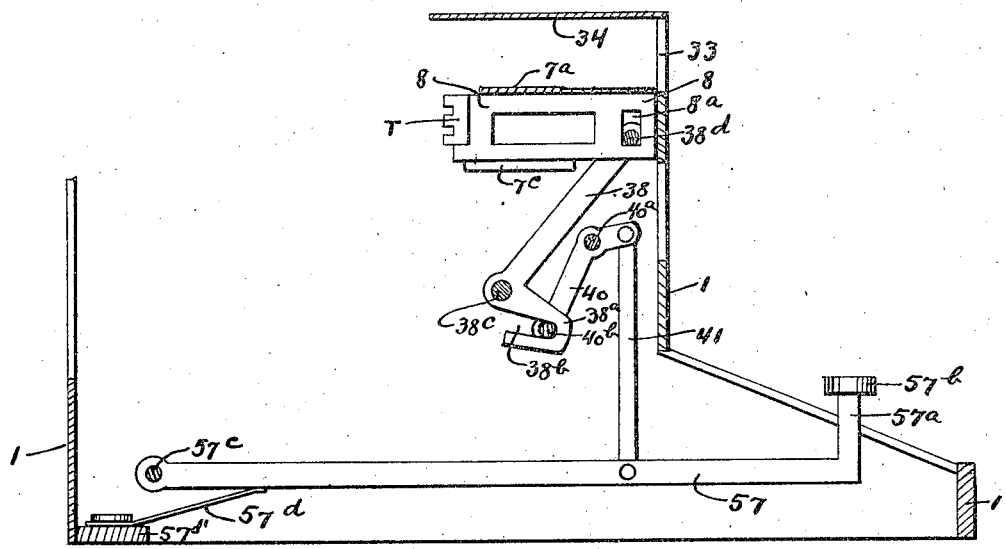

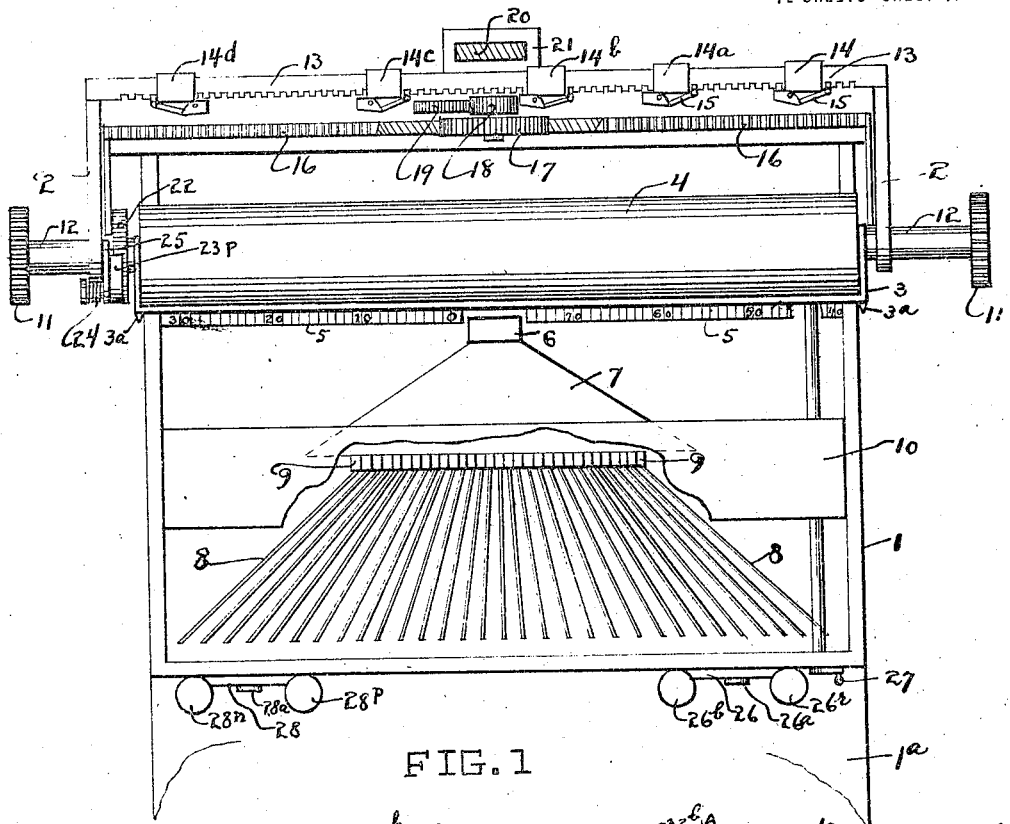
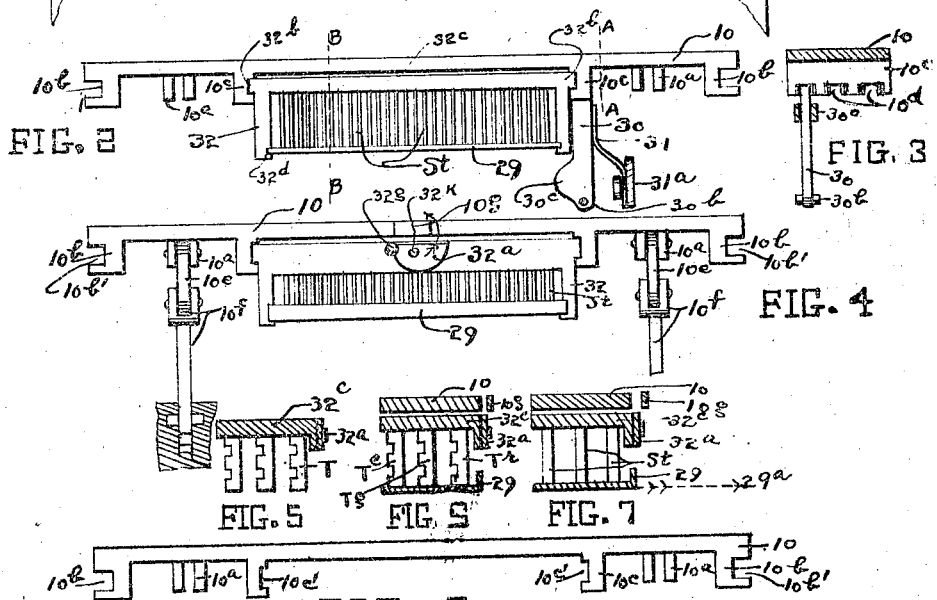

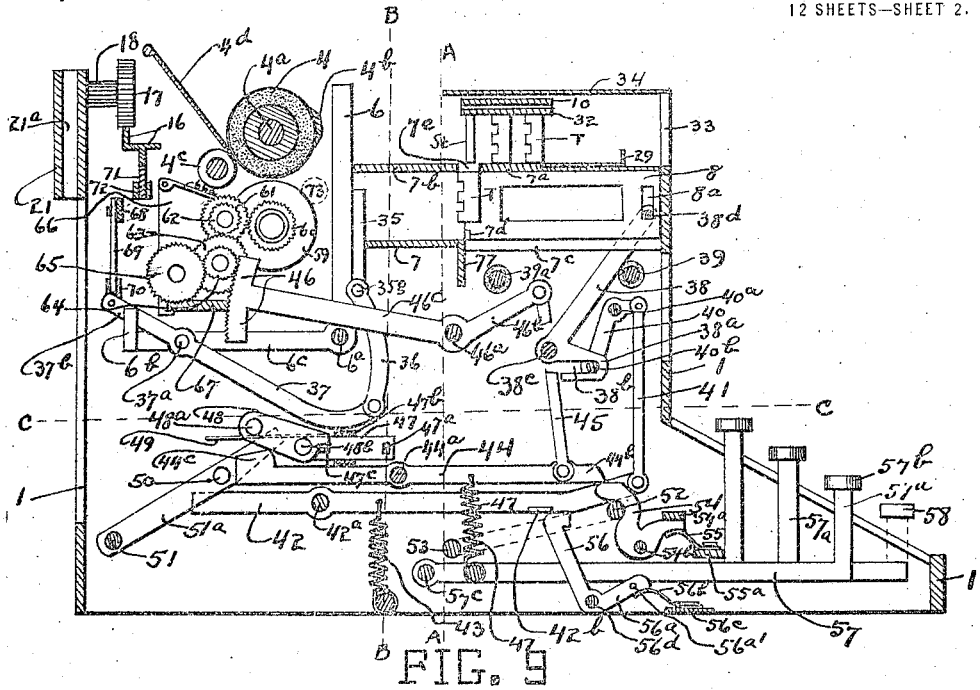
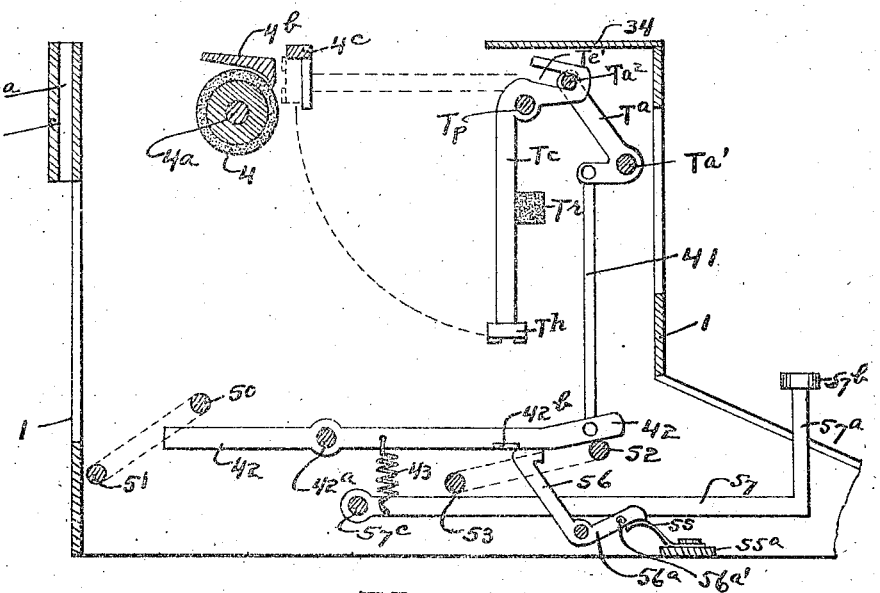

A. BLOCK.
TYPEWRITING MACHINE.
APPLICATION FILED NOV. 13, 1920.
1,417,489.
Patented May 30, 1922.
12 SHEETS—SHEET 4.
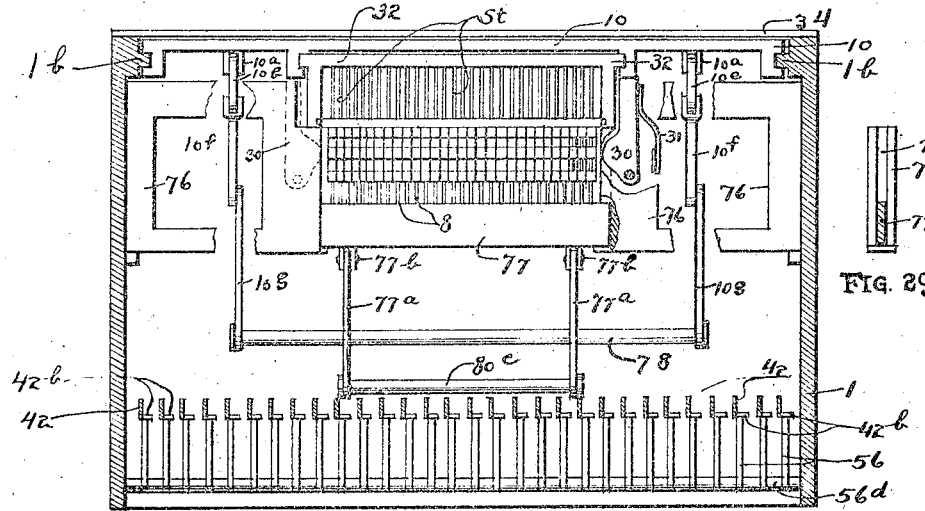
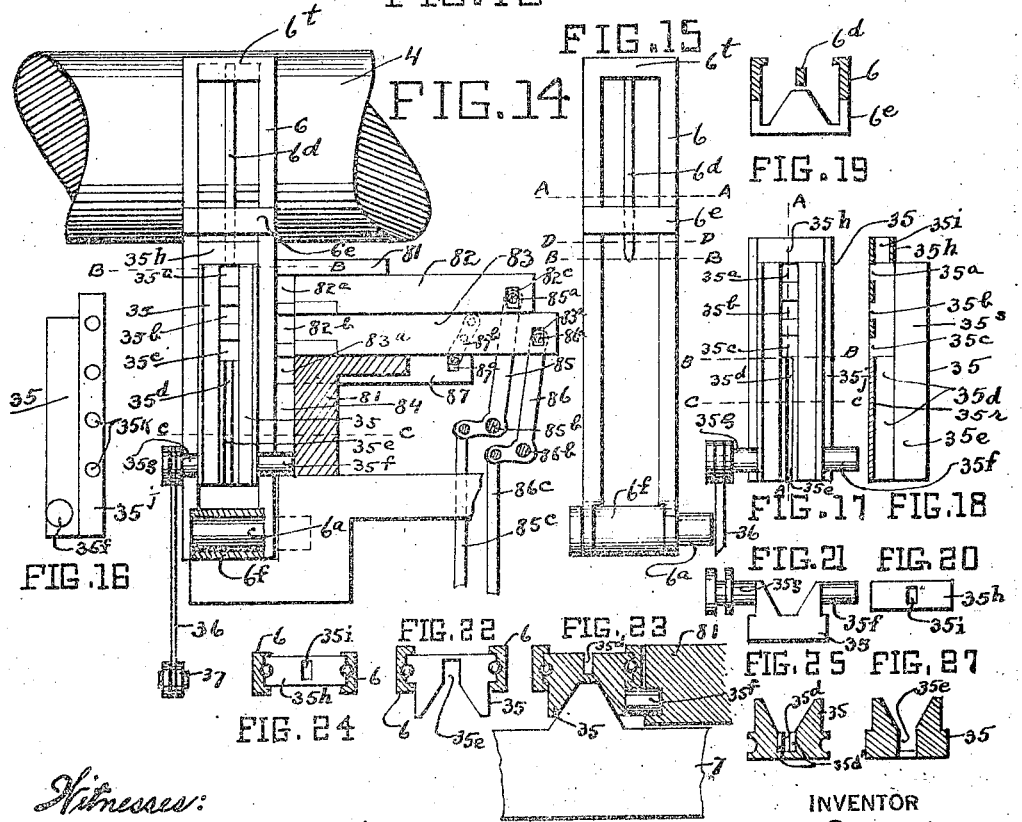

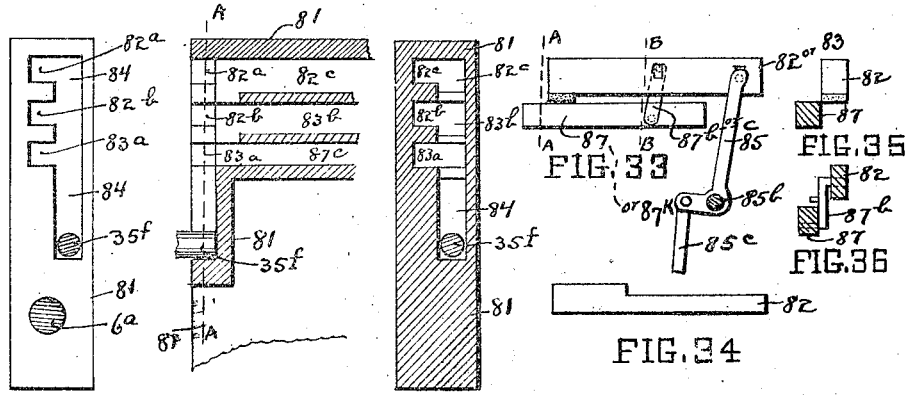
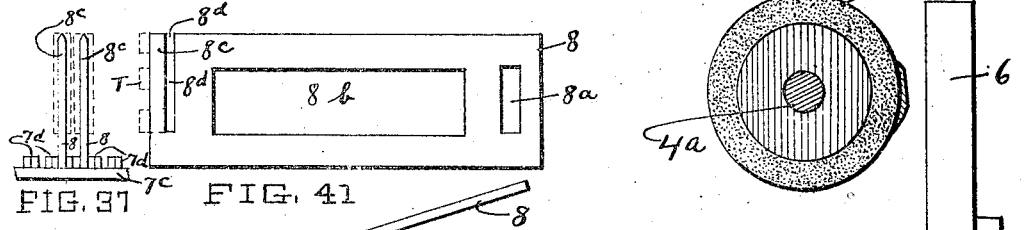
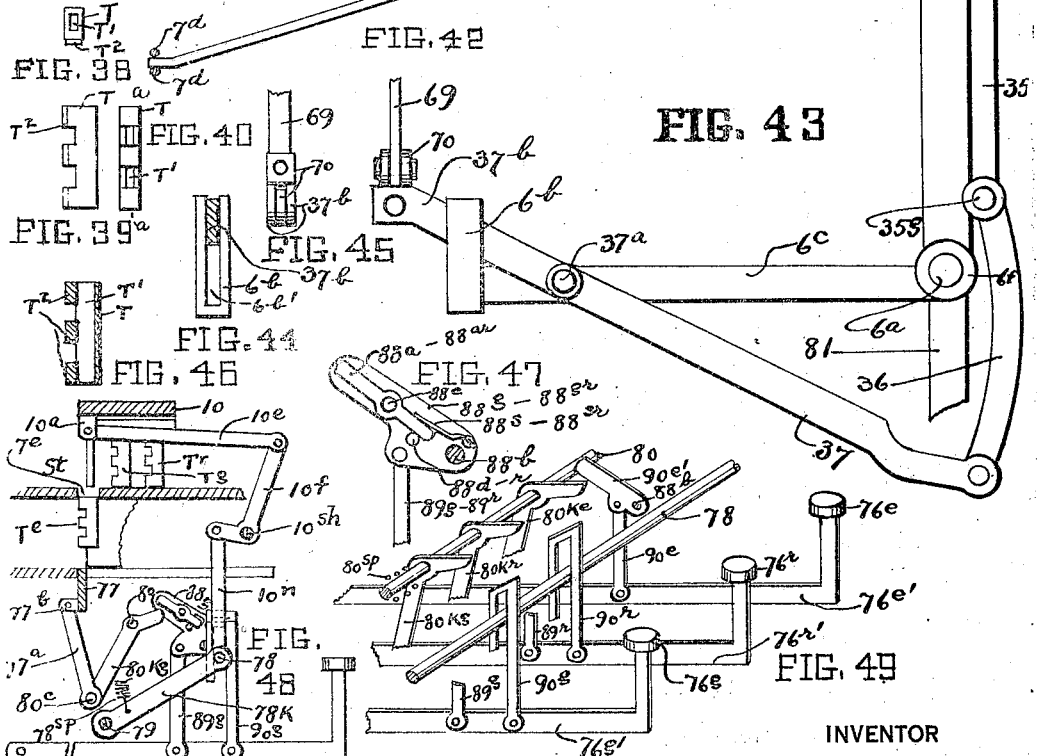

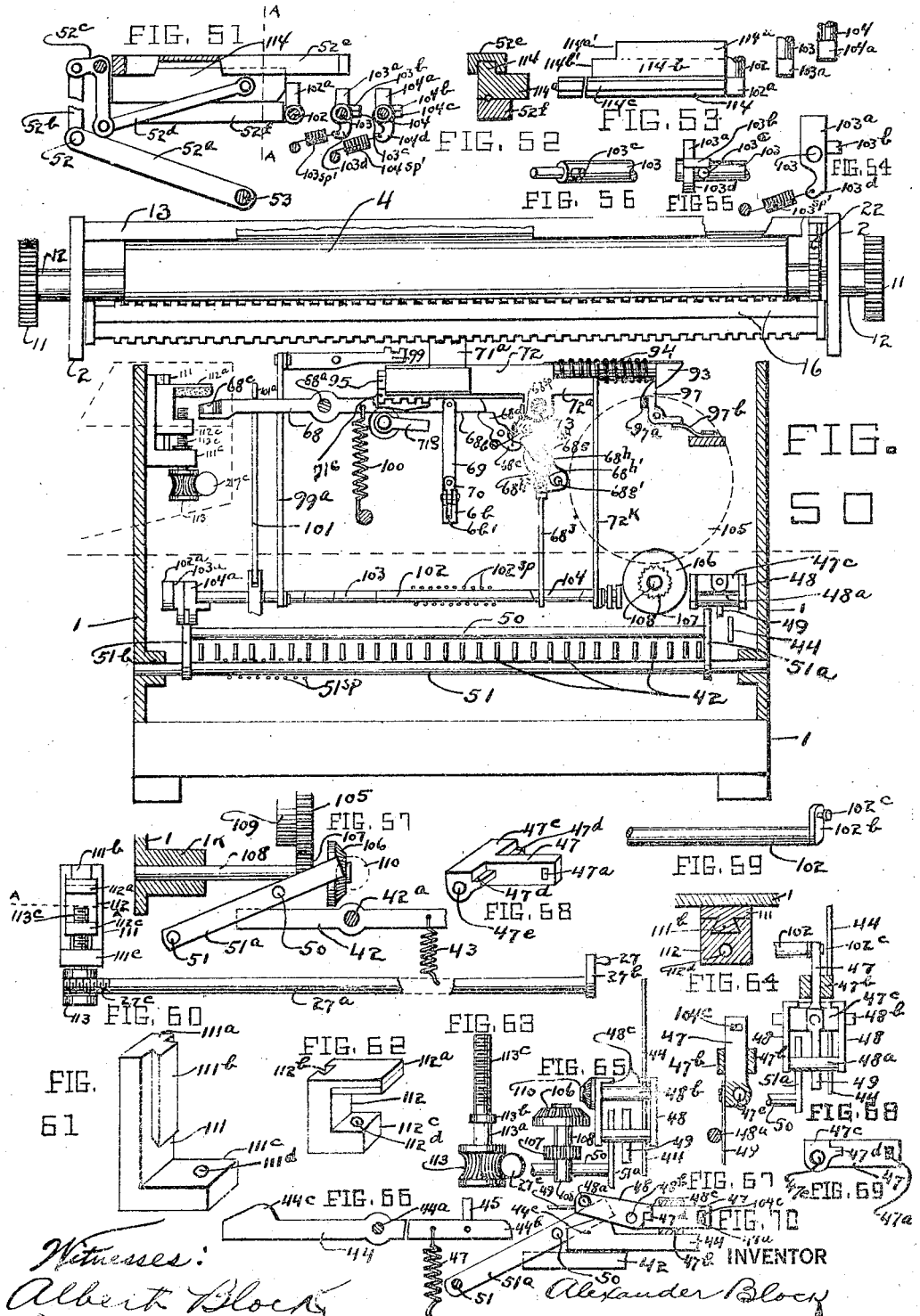

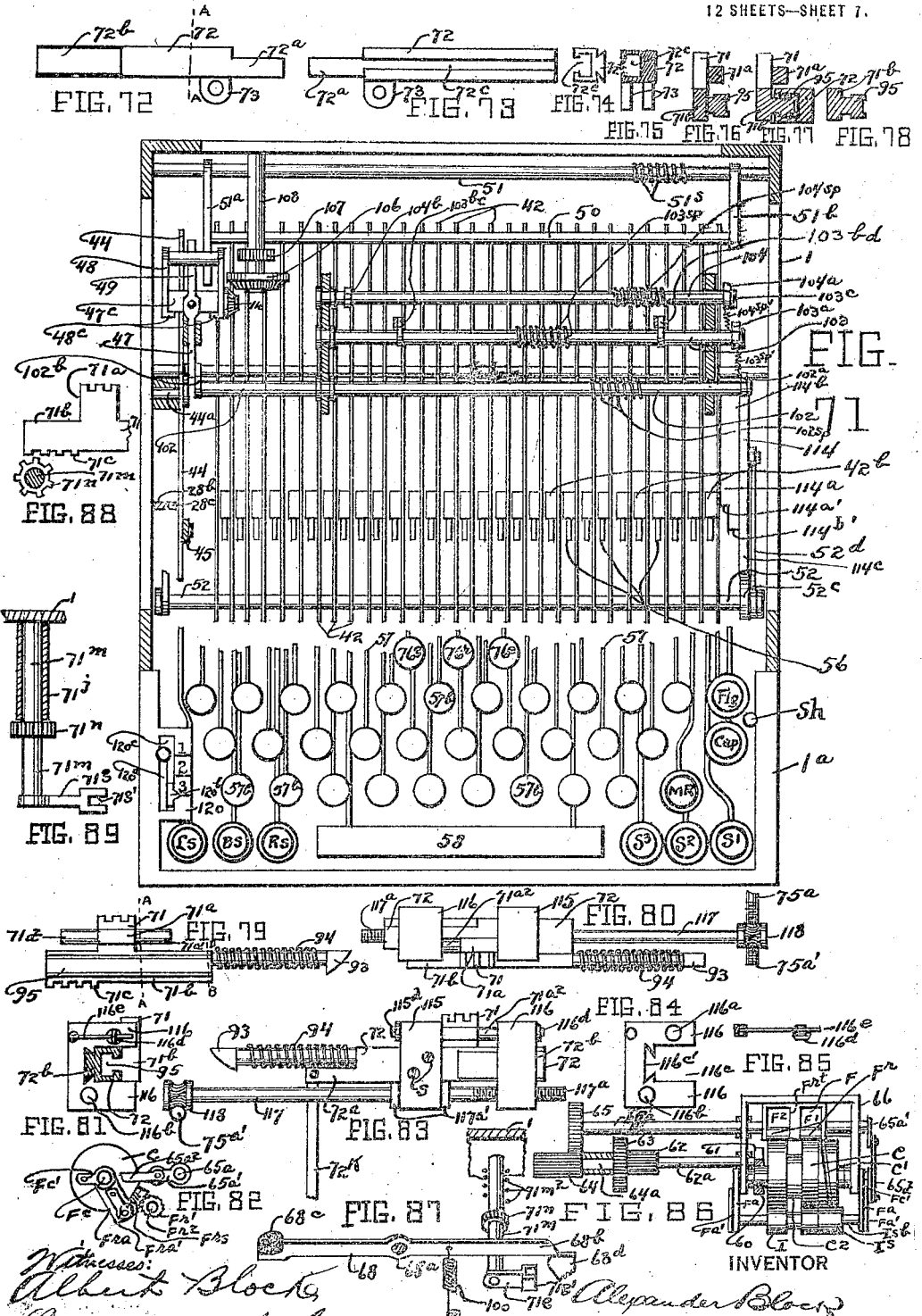

A. BLOCK.
TYPEWRITING MACHINE.
APPLICATION FILED NOV. 13, 1920.
1,417,489.
Patented May 30, 1922.
12 SHEETS—SHEET 8.
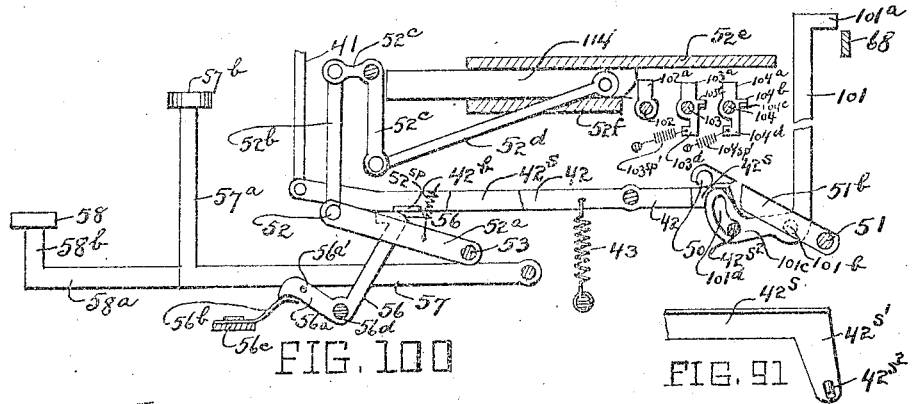
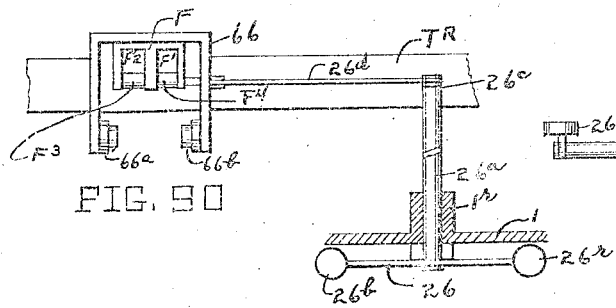
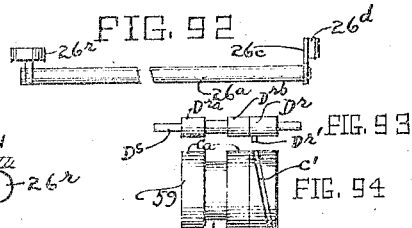
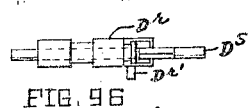
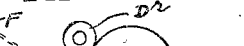
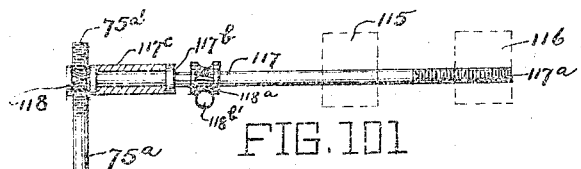
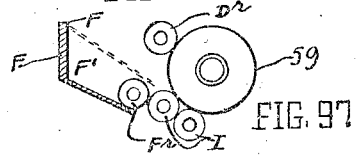
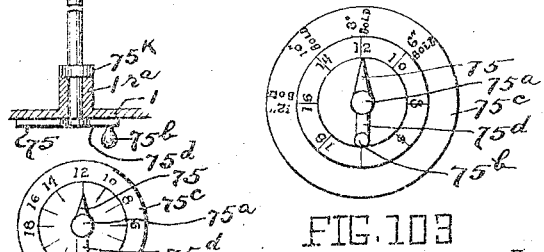
Witnesses:
Albert Block
Aaron Tobias
INVENTOR
Alexander Block

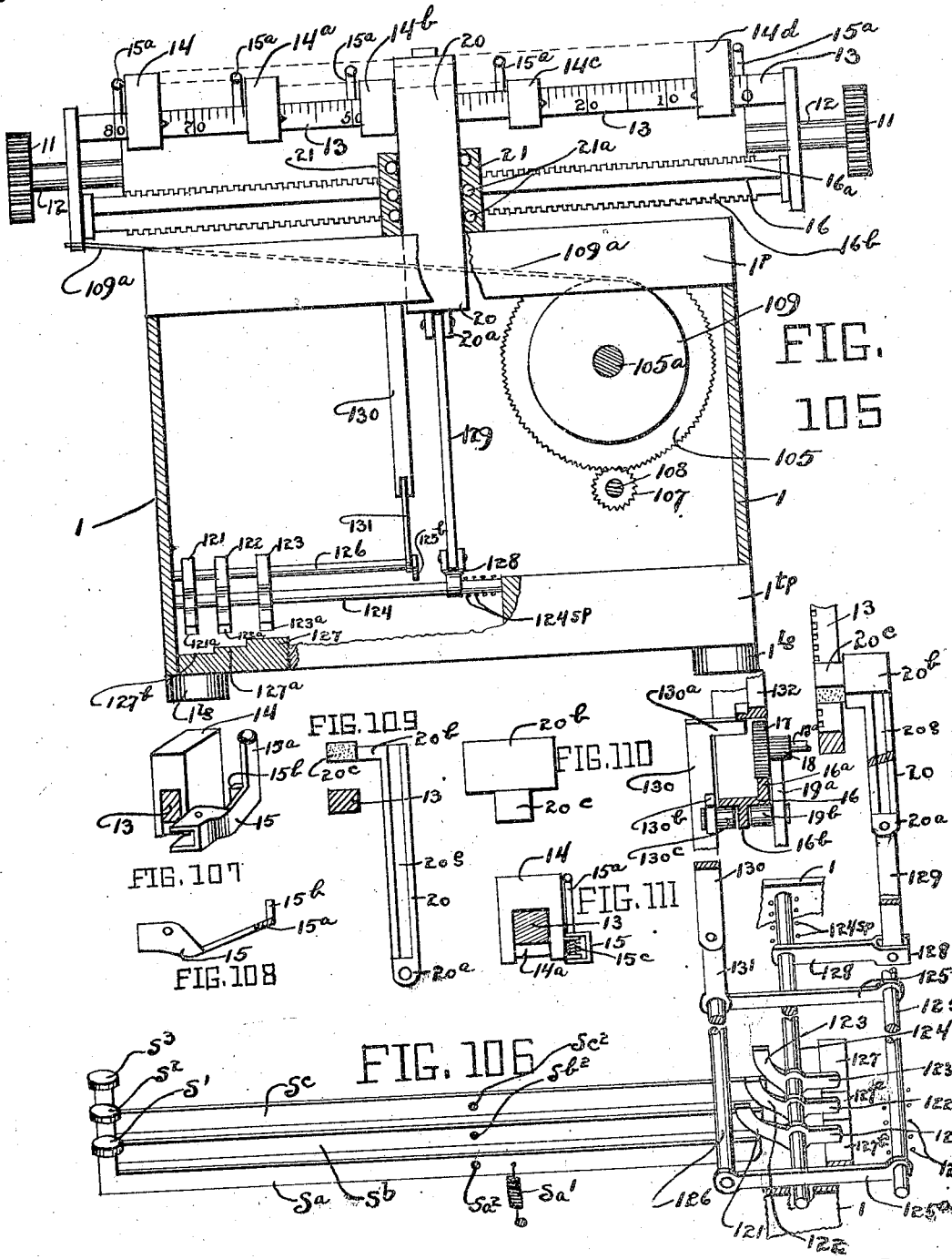

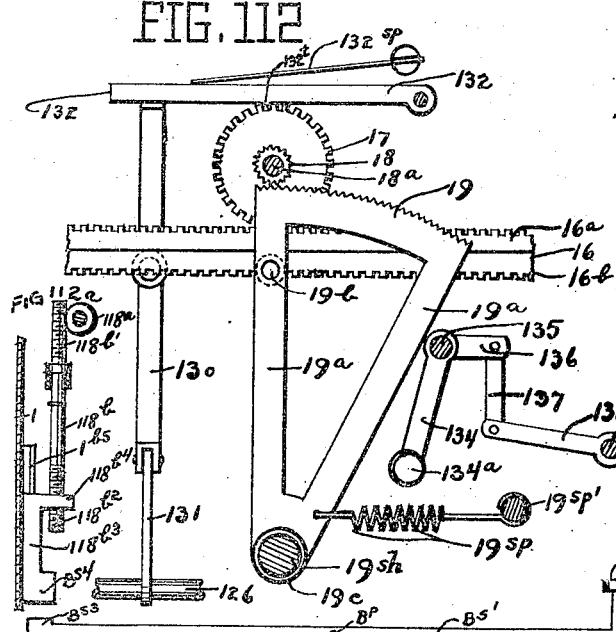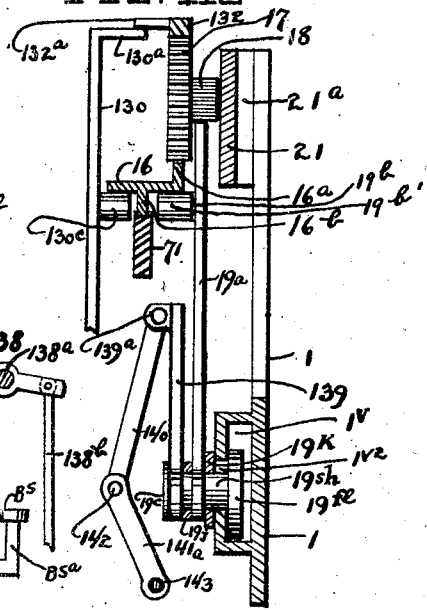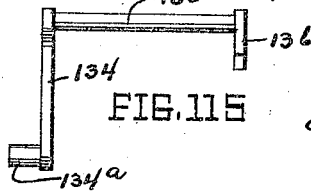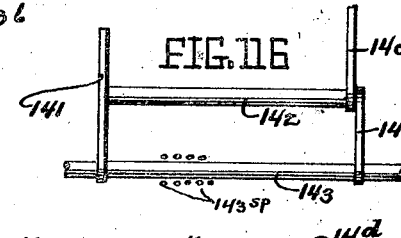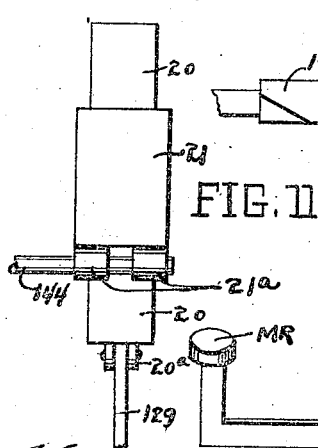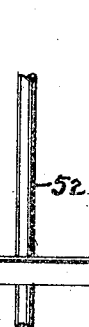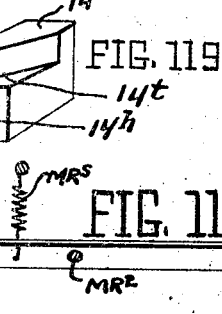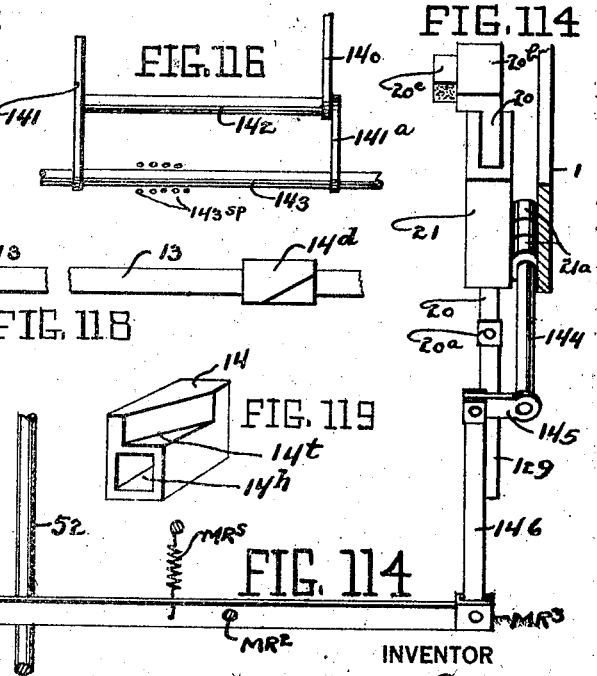

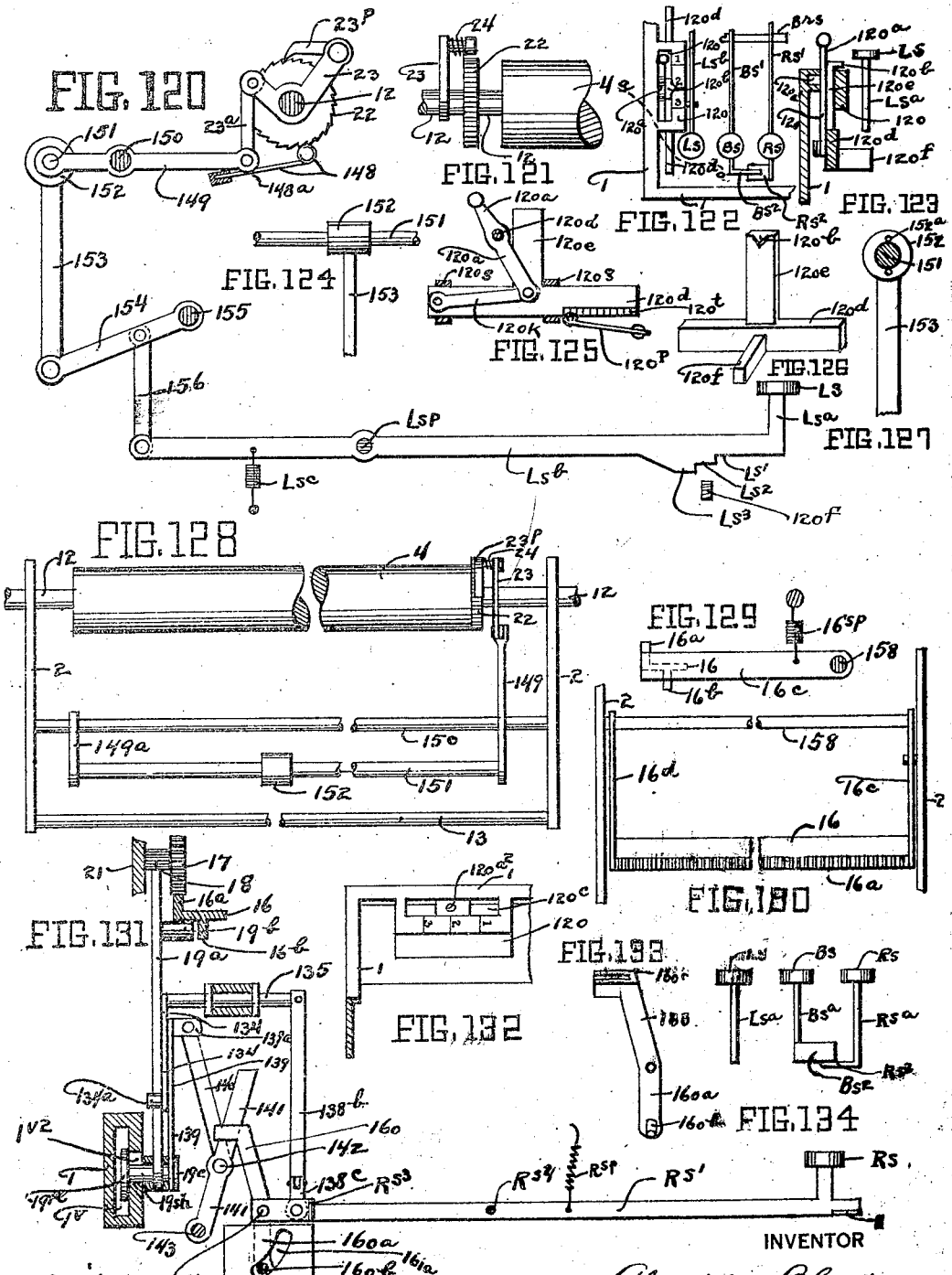

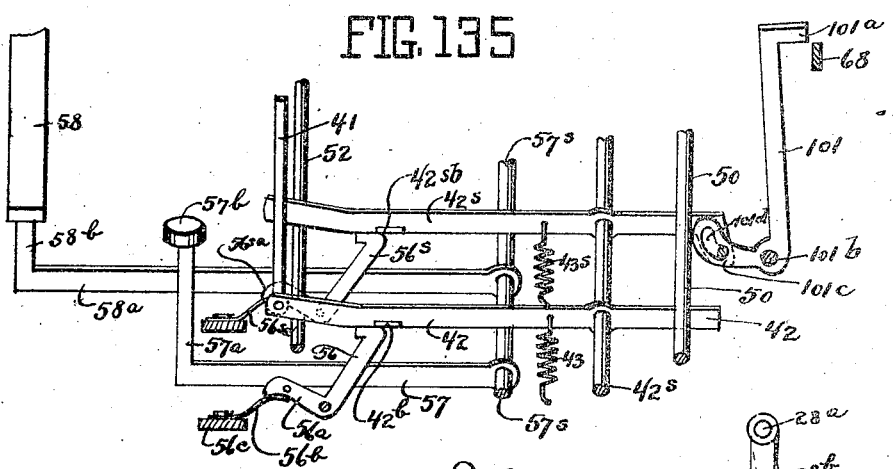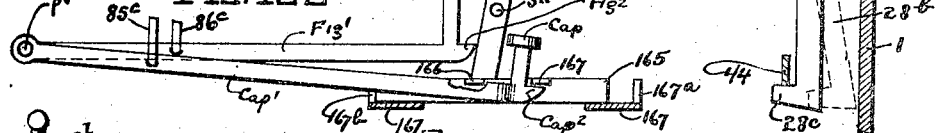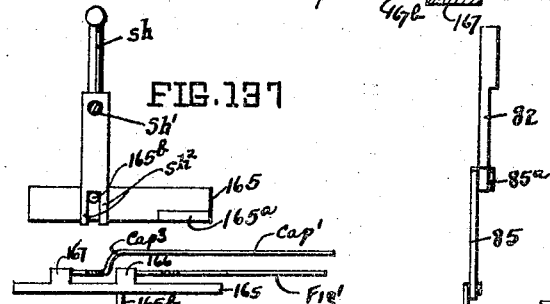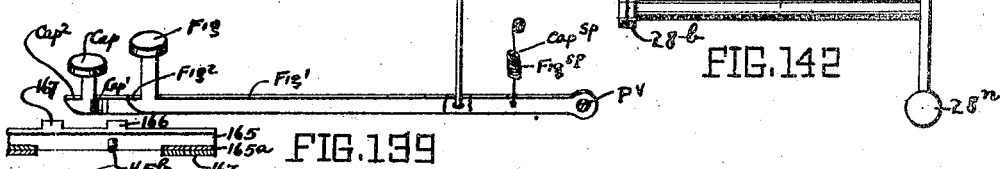

UNITED STATES PATENT OFFICE.

ALEXANDER BLOCK, OF NEW YORK, N. Y.

TYPEWRITING MACHINE.

1,417,489.  Specification of Letters Patent.  Patented May 30, 1922.

Application filed November 13, 1920. Serial No. 423,948.

*To all whom it may concern:*

Be it known that I, ALEXANDER BLOCK, a citizen of the United States, and resident of the city of New York, in the county of New York and State of New York, have invented certain new and useful Improvements in Typewriting Machines; and I do hereby declare the following to be a full, clear, and exact description of the invention, such as will enable others skilled in the art to which it appertains to make and use the same.

The present invention is a typewriting machine. Generically speaking, the object of my invention is to provide the machine fully described herein with a number of improvements such as will give it a varied field of usefulness; the said machine being equally adapted for use in a commerical office, where facility of operation, durability and speed are required; in technical or scientific institutions where in addition to the above characteristics, interchangeability of characters or fonts of types under the immediate control from a keyboard by an operator is a distinct advantage; and in the home, where uniformity of impression and thus beautiful printing is a valuable asset in a typewriting machine possessing the above-mentioned improvements. The present invention embodied in the machine disclosed herein, has for a further object to render the printing operations noiseless, and to dispense with ribbons or pads by providing an improved inking mechanism for inking the types as they successively approach the printing position.

My machine disclosed herein embodies improvements on the machines disclosed in my co-pending applications for typewriting machines, filed respectively on November 5th and 10th, 1919, and January 10th, 1920; the serial numbers of which are 335,857; 336,810 and 350,519 respectively. More particularly, the principal objectives aimed at in said improvements in the present invention are as follows:—

A. Inexpensive power controllable by an operator, for operating the various mechanisms of the machine, and mechanical means independent of said operator for returning said mechanisms to normal rest position. The power operated mechanisms are arranged to cooperate with the automatically operated retracting device to allow of the consecutive repetition of the printing of a certain character without the successive releasing and re-operation of the corresponding key. When an operator desires to print a certain character, he depresses the corresponding key to release the power for operating the mechanisms controlling the printing of said character, and the printing of the character will be consecutively repeated as many times as the operator desires by the operator simply depressing the key and maintaining said key in such condition for a period of time sufficient to allow of the printing the character the required number of times. For the repeated printing of such characters as periods, asterisks, dashes, the above arrangement obviates the necessity for reoperation of the key successively, as this improvement allows of the consecutive printing of an entire line of such characters without lifting the operator's finger from the key until the entire line is printed. This novel construction is conducive to speedy operation of the machine and saves power.

B. Mechanisms for operating the various devices of the machine as controlled from a keyboard are provided with means for rendering the printing operations practically noiseless. This feature is of great advantage in a busy office where a great number of machines are employed.

C. Interchangeable types arranged in fonts in a magazine removably mounted in a carrier, and means controllable from a keyboard which are adapted to return the font of types from the type carriers to said magazine and to instantaneously replace the desired font of characters on said type carriers by shifting said magazine carrier. The said type carriers may then be operated individually to successively deliver the required types into printing position for performing the printing operations. Typewriting machines of this type now in common use carry the interchangeable types on type wheels, and the operation for printing of a certain character necessitates the movement of an entire font of types in order to bring the desired character into printing position. In one type of such machines the entire type wheel with the font of types is operated to perform the printing operation. This requires a maximum of power and a consequent reduction in speed of operation of the machine, which are two important factors to be considered in purchasing a machine for extensive use in a business office. A further objection to these machines is that the entire wheel must be removed and then replaced by another wheel carrying the font of type desired when it is necessary to change from one set of types to another—another element not conducive to speedy operation of such machines. The present invention eliminates all of these drawbacks by providing fonts of types arranged in rows in a magazine arranged to be shifted by a carrier controllable by an operator from a keyboard for the above-mentioned purposes; the interchanging of different fonts of types being accomplished with the same facility as the operation of any of the other keys for printing a certain character.

D. Means controllable by an operator for adjusting the carriage feed mechanism for different size types—preferably controllable from a keyboard or from the front of the machine.

E. A novel device that functions both as an impression mechanism and a universal type-holder to which types are successively delivered by a type feeder from said type carriers, a device being provided for consecutively operating said feeder and said impression mechanism for performing the printing operation—the operation of said mechanism being practically noiseless.

F. An improved device in operative connection with said type feeder and said universal type holder and controllable from a keyboard for delivering upper or middle case characters into printing position. The individual shifting mechanism described herein obviates the necessity for shifting the entire carriage or an entire set of type carriers and the segmental support to allow of the printing of an upper or middle case character. In the present invention each type-head is individually shifted into position in said universal type holder to allow of the printing of either an upper or a middle case character, as required.

G. An improved line spacing mechanism operable from a keyboard with the same facility as the operation of any of the other keys on said keyboard, and mechanism also on said keyboard and preferably adjoining the line spacing key for restricting the operation of said key and thereby the operation of the line space wheel to limit the feed of the platen roll.

H. Novel back spacing mechanism is provided controllable from a keyboard, and comprising a local back spacing key for performing step by step back spacing operations, and a long distance back spacing key for operating mechanism arranged to return the carriage to the initial printing position or to any intermediate point in the reverse carriage movement. It may be noted that in the present invention the carriage movements are entirely controllable from a keyboard, which renders it possible to operate the machine at a much greater rate of speed than the machines now in common use. The line spacing and back spacing keys adjoin each other on the keyboard and may be operated individually when desired or in unison when their combined operations are required, such as line spacing and the return of the carriage to the initial printing position.

I. An improved tabulating mechanism controllable from a keyboard allows of the instantaneous movement of the carriage in the direction of its travel for cooperating with a tabulating mechanism to arrest the movement of the carriage at a point controllable by the corresponding tabulating key. Furthermore, marginal stops are provided for arresting the movement of the carriage in either direction for leaving margins on the paper, and margin release mechanism is provided for moving said tabulating mechanism out of the path of movement of said carriage and the stops thereon, to allow of the continued movement of said carriage beyond said stops, marginal or tabulating stops.

J. A power operated spacing bar is provided controllable from a key board and arranged to move the carriage a step at a time, the above-mentioned automatic means for returning the various mechanisms from operative to inoperative position, being arranged to return said spacing bar from operative to inoperative position, and to repeat the operation of said spacing mechanism for a required number of times upon the continued operation of spacing bar when the operator continues to depress its corresponding bar on the keyboard.

K. An inking mechanism of the type commonly used in printing machines replaces the ink ribbons or pads commonly applied to typewriting machines, and is provided with different colored inks, and means controllable from a keyboard for shifting the mechanism for delivering the desired colored inker into inking position. Power controllable from a keyboard is provided for operating said inking mechanism for inking the types as they are successively approaching the printing position, and a retracting device independent of the operator is adapted to return simultaneously said inker and the other mechanisms of the machine to normal rest position, during the intermittent movement of the carriage.

The above-recited improvements and advantages are shown applied to a machine of the type fully described herein and claimed at the end of the specification, the said machine being an improvement on the machines disclosed in my above-mentioned co-pending applications. Although combined in one coordinate mechanism, it is conceivable that one or more of the above-described improvements may be omitted from the machine disclosed herein, and that the said improvements may be applied to a typewriting machine of a construction other than that shown in the appended drawings and fully defined in the specification and claims. Each or any one of said improvements may be applied to other machines of different construction, or may be omitted from the present disclosed machine without departing from the spirit of the invention. My invention further consists in certain features of construction and combinations and arragements of parts, all of which will be fully set forth herein and particularly pointed out in the claims. It is understood, however, that minor changes in construction may be made without departing from the spirit of the invention, the structures shown in the appended drawing being given only by way of illustration and not by way of limitation. Other objects and advantages will appear in the specification and in the drawing wherein like parts are designated by like characters throughout.

Figure 12:
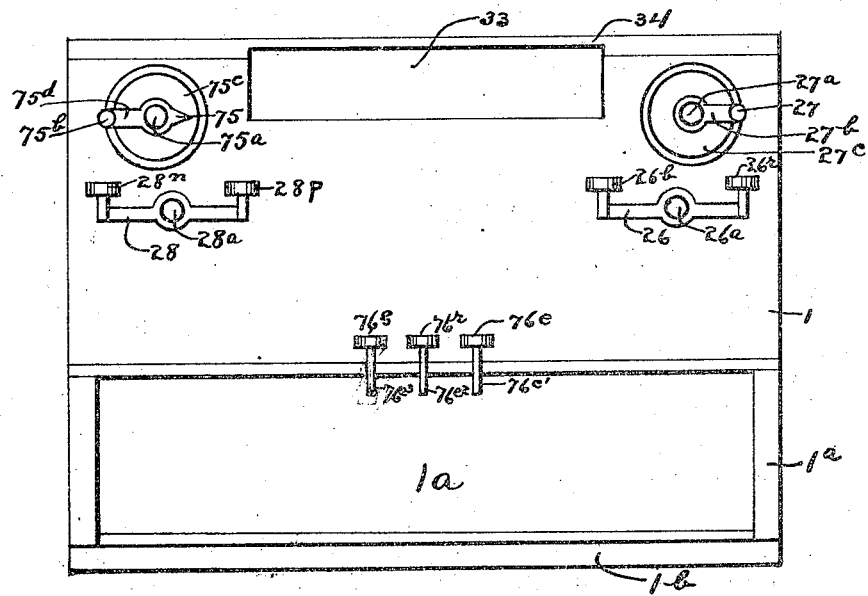

Figure 1, shows a plan view of the machine as seen from above, with some parts omitted and others broken away. Figure 2, shows the type magazine and its carrier. Figure 3, is a cross-section of the type magazine carrier on a line A—A in Figure 2. Figure 4, is a view from the front of said magazine and its carrier, showing part of its operative connections with a keyboard. Figure 5, gives a cross-section of the magazine holding three fonts of types on a line B—B in Figure 2. Figure 6, is a section along the same line and in the same Figure 2 of the magazine carrier and the magazine mounted therein, showing the three fonts of types in said magazine and the sliding cover for preventing said types from falling off the type stems. Figure 7, shows same without the fonts of types on the stems. Figure 8, is an edge view of the type magazine carrier. Figure 9, shows a left side elevation of the machine with parts broken away and other parts omitted. Figure 10, gives a side elevation of the machine disclosed in one of the above-mentioned co-pending applications, showing some of the improvements described in the present invention applied thereto, with some parts omitted and some parts broken away. Figure 11, is another modification of the preferred type of machine shown in Figure 9, parts omitted and parts broken away. Figure 12, shows a front elevation of the machine with parts omitted. Figure 13, gives a vertical section of the machine seen from the rear, on a line A—A in Figure 9. Figure 14, shows a front view of the machine in section on a line B—B in Figure 9, giving a front elevation of the type feeder and the universal impression type holder within which it is movably mounted, part of its actuating means and the device for shifting the type heads for delivering the desired character into printing position. Figure 15, is a front elevation of the impression-universal type holder. Figure 16, is a side elevation of the type feeder. Figure 17 is a front elevation of same. Figure 18, is a longitudinal section of same along a line A—A in Figure 17. Figure 19 is a cross-section of the universal type holder on a line A—A in Figure 15. Figure 20 is an upper edge view of the type feeder. Figure 21 is a view from below of said feeder. Figure 22, is a section of the universal type holder and a view of the feeder on a line B—B in Figure 15. Figure 23, is a view of same in section on a line C—C in Figure 17, and other elements on the same line shown partly in section and partly broken away. Figure 24, shows a section of said universal type holder on a line D—D in Figure 15, and showing an upper edge view of the feeder. Figure 25 is a sectional view of the feeder on a line B—B in Figure 17. Figure 27 is a sectional view of same on a line C—C. Figure 29 is an inner edge view of a support on the machine frame and a cross-section of the type ejector mounted in said support for slidable movement. Figure 30, is a stationary element of the character shifting mechanism. Figure 31 is view of same with parts broken away. Figure 32 is a longitudinal sectional view of same on a line A—A in Figure 31. Figure 33 shows the movable elements and their actuating means, parts broken away, for shifting the type heads to deliver upper or middle case characters into printing position. Figure 34 is an upper edge view of one of the shifting stops. Figure 35 is a view of the elements in Figure 33 on a line A—A. Figure 36 is a view of same on a line B—B. Figure 37 is an inner edge view of two type carriers with the type heads mounted thereon shown in broken lines, and showing the means for guiding the movements of said carriers. Figure 38 shows an upper edge view of a type. Figure 39 is a side elevation of one of the types. Figure 40 shows a front elevation of one of the types. Figure 41 shows a type carrier and a type stem thereon for holding removable type heads. Figure 42 is a lower edge view of same and the pins for guiding the movement of same. Figure 43 shows a side elevation of the universal type holder impression mechanism with its feeder and their actuating means, and their operative relation to the platen roll shown in cross-section. Figure 44, shows a section of the lever for operating said feeder and said type holder impresser consecutively and an edge view of the guide within which it is arranged to move. Figure 45, shows the universal joint connecting said operating lever with a power operated control lever. Figure 46, is a longitudinal sectional view of one of the types on a line *a—a* in Figure 40. Figure 47 is a one-way-trip actuator employed in connection with the mechanisms for shifting the type magazine carrier to interchange fonts of types on the type carriers. Figure 48, shows a side plan view of the said shifting mechanisms with some parts omitted and others broken away. Figure 49 shows the system of keys, bars and levers controlling the shifting operations of said type magazine. Figure 50 shows a rear plan view of the machine with parts broken away and other parts omitted. Figure 51 shows the slide lever in operative connection with the universal bar for operating the various mechanisms of the machine or releasing same and which mechanisms are under the operative control of said universal bar. Figure 52, is a cross-section of same on a line A—A in Figure 51. Figure 53 is an upper plan view of same with parts omitted and parts broken away. Figure 54 is a side elevation of a one-way-trip cam on one of the rocker shafts. Figure 55 shows the same mounted on one of the rocker shafts, broken away. Figure 56 shows one of the rocker shafts partly broken away. Figure 57 shows the retracting mechanisms for the returning of the inking device actuators and the actuators for the other mechanisms of the machine to normal rest position subsequently to the printing operations. Figure 58 is a perspective view of the carrier for the retracting device. Figure 59 is the rocker shaft for actuating said carrier, partly broken away. Figure 60 shows the changeable means for regulating the operative force of the impression mechanism, and controllable from the front of the machine, the shaft broken across. Figure 61 shows the fixed element of said changeable means. Figure 62 shows a slidable member movable on said fixed element. Figure 63 shows a threaded shaft and a worm gear for turning said shaft which is mounted in a threaded bearing in said slidable member of said changeable means for adjusting said slidable member and a stop thereon for limiting the movement of the power operated control lever for regulating the impressing force of the types in performing the printing operations. Figure 64 is a cross-section of said changeable device on a line A—A in Figure 60. Figure 65, is view from above of the retracting device and its actuating means. Figure 66, shows the operating lever for the inking mechanism and the spring for actuating same. Figure 67 shows the retracting device in section with its carrier. Figure 68 shows the retracting device mounted on its carrier. Figure 69 is a side elevation of the carrier. Figure 70 shows the retracting device pivoted on the carrier in operative association with the devices for retracting the various mechanisms of the machine from operative to inoperative position. Figure 71 is a horizontal sectional view of the machine on a line C—C in Figure 9. Figure 72 is an escapement bar actuator. Figure 73 is a view from the other side of same. Figure 74 is an inner edge view of same. Figure 75 is a sectional view of said actuator on a line A—A in Figure 72. Figure 76 is a sectional view of the escapement bar on a line A—A in Figure 79. Figure 77 is a sectional view of same on same line mounted in said actuator. Figure 78 is a section of the escapement bar on a line B—B in Figure 79. Figure 79 shows the escapement bar with its ratchets and the actuating spring. Figure 80 shows the carriage feed mechanism from above and the stops associated therewith, one of which stops is adjustable for regulating the distance between said stops from a keyboard or from the front of the machine for different size types. Figure 81 is a sectional view of said mechanism giving a side view of one of said stops. Figure 82 is a side view of the inking mechanism. Figure 83 shows a side elevation of the carriage feed mechanism and the stops thereon and their operative connection with means for adjustment for different size type controllable by an operator. Figure 84 is a side view of one of the stops. Figure 85 shows one of the valves for rendering the carriage movements during the printing operations practically noiseless. Figure 86 is a view from above of the inking mechanism and its operating means. Figure 87 shows the power operated control lever for actuating the universal type holder and its feeder, in operative association with a device for returning said lever to normal rest position subsequently to the printing operation. Figure 88 shows a sectional view of said retracting device in operative association with the escapement bar partly broken away. Figure 89 is a view from above of the retracting arm for returning said power operated control lever and the means for actuating same. Figure 90 shows the inking mechanism from above with parts omitted and the means controllable from a keyboard for shifting said mechanism a distance to deliver the inker carrying the desired colored ink into inking position. Figure 91 shows the inner extremity of the power operated step by step spacing lever controllable from a keyboard by a spacing bar. Figure 92 is a side view of the device for shifting said inking mechanism broken across. Figure 93 is one of the members of said inking mechanism. Figure 94 is the distributing cylinder of said mechanism. Figure 95 shows a pair of inkers having different colored inks. Figure 96 shows an inker or distributer roll. Figure 97 is a side view of said inking mechanism partly in section. Figure 98 is a similar view of a modified type of same. Figure 99 is a shaft upon which the inker distributer roll is mounted. Figure 100 is a right side view of the mechanism controlling the step by step spacing movement of the carriage, and the mechanisms controllable from a keyboard for operating the different mechanisms of the machine and returning same to normal rest position subsequently to the printing operations. Figure 101 shows a top view of the adjusting means for different size types controllable from the front of the machine. Figures 102 and 103 are views of dials positioned at the front of the machine and hand means for operating the said adjusting means. Figure 104 is an upper view of the escapement bar and the stops showing the manner in which the operations of moving the carriage a step at a time are rendered noiseless. Figure 105 is a rear view of the machine showing the tabulating mechanism with parts omitted and other parts of the machine broken away. Figure 106 is a perspective of the mechanisms for actuating the tabulating mechanisms from a keyboard with parts omitted and other parts broken across and showing part of the back-spacing—local and long distance—mechanism. Figure 107 shows one of the tabulating or marginal stops in perspective. Figure 108 is an upper view of the detent of same with a part broken away. Figure 109 is a side elevation of the tabulating device and a cross-section of the tabular bar. Figure 110 is a top view of said tabulating device. Figure 111 is another view of one of the stops on said bar shown in cross-section. Figure 112 shows the mechanism controllable from a keyboard for performing local and long distance back spacing operations and also part of the means associated with the tabulating device. Fig. 112ª shows the back space lever and its adjusting device. Figure 113 is an edge view of said mechanisms. Figure 114 shows the margin release system controllable from a keyboard. Figure 115 shows the mechanism for operating the back-spacing rack. Figure 116 shows means in operative connection with a keyboard for moving said rack into engagement with the back spacing wheel. Figure 117 is a rear view of the tabulating device and its actuating frame within which it is movable mounted and part of the means for moving said frame and the tabulating device out of the paths of movement of the carriage and the stops on the tabulating rack. Figure 118 shows the tabulating rack with parts broken off and the two marginal stops thereon showing bevelled edges to allow of the returning of the carriage and prevent the arrest of its reverse movement by said tabulating device. Figure 119 shows a perspective of one of said marginal stops with a bevelled edge. Figure 120 shows a side elevation of the line spacing mechanism controllable from a keyboard. Figure 121 shows the line spacing wheel and its actuating means mounted on the platen roll axle and a portion of said platen roll. Figure 122 is a section of the keyboard, showing the line spacing, local and long distance back spacing keys and parts of their key levers, and a device for limiting the feed of the platen roll when said line spacing key is operated. Figure 123 is a sectional view of said section of the keyboard on a line a—a in Figure 122. Figure 124 shows part of the means controlled from the line spacing key for operating the line spacing mechanism. Figure 125 shows the device for limiting the movement of the line spacing key in its operative direction to restrict the feed of the platen roll. Figure 126 shows said device with its actuating means omitted. Figure 127 is another view of the means shown in Figure 124 with the actuator bar in cross-section. Figure 128 is a top plan view of the carriage with parts omitted and other parts broken across, showing the means controllable from a keyboard—with parts broken across for operating the line spacing mechanism. Figure 129 is a side elevation of the double carriage rack, showing the arm for moving said rack out of and into engagement with the carriage feed mechanism or with the back spacing-tabulating wheel. Figure 130 is an upper view of said rack and its actuating means partly broken across. Figure 131 shows the means controllable from a keyboard for performing the local and long distance back spacing operations. Figure 132 shows a section of the keyboard wherein the device for restricting the operative movement of the line spacing key is mounted. Figure 133 is one of the operating elements of the back spacing mechanism. Figure 134 shows the line spacing key, the local back spacing key and the long distance back spacing key, and the means by which the local back spacing key actuates the long distance key for performing step by step back spacing operations. Figure 135 shows a power operated spacing device in the direction of travel of the carriage for imparting a step by step movement thereto, said device being controllable by a spacing bar from a keyboard, and power means also controllable from said keyboard for operating the mechanisms of the machine. Figure 136 shows the shift keys and their levers for respectively delivering upper or middle case characters into printing position, and a shift lock in association with said keys. Figure 137 shows part of said shift locking device. Figure 138 is an upper edge view of parts of said shift key levers with the keys broken off, and part of the shift locking device. Figure 139 is same and their operative connections with the shift stops. Figure 140 shows a section of the machine and the mechanism for throwing the inking device out of operation at the will of the operator. Figure 141 shows same device controllable from a keyboard and its operative association with the power-operated lever for operating the inking mechanism. Figure 142 is an upper view of same showing the keys for actuating the stop lever to move said lever into or out of the path of movement of said power operated operating lever.

I will now proceed to give a detailed description of the various mechanisms of the machine, and fully describe their manner of operation:—

A.

*Inexpensive power controllable from a keyboard for operating the various mechanisms of the machine.*

The machine frame 1 is of the usual or any suitable construction, comprising corner post or standards, a front portion for a keyboard, and a rear portion upon which a traveling element or carriage 2 is mounted, a top plate 34 that may be movably mounted on said machine frame 1, and supports on said machine frame for attachment of the various mechanisms of the machine. Taking the preferred type of machine embodying my invention as shown in Figure 9, $57^b$ designates a key; $57^a$ designates a key stem; 57 is a key lever pivotally mounted on a shaft $57^c$. A main operating lever 42 is pivotally mounted at $42^a$, and embraces two free extremities, one of which is in operative connection with the various mechanisms of the machine and which it is adapted to actuate when the lever is released by means controllable from a keyboard, and the other of which is adapted to cooperate with retracting means for the returning of said main operating lever from operative to inoperative position. A spring 43 normally held under tension tends to move said main operating lever away from its normal rest position and into a position for operating all of the mechanisms or releasing same. Said main operating lever, is however, normally maintained in retracted rest position by means of a detent or latch 56 against the action of its spring 43; a projection $42^b$ on said lever 42 cooperating with said detent 56 for maintaining the lever 42 in said retracted rest position. The detent 56 normally maintains both main lever 42 and the key lever 57 in their normal rest positions, embracing an arm 56 for supporting lever 42 and another arm $56^a$ for supporting key lever 57 in their respective rest positions. Said detent is pivoted at $56^d$ and includes a stud $56^{a1}$ in arm 56 which is in operative connection with key lever 57; a spring $56^b$ tending to maintain the detent in normal rest position and thus the key lever and the main operating lever in their normal rest positions. To the end that when key $57^b$ is depressed, detent 56 is actuated against the action of its spring $56^b$, and the said detent moving out of engagement with projection $42^b$ of lever 42, the said lever 42 is released and spring 43 being normally held under tension, operates said lever 42 and thus the various mechanisms of the machine for performing the printing operations. Subsequently to said operations, an automatic retracting device coacts with said lever 42 for the returning of said lever to normal rest position against the action of its spring 43. When the finger key is released, spring $56^b$ forces the detent 56 to return to normal rest position to allow of the re-engagement of lever 42 with said detent, stud $56^{a1}$ bearing up against key lever 57 and returns said key lever to normal rest position and maintains said lever in such position. It may be noted that 42 designates a plurality of power operated levers, and 57 designates a plurality of key levers, one key lever for each power operated lever, and 56 designates a plurality of detents, one for each set of key and power levers, and tends to maintain in normal rest position one key and one power operated lever at the same time. Each of said key levers is adapted to release its corresponding power operated lever 42 to allow its spring 43 to operate said lever 42. Each of said power operated levers is in operative connection with a corresponding type carrier which it is arranged to actuate when it is released by said manually operated means.

A lever 40 pivoted at $40^a$ is operably connected with said power operated lever 42 by means of a link 41 pivoted by one end to lever 42 and by its other end to lever 40. A bell lever 38 is pivoted at $38^c$ and is provided with a slotted arm $38^a$, $38^b$ designating said slot. A stud $40^b$ in said lever 40 is arranged to be taken into slot $38^b$ of said lever 38. A plurality of type carriers 8 are in operative connection with a plurality of said levers 38 which are adapted to move said type carriers successively toward and away from a common position; each type carrier having a corresponding bell lever 38. Said type carrier 8 embraces a central slot $8^b$ and a slot $8^a$ near its anterior extremity within which is received a stud $38^d$ in bell lever 38. Upon a type stem $8^c$ on the inner end of each type carrier is held a detachable type head 7 delivered thereto from a magazine 32 and removable therefrom to said magazine by an ejector 77 controllable from a keyboard. Guides 7, $7^a$, $7^b$ and $7^c$ guide the movement of said type carriers toward and away from their operative positions and tend to prevent displacement of the typehead from the type stems $8^c$ during said movements. To the end that when a key $57^b$ is depressed, key lever 57 releases power operated lever 42 and its spring 43 operates said lever 42, and through link 41 operates lever 40 which in turn forces bell lever 38 to move type carrier 8 into operative position; stops 39 and 39$^a$ being provided for restricting the movement of lever 38 and thus the type carrier 8 toward and away from operative position.

A rocker shaft 53 runs transversely across the machine frame and is journaled therein. Arms 52$^a$ and 52$^{a1}$ are keyed to said shaft, one near each extremity thereof, said arms being joined at their outer free ends by a universal bar 52 which is positioned directly under the anterior extremities of levers 42 and is arranged to be operated successively by each of said levers when they are released by depressing their corresponding finger key. A bell crank lever 52$^c$ is pivoted on the machine frame 1 or on a support thereon and is operably connected to universal bar 52 by means of a link 52$^b$, one end of which is pivoted to said universal bar and the other end of which is pivoted to said bell lever 52$^c$. A link 52$^d$ is also pivoted by one end to said bell lever 52$^c$ and by its other end to a slidable lever 114 which is mounted for slidable movement between guides 52$^e$ and 52$^f$, wherein anti-friction means may be provided. The inner extremity of lever 114 is rounded to form a cam surface and is adapted to actuate cam 102$^a$ and thus to rock shaft 102 upon which it is mounted, and then one way trip actuator 103$^a$ and thereby rock shaft 103, and finally to actuate one way trip actuator 104$^a$ and thus to rock shaft 104 upon which it is mounted.

Said slidable lever 114 is divided into three segments of different lengths;—an outer segment 114$^c$, a shorter middle segment 114$^b$ and a still shorter inner segment 114$^e$. During its movement inward during the operations of the mechanisms of the machine as controlled from a keyboard, said lever 114 causes segment 114$^c$ to actuate cam 102$^a$, shorter segment 114$^b$ to actuate one way trip actuator 103$^a$, and the shortest inner segment to actuate one way trip actuator 104$^a$. Each of said segments of lever 114 controls the operation of its corresponding cam or one way trip actuator. Rocker shaft 102 is journaled in support on the machine frame, and is maintained in normal position of rest by a spring 102$^{sp}$. Near one of its extremities shaft 102 has said cam 102$^a$ thereon, and upon the other end of said shaft is mounted another cam 102$^b$ which is loosely connected by means of a stud and guide 102$^c$ with a carrier 47, upon which is pivotally mounted a retracting mechanism 48 for the returning of the various mechanisms from operative to inoperative position. The said carrier 47 embraces a member mounted for slidable movement in guides 47$^b$ and having a slot 47$^a$ for affording loose operative connection of said carrier with said rocker shaft 102 through cam 102$^b$ and its stud 102$^c$, and another member 47$^c$ arranged substantially vertical or at an angle to said member 47, said member 47$^c$ being provided with a ledge 47$^d$ and a cylindrical bearing or recess 47$^e$ and within which is mounted a shaft 48$^b$. Upon said shaft 48$^b$ are mounted arms 48 of the retracting device and a toothed wheel 110 which is adapted to actuate said shaft. At their attached extremities said arms 48 terminate in hooks or stops 48$^c$ which normally abut on ledge 47$^d$ on carrier 47 for restricting the reverse movement of the retracting device. The free ends of said arms 48 are connected by a retracting bar 48$^a$, and a spring 49 attached to member 47$^c$ of carrier 47 bears up on retracting bar 48$^a$ and tends to maintain the retracting device in normal rest position with its stops 48$^c$ abutting on ledge 47$^d$ of said carrier. Upon a shaft 108 journaled in a bearing in the machine frame is mounted a toothed wheel 107 which is adapted to operate said shaft, and a toothed wheel 106, preferably bevelled, is also mounted on said shaft 108, and is arranged to be operated by said shaft when said shaft is operated by wheel 107. Wheel 110, mounted on shaft 48$^b$, is arranged to be operated by wheel 106, and is normally disengaged therefrom, being delivered into engagement therewith during the operations of the mechanisms of the machine as controlled from a keyboard. Retracting bar 48$^a$ is normally maintained by spring 49 in a position directly overhanging the inner free extremity of power operated lever 44 which is arranged to operate the inking mechanism, and an arm 51$^b$ controlling the operation of universal retracting bar 50. A rocker shaft 51 is journaled in the machine frame, running transversely across said frame, and has arms 51$^a$ and 51$^b$ mounted thereon, one near each end of said shaft; said arms being joined near their free ends by universal retracting bar 50 which is arranged to cooperate with each and any one of the power operated levers 42 for the returning of said levers to normal rest position subsequently to the printing operations, and during the intermittent movements of the carriage, when the main spring wheel 109 causes the carriage to move a step at a time and forces toothed wheel 105 associated with said spring wheel 109 to operate wheel 107, and thus shaft 108 and beveled wheel 106, for actuating wheel 110 and thus the retracting device 48$^a$, which is forced to bear down on lever 44 and arm 51$^a$ and thus respectively cooperate with said structures for simultaneously returning said lever 44 to normal rest position, and to cause universal retracting bar 50 to cooperate with lever 42 for the returning of said lever to normal rest position. A spring 51$^s$ tends to maintain said universal retracting bar in normal rest position overhanging levers 42.

A rocker shaft 103 is journaled in supports on the machine frame and is maintained in normal rest position by a spring 103$^{sp}$. Upon its outer extremity is mounted one way trip actuator 103$^a$; said actuator having a stop 103$^b$ and a projection 103$^d$ to which is attached a spring 103$^{sp1}$. Said actuator 103$^a$ is not keyed to shaft 103 but is movably mounted thereon and is normally maintained in operative position on said shaft with its stop 103$^b$ abutting on a stud or ledge 103$^c$ in said shaft 103, by means of said spring 103$^{sp1}$ acting upon the said projection 103$^d$. To the end that in one direction said one way trip actuator tends to operate shaft 103 against the action of spring 103$^{sp}$, and in the reverse direction, the said actuator 103$^a$ is adapted to be itself actuated against the action of its spring 103$^{sp1}$ while the said shaft 103 is maintained in its normal rest position. To said shaft 103 are keyed a cam or arm 103$^{bc}$ and another cam or arm 103$^{bd}$. To said cam 103$^{bd}$ is pivotally attached a link 99$^a$, the other end of which link is pivoted to an escapement pawl 99 which is engageable with and normally disengaged from carriage rack 16. To cam or arm 103$^{bc}$ is pivotally attached one end of a link 68$^j$, the other end of which is pivoted to a carrier 68$^g$ which is pivotally attached at 68$^{g1}$. Upon said carrier is movably mounted a one way trip actuator having an arm 68$^h$ whose movement in one direction is restricted by a stud 68$^{h2}$ and in the opposite direction it is movable against the action of a spring 68$^{h1}$—both the said stud and spring being attached to said carrier 68$^g$; said one way trip actuator having another arm 68$^{h4}$ which is preferably bifurcated and normally overlaps and is in loose operative connection with a detent or latch 68$^d$ which is maintained in normal rest position by a spring 68$^{sp}$—its movement away from normal rest position being restricted by a stop 68$^f$. An impression control lever 68 is pivotally mounted on the machine frame or upon a support thereof at 68$^a$, and has two free extremities; one of said extremities 68$^b$ cooperates with said detent 68$^d$ for maintaining said lever 68 in its normal rest position, and the other extremity 68$^c$ is provided with a stud or any type of stop made preferably of fibre or rubber which stop is arranged to cooperate with changeable means provided for that purpose for restricting the movement of said impression control lever 68 in its operative direction. A spring 100 is or may be attached to said lever 68 and tends to move said lever away from its normal rest position; said spring being normally held under tension, lever 68 being maintained in its retracted position by detent 68$^d$ against the action of said spring 100. A link 69 is pivoted by one end to impression control lever 68, and by its other end it is pivotally connected with means in operative connection with devices for feeding types and subsequently performing the printing operation. This system of mechanisms will be described in detail further on. The changeable means will also be explained in detail below.

A mechanical device is provided for returning impression control lever 68 from operative position to normal position against the action of its spring 100, subsequently to the printing operations. The said retracting device embraces preferably a retracting arm or cam 71$^g$ keyed to a shaft 71$^m$ journaled in the machine frame 1 or upon a support thereon. The said retracting arm 71$^g$ has preferably a bifurcated free extremity 71$^{g1}$ which is adopted to maintain retracting arm 71$^g$ in operative engagement with impression control lever 68 during the retracting operations. A gear wheel 71$^n$ is keyed to said shaft and is adapted to operate said shaft and thereby said retracting arm 71$^g$ for performing the retracting operations. Said gear wheel 71$^n$ is arranged to be operated by a carriage escapement mechanism subsequently to the printing operations, to force said retracting arm 71$^g$ to return lever 68 to normal rest position. A spring 71$^{m2}$ tends to return the retracting arm 71$^g$ from operative to inoperative position and to maintain it in such position.

The carriage feed mechanism comprises the said escapement lever or pawl 99 and escapement mechanism embracing an escapement bar 71 and an actuating frame therefor 72; said escapement bar being mounted in said frame and adapted for slidable movement therein. The said escapement bar 71 has a spring bearing portion carrying a spring 94 and a slidable portion 71$^b$; said spring bearing portion terminating preferably in a tooth rounded to form a cam surface and which is adapted to cooperate with a detent 97 for maintaining the escapement bar in normal rest position against the action of said spring 94 which is normally held under tension. The said slidable member 71$^b$ of said escapement bar 71 is further provided with an escapement ratchet 71$^a$ which meshes with and is normally in engagement with the carriage rack 16, and another ratchet 71$^c$ which normally occupies a position directly overhanging gear wheel 71$^n$ which is adapted to operate retracting device 71$^g$; the said ratchet 71$^c$ being engageable with and normally disengaged from said gear wheel 71$^n$, with which it is arranged to instantly engage upon the disengagement of ratchet 71$^a$ from carriage rack 16 by means controllable from a keyboard.

The said actuating frame 72 is or may be provided on one of its faces with a guide projection and on the opposite face with a guide groove or slot. Within said guide groove 72$^c$ is mounted a projection 95 on the slidable member 71$^b$ of escapement bar 71; said projection 95 being adapted for slidable movement within said slot 72$^c$ and having means coacting with means on the actuator 72 for preventing displacement of said projection from said slot in a lateral direction, and which guide the movement of said escapement bar longitudinally toward and away from its operative position. Antifriction means, such as balls or wheels, may be provided to facilitate the movements of said escapement bar. A stop 116 is mounted upon guide projection 72$^b$ on actuating frame 72, and is adapted for slidable movement thereon. Another stop 115 is fixedly mounted on frame actuator 72; the said movable stop 116 being normally maintained at a certain distance from said fixed stop 115 to allow of the movement of the escapement bar a distance equal to the distance between said stops. Said distance is adjustable by means controllable by an operator, for different size types, to allow of the movement of the carriage during the printing operations, a larger or smaller step at a time, corresponding with the size of the type that may then be in use. These stops 115 and 116 will be more fully described under another heading, dealing with the noiseless features of the machine and the mechanisms for adjusting the stops for different size types. Said actuating frame 72 is preferably pivotally mounted on the machine frame or upon a support thereon, and is provided with an actuating projection, 72$^a$, the free end of which is pivotally attached to one end of a link 72$^k$, the other end of which link is pivotally attached to an arm or cam 104$^b$ upon rocker shaft 104; said rocker shaft being maintained in its normal rest position by a spring 104$^{sp}$, and has mounted upon its outer extremity the said one way trip actuator 104$^c$, of a construction and function similar to that of one way trip actuator 103$^a$. Actuator 104$^a$ is provided with a stop projection 104$^b$, an actuating projection 104$^d$, and a spring 104$^{sp1}$ attached to said projection 104$^d$ and tending to maintain the one way trip actuator 104$^a$ in normal position with its stop projection 104$^b$ abutting on a stud or ledge 104$^c$ in rocker shaft 104. The said actuator 104$^a$ being adapted to operate said rocker shaft 104 against the action of spring 104$^{sp}$, and to be itself actuated against the action of its own spring 104$^{sp1}$ during the return movement of said lever 114. The objects of the construction and arrangement of parts recited above are as follows:

When a key 57$^b$ is depressed, its corresponding key lever 57 actuates its corresponding detent 56 for releasing the corresponding power operated lever 42 to allow its spring 43 to impel the said lever 42 in a direction to operate the various mechanisms of the machine,—as follows: Through link 41 and levers 40 and 38, the said lever 42 operates the type carrier 8 and moves it into operative position; and simultaneously with this operation, the said lever 42 bears down on universal bar 52 and thus actuates the mechanisms in operative connection with said universal bar 52, as follows:—By means of the link 52$^b$ it actuates bell crank lever 52$^c$, which in turn forces slidable lever 114 to move in a direction inwardly through a link 52$^d$. During the inward progress of said lever 114, the said lever first actuates cam 102$^a$ and thereby rocks shaft 102 against the action of its spring 102$^{sp}$ and causes carrier 47 to move retracting device 48 into operative position and to deliver its gear wheel 110 into operative engagement with its driving wheel 106. This initial operation is performed by the outer segment of said lever 114, which segment 114$^c$ is the longest of the three segments and tends to maintain said cam 102$^a$ and thus shaft 102 in operative position and thereby maintains said retracting device 48 in operative position with its gear wheel 110 in operative engagement with driving wheel 106, during the entire movement of said lever 114 in the direction inward and during its return to normal rest position, being adapted to release these structures recited when it reaches its retracted position. As it continues to move, said lever 114 causes its middle shorter segment 114$^b$ to operate the one way actuator 103$^a$ and thus to rock shaft 103 against the action of its spring 103$^{sp}$ for delivering escapement lever or pawl 99 into engagement with carriage rack 16, and for simultaneously actuating carrier 68$^g$ through link 68$^j$ to cause the one way trip actuator 68$^h$ on said carrier to actuate detent 68$^d$ for releasing impression control lever 68 to allow spring 100 normally held under tension to impel said impression control lever in a direction for operating the type feeding and impressing devices for performing the printing operation. As the carrier 68$^g$ continues its movement the one way trip actuator thereon moves out of operative engagement with detent 68$^d$ and allows spring 68$^{sp}$ to move said detent back to normal rest position. Lever 114 continuing its movement inward, its long segment 114$^c$ continues to maintain cam 102$^a$ in operative position, its segment 114$^b$ maintains actuator 103$^a$ and the structures in operative connection therewith in operative position, while its shortest inner segment 114$^a$ operates one way trip actuator 104$^a$ and thereby rocks shaft 104 against the action of its spring 104$^{sp}$, and forces link 72$^k$ to move in a direction for disengaging escapement ratchet 71ª from carriage rack 16 and for simultaneously disengaging the cam rounded tooth 93 of said escapement bar 71 from detent 97 to thus release spring 94 which is normally held under tension. Upon the disengagement of ratchet 71ª from rack 16 and tooth 93 from detent 97, ratchet 71ᶜ is brought into instant engagement with gear wheel 71ⁿ upon shaft 71ᵐ carrying the retracting arm 71ᵍ. Said spring 94 being now released impels said escapement bar 71 in a direction to actuate gear wheel 71ⁿ with which it is now in engagement and thereby to operate said retracting arm 71ᵍ to cause said arm to move into engagement with impression control lever 68 and force said lever to return to normal position against the action of spring 100 and into re-engagement with its detent 68ʰ. This retracting operation occurs subsequently to the printing operation and prior to the returning of the types to normal rest position.

It is evident now that the various mechanisms of the machine controllable from a keyboard had performed their corresponding operations—up to the retracting operation of the impression mechanism. In a positive acting machine, the releasing of the finger key that had caused these operations would have forced all of the mechanisms to return to retracted rest position, and the carriage moved a step to present a new surface for printing the next character. But in this power operated machine, such is not the case. The releasing of the finger key will not cause all of the operative mechanisms of the machine to return to normal rest position—it will simply cause the detent 56 to be moved into retracted rest position by its spring 56ᵇ; said detent thereby forcing key lever 57 and its key 57ᵇ to return to normal rest position and to maintain them in such position by means of stud 56ª¹ in arm 56ª of said detent 56. Now were the further movement inwardly of said segmental lever 114 arrested upon its operation of one way trip actuator 104ª and the mechanisms operably controlled thereby, most of the mechanisms of the machine would have remained locked in their operative positions by the action of spring 43 maintaining the power operated lever 42 in its operative position. Had no other mechanism been provided for returning said mechanisms to their retracted positions such would have been the state of affairs. In order to obviate such an eventuality, I have provided the said specifically constructed segmental lever 114 with its three segments of differing lengths, and have further provided means to allow its further movement inward subsequently to the operation of said one way trip actuator 104ª for the purpose of allowing of the returning of said mechanisms from their operative to their inoperative states, and furthermore to allow of the movement of the carriage a step during the intermittent movement of the carriage. This is accomplished as follows: Subsequently to the operation of said actuator 104ª, said lever 114 continues to move inwardly, shortest segment 114ª releases actuator 104ª, thus allowing spring 104ˢᵖ to return rocker-shaft 104 and its actuator 104ª to normal rest position, and thereby causes the actuator frame 72 to disengage escapement bar 71 from gear wheel 71ⁿ and deliver said escapement bar into engagement with the carriage rack. Upon further movement inward, the middle segment 114ᵇ of said lever 114, releases the actuator 103ª which it had previously operated, and thus allows said actuator and shaft 103 to return to normal rest position under the impulse of spring 103ˢᵖ; the retracting operation of said shaft 103 causing carrier 68ᵍ to return the one way trip actuator 68ʰ to normal rest position and into operative position with reference to detent 68ᵈ; the said actuator 68ʰ in its return movement being adapted to be itself actuated by said detent as it returns to its retracted position. Simultaneously with the returning of said actuator 68ʰ, link 99ª is forced to move the escapement lever or pawl out of engagement with carriage rack 16. The outer longest segment 114ᶜ continues to maintain actuator or cam 102 in operative position during the entire operation of said segmental lever 114. The carriage having now been released by its escapement lever or pawl 99, spring drum 109 forces the carriage to move a distance equal to the distance between stops 115 and 116 mounted on escapement bar actuating frame 72; that is,—a step, for presenting a fresh surface of the paper for printing a new character. During said intermittent movement of the carriage the carriage rack 16 forces the escapement bar with which it is now in engagement to return to normal rest position against the action of spring 94, and causes said escapement bar to re-engage with its detent 97, thus placing spring 94 under tension. Furthermore, during said intermittent movement of the carriage, spring wheel 109 actuates toothed wheel 105 associated therewith, and said toothed wheel 105 being in mesh with a driving wheel 107 upon a shaft 108, said wheel 107 and shaft 108 are actuated by said wheel 105, which causes another wheel 106 upon said shaft 108 to be operated. This wheel 106 being now in operative engagement with wheel 110 it forces said wheel 110 to operate the retracting bar 48ª against the action of its spring 49, for causing said retracting bar to cooperate with lever 44 for the returning of said lever to normal rest position and thus retracting the inking device; said retracting bar simultaneously cooperating with arm 51ª for actuating universal retracting bar 50 to cause said universal retracting bar to cooperate with lever 42 for the returning of said lever against the action of spring 43 to normal rest position, and into engagement with its detent 56, and thereby replacing said spring 43 under tension. During the returning operation of said lever 42, universal operating bar 52 returns to normal position under the impulse of its spring 52$^{sp}$, and forces the segmental lever to return to normal rest position. During the reverse movement of said segmental lever, the front extremities of the middle and inner segments of said lever encounter their corresponding one way trip actuators 103$^a$ and 104$^a$. Had these actuators been fixedly mounted upon their respective shafts, the return movement of said lever 114 would have been arrested by said actuators. To obviate such a contingency I have constructed said actuators in a manner to cause them to operate their respective shafts during the inward movement of lever 114, and subsequently to their release and return to normal rest position, to allow of their operation with reference to said respective shafts by said lever 114 during its reverse movement. Reverse operation of said actuators has no operative effect upon their respective shafts, and upon the release of actuator 104$^a$ by lever 114 during the retracting movement thereof, spring 104$^{sp1}$ causes said actuator to return into operative position with reference to its rocker shaft 104, and subsequently thereto, upon the release of one way trip actuator 103$^a$ by said lever 114 during its reverse movement, spring 103$^{sp1}$ forces said actuator 103$^a$ to return to retracted rest position with reference to its shaft 103; the final step in the retracting operation of the universal operating bar being the releasing of cam or arm 102 by segmental lever 114, and thereby to move the retracting device 48 to normal rest position and thereby move gear wheel 110 out of engagement with its driving wheel 106. After the retracting operations had been completed, spring 49 causes retracting device 48 to return to its normal rest position with reference to its carrier 47, and spring 51$^{sp}$ forces universal retracting bar 50 to return to normal rest position overhanging the rear ends of power operated levers 42.

The construction and arrangement of the mechanisms above described and their manner of operation leave practically no effort on the part of the operator for operating the machine—no pounding of the keys being necessary as in most typewriters now in use, a mere touch of the key releasing the mechanisms of the machine which are then automatically operated and automatically returned to normal rest positions. A machine of such construction can be operated without producing any fatigue or nervous strain which often results from pounding of keys over a considerable time. Furthermore, the division of power for operating the different mechanisms is an important factor in conserving the operative utility and life of the machine. After the releasing of the power operated lever 42 by a mere light touch on key 57$^b$, a spring operates said lever 42, a separate spring operates the lever controlling the operation of the inking mechanism, a separate power performs the printing operation, and finally a main spring moves the carriage a step and simultaneously operates the mechanisms for returning all of the operated devices from their respective operative positions to their respective normal rest positions. This specialization of function renders the various automatically operated mechanisms more immune to the wear and tear contingent upon extensive operation of the machine than if there were one single power means for operating all of the mechanisms of the machine—the work requisite for the operation of said mechanisms being divided, less work and therefore less wear and tear is assigned to each power division.

A still further and very important feature of the construction and arrangement of the parts described above, and one that still further conserves the energy of the operator as well as augmenting the potential speed of the machine, is the power to repeat the consecutive printing of any character any number of times up to a full line of characters, without the necessity of the successive operation and releasing and reoperation and releasing of the corresponding key. All that is required to repeat the consecutive printing of a certain character a number of times is to depress the corresponding key and maintain it in such condition until the character is printed the desired number of times. This improvement is of positive advantage in the printing of borders with the asterisk, as in legal work; or in underscoring or printing a number of dots or periods. Such construction renders it possible to print any number up to a full line of such characters, as a whole line of periods, without lifting the finger from the corresponding key, once it has been depressed. This desirable effect is produced as follows;—when a key is depressed, detent 56 is caused to release lever 42, which is then operated by spring 43 and all the mechanisms of the machine are operated in the manner above described, and are subsequently returned by retracting means to normal rest position, lever 42 being retracted by universal retracting bar 50, and the universal operating bar 52 in returning to normal rest position under the impulse of its spring 52$^{sp}$ causes all of the other mechanisms of the machine to return to normal rest position, the retracting device 48 being the last to be released and allowed to return to normal rest position by the action of its spring 49 and thereby allowing the universal retracting bar to return to normal rest position by the action of its spring. Spring 43 is now replaced under tension. If the finger key is released prior to these retracting operations, power lever 42 is forced to reengage with the detent which immediately returns into normal rest position and into the operative position with reference to lever 42 upon being released by key lever 57 which said detent simultaneously returns to normal rest position. Lever 42 is thus locked against movement away from the normal position and its operation by means of spring 43 is rendered impossible, said spring being thus held under tension. If during the retracting operation, the finger key is not released and thus the detent is maintained in operative position, and away from its normal rest position, upon the returning of the power operated lever 42 to normal rest position, its re-engagement with its detent will not be possible, and the retracting means having placed spring 43 under tension, and having finally released all restraint from the retracted mechanisms when the retracting devices had been themselves returned to normal rest position, lever 42 not being locked in its normal rest position by the detent is re-operated under the impulse of its spring 43 and the printing of the same character is repeated as many times as the lever 42 is retracted and not re-engaged with its detent 56.

B.

*Noiseless operation of the different mechanisms of the machine as controlled from a keyboard.*

There are two principal causes for the noise produced in the operation of a typewriting machine:

1. The impact of the types against the platen roll as they are successively struck with hammer-like blows against the said platen roll during the printing operations. This is particularly true of that class of machines having type carriers pivotally mounted on a segmental support and which depend upon the forceful impact of the types against the platen roll for producing the proper impression, rather than upon a dwelling and unyielding pressure of the types upon said roll.

2. The step by step movements of the carriage subsequently to the printing operations also contribute, although to a less extent, to the noisy operation of the machine. This is due to the impact of devices that arrest the movement of the carriage when it had moved the required step.

Noiseless operation of a typewriting machine is a valuable asset and is of considerable advantage in an office where a number of machines are employed. I have therefore provided the machine embodying my invention disclosed herein with means for rendering the operations of the machine practically noiseless. 1, the impression of the types instead of being made with a forceful blow against the platen roll is performed with a dwelling, lingering pressure of the types against the platen roll. 2, means are provided for arresting the step by step movement of the carriage without producing any noise.

1. The devices in my machine that contribute to noiselessness of impression, are as follows: The movements of lever 38 in either direction is arrested by stops 39 and $39^a$ which are covered with matter, such as fibre, that is adapted to deaden the noise of impact of said lever 38 against its stops. Said lever 38 thus delivers type carrier 8 into operative position and returns said carrier to normal position practically without noise. With the type carrier 8 in operative position, its removable type head T is fed by type feeder 35 to the universal type holder 6 which normally occupies a position directly in front of and a very short distance away from the platen roll, and when operated, has a very short distance to travel and thus the type is pressed against the platen—a dwelling pressure being exerted, practically no noise being produced in printing the character. The construction and the operation of the universal impression type holder and of the other structures will be more fully described herein—only the noiseless features of said devices being pointed out now.

2. The means for rendering the intermittent movements of the carriage noiseless are as follows: Without providing means for rendering such movements noiseless, the noise would have been caused by the impact of escapement ratchet $71^a$ against stop 116 during its operation under the impulse of spring 94, and further, by the impact of said ratchet $71^a$ against stop 115, during the retracting of the escapement bar 71 to normal rest position by carriage rack 16 when the spring drum 109 moves the carriage a step. Escapement ratchet 71 has two plungers or pistons $71^{a1}$ and $71^{a2}$ attached thereto, one on its operative edge and the other on its retracting edge. Stop 115 has a cylindrical recess or bearing $115^a$ which is adapted to receive said piston $71^{a2}$ upon ratchet 71, and stop 116 has cylindrical recess or bearing $116^a$ which is arranged to receive said piston $71^{a1}$. The said pistons are adapted for slidable movement in their respective bearings, being movable in oil in said recesses or bearings, and movable into said bearings against a cushion of air contained therein, and furthermore, against the action of a valve-like device that normally closes the outer openings of said bearings. The said device comprises a spring 116ᵉ attached to stop 116 and a stopper 116ᵈ attached to the free end of said spring 116ᵉ. Spring 116ᵉ is attached to stop 116 and causes stopper 116ᵈ to close the outer opening of bearing 116ᵃ. A spring 115ᵉ is attached to stop 115, and normally maintains stopper 115ᵈ in a position for closing the outer opening of bearing 115ᵃ. To the end that when the ratchet 71 is released and spring 94 impels it in the operative direction, the force of the impact of said ratchet on its arresting stop is broken by the resistance it encounters in moving against the action of the cushion of air within the bearing in said stop and furthermore in causing the stopper to open the recess to allow of the escapement of the compressed air therein against the resistance of the spring 116ᵉ. Similarly during its return trip, the forceful impact of ratchet 71 is broken before it encounters stop 115. It is evident then that these movements must be noiseless. After the compressed air had been expelled from said bearings by the movement of their corresponding pistons in a direction inward, practically a vacuum had been formed in said bearings, and the air tight stoppers again close the outer openings of their respective recesses under the impulse of their respective springs. To be more explicit: During the movement of ratchet 71 toward the operative position under the impulse of spring 94, piston 71ᵃ² moves into recess 116ᵃ in stop 116, and causes the compressed air to open the recess and escape against the action of the spring-pressed stopper. As the air has all been driven out by the action of the piston, the stopper again closes said recess 116ᵃ, and during the retracting operation of said escapement ratchet 71 as piston 71ᵃ² is moved in a direction outward with reference to its recess, almost a vacuum would have been left behind in said recess had not means been provided for refilling same with air, and at the next operation of said piston within said recess, no cushion of air would have been present to be compressed and therefore the spring-pressed stopper would have remained unoperated,—to the end that a noisy impact would have resulted of said ratchet against stop 116, since no resistance would have been encountered to break the force of the impact. To obviate this defect, I have provided a hole 116ᵛ entering into recess 116 and another hole 115ᵛ entering into recess 115 for admitting air to said respective recesses subsequently to the movement of their respective pistons in a direction outward, said holes being so positioned as to be immediately closed upon commencement of the movement of said pistons into their respective recesses. It is thus evident that either plunger in moving inward in its respective recess will always encounter a cushion of air and move against said cushion and compress the air and thereby cause the opening of the recess by its corresponding stopper against the resistance of a spring, with the result that a noiseless impact is produced of said ratchet during its movements toward and away from its operative position.

The operation of the impression control lever would have been somewhat noisy had not means been provided for deadening the noise of the impact of said lever against a changeable stop 112ᵃ which is adapted to restrict the operative movement of said lever and thus to regulate the operative force of the impression. I have provided on the outer extremity of said lever 68 a finger-like cushion 68ᶜ preferably made of fibre, which is arranged to impinge against said stop 112ᵃ which also preferably lined with fibre, their impact being thus rendered practically noiseless.

C.

*Interchangeable types and shifting mechanism for changing from one font to another as controlled from keys at the front of the machine.*

Machines of this class now in use present many drawbacks, and rather undesirable for general use—commercial or otherwise, where speed and the saving of power are factors to be reckoned with. In such machines a whole font of types mounted on a wheel must be operated for delivering the required type into printing position, and to change from one kind of types to another requires the removal of the wheel in use and the substitution of the one carrying the different font of types. Time and energy are thus wasted, and this, coupled with the slow and cumbersome movement of the entire font at a time places a tax on the nerves and vital energies of a typist who may be called upon to operate such a machine over an extended period of time.

In my present invention, recognizing the desirability of such an improvement in a typewriting machine, I have attempted to eliminate the above-mentioned undesirable and inefficient constructions and arrangement of parts, by providing the machine embodying my invention with a series of individual type carriers which are adapted to hold removable types, and which are arranged to successively deliver, said types, one at a time into operative position. The movements of said carriers are controlled from a key-board, the operation of each carrier being controlled by a corresponding key, and being operable by the automatic means above described. Furthermore, a type magazine has been provided for supplying types to said carriers. The said type magazine may hold one or more sets or fonts of types which are arranged in rows, one of which rows or fonts of types is normally held in alinement with types stems on said type carriers for allowing said types to drop by means of gravity onto the types stems of said carriers. Shifting mechanism is provided, controllable from a keyboard, for first removing the entire series of types from said carriers and transferring them to their corresponding holders in the magazine, and for subsequently shifting the magazine to deliver the desired font of types into position over said type stems on the carriers for allowing of the movement of said types onto said stems on the carriers. The change from one set or font of types is accomplished practically by the mere touch of a key, without the contingent waste of time and effort required for the same purpose in the above-mentioned machines. The operation in my machine is positive and efficient, and does not tax the strength and patience of an operator.

A series of type carriers 8 are so positioned in the machine as to allow of their movement individually to a common operative position. Each carrier 8 has a type stem $8^c$ at its inner operative extremity, which type stem is preferably rectangular in shape, and has preferably a beveled free extremity; a slot $8^d$ being preferably left between said type stem and carrier 8 proper. I have provided a plate $7^a$—$7^b$, and also plates 7—$7^c$ for guiding the movements of said type carriers toward and away from their operative positions; guide plate $7^b$ being arranged to maintain and prevent displacement of type T from type stem $8^c$ during the movement of type carrier 8 into and out of operative position. Furthermore, I have provided a series of guide pins which allow of the compact arrangement of the type carriers 8 and their type stems; said guides preventing the locking of or interfering with the movement of the individual carriers into and out of operative positions. As seen in Figure 1, I have arranged the type stems and the types thereon in a compact straight row; the main object being to allow of the simple construction of the type magazine, and the regular arrangement of the types in rows preferably parallel to each other. The anterior extremities of most of the type carriers, and upon which the types are mounted, are bent at an angle to the carrier proper, in order to allow of the straight delivery of the type heads into alinement with a guide when the type carrier 8 is moved into operative position. The acuteness of the angle increases with the distance of the type carrier from the carrier 8 occupying the middle of the row of carriers. Without the guide pins $7^d$, one on each side of the inner extremity of each carrier 8, the type head of the carrier 8 would have become impacted against the adjoining type heads during the movement of said carrier in the direction of its operative position. Guide pins $7^d$ guide the movement of each type head in a direction to prevent such impact, and then guide the movement of the carrier in a direction for delivering said type head into alinement with a guide slot in type feeder 35. Guide plate $7^a$—$7^b$ embraces a slot running transversely across the machine, said slot $7^e$ occupying a position directly over and in alinement with the type stems $8^c$ of carriers 8. Said slot $7^e$ is further in alinement with a row or font of types or vacant stems (positioned above said slot) of magazine 32; said row of types or stems of the magazines being normally in alinement with a row of corresponding type stems or types on the carriers, one type stem with one type head or one type head with a corresponding stem. To the end that when the magazine 32 is shifted by means controllable from a keyboard, one of the rows or fonts of said magazine is delivered into a position directly over said slot $7^e$, and each type head in said font being in alinement with a corresponding type stem on the corresponding type carrier 8, the said type heads are transferred by gravity from the magazine type stems to the said carrier type stems. The beveled free upper extremity of each carrier stem $8^c$ allows of easy movement of the types from the magazine type stems $S^t$ onto the carrier type stems $8^c$, and the beveled lower extremity of stems $S^t$ allows of the easy return movement of the types T.

Between guide plates 7—$7^c$ is another slot running transversely across the machine frame. Said slot normally contains an ejector plate 77 which is arranged to eject the types T from their respective type stems on the carriers, and to return them en masse to the row of type stems $S^t$ in the magazine 32 to which they belong. This ejecting operation constitutes the initial step in the shifting operation of the magazine 32 as controlled from a keyboard, special keys being provided for that purpose.

The type magazine 32 is preferably of rectangular construction and embraces a top $32^c$, vertical lateral standards 32; ledges $32^b$ at either end of said top $32^c$; type stems $S^t$ fixed into the lower face of said top $32^c$; said stems being arranged in series or fonts, each series being adapted to hold a font of types, said magazine having one or more of such series or rows of stems, said rows being parallel to each other, and arranged to hold either types of different size or different faces, or having similar faces but of different languages. Three parallel rows of types are shown in the magazine 32 in Figures 5, 6, 9 and 48, representing a three font magazine.

A slidable plate 29 is movably mounted in grooves 32$^d$, one in the lower extremity of each vertical standard 32 of the type magazine; the object of said cover being to close the magazine and prevent the falling out of the types therefrom when the said magazine is not in use in the machine.

A carrier 10 is provided for holding and shifting said magazine 32. Carrier 10 runs transversely across the machine frame 1 and is movably mounted therein; mechanisms connected with keys being provided for performing the shifting operations. Said magazine carrier embraces a top plate 10, having a grooved projection 10$^b$ at either end thereof; said projections affording movable mounting of said carrier upon the machine frame 1. Two other grooved projections 10$^c$ preferably extend from the lower face of said top plate 10 of said magazine carrier and are adapted to afford removable mounting for magazine 32; ledges 32$^b$ of the magazine being adapted to fit into their corresponding grooved projections 10$^c$ on the magazine carrier. Lugs 10$^a$ upon said carrier, one near either end of the top plate, afford operative connection between said type carrier and the keyboard. Type magazine 32 is preferably locked in said carrier by means of a latch 32$^a$ which is pivoted on said magazine at 32$^k$, and has a hand lever 32$^g$ for moving said latch 32$^a$ into locking relation with a staple 10$^g$ on top plate 10 of said magazine carrier. One (or both) of the projections 10$^c$ upon carrier 10 is further provided with grooves or slots 10$^d$ in their lower free edges; one slot for each font of types being preferably provided. A latch or pawl 30 is arranged to move into that slot 10$^d$ of projection 10$^c$ which is delivered into alinement therewith, and thus lock the magazine carrier and thereby the magazine in the position to which it has been delivered, with the type holding elements of the type carriers in alinement with the type holding elements of the magazine. Said pawl 30 is adapted to be moved into and maintained in locking position with reference to said magazine carrier by a spring 31, and has a projection 30$^c$ rounded to form a cam surface. A plate 76 on either side of the type magazine affords attachment to said latch or pawl 30, each plate being provided with a slot 75 at its inner edge. Ejector 77 is movably mounted in said slots or grooves, one of its extremities being mounted for slidable movement in the slot of one of said plates and its other extremity in the slot of the other plate. The cam projections 30$^c$ of pawls 30 normally lie within said slots 75, one of said pawls lying in slot 75 of one plate and the other of said pawls lying within the slot of the other plate. Said pawls occupy such a position within said slots that when the said ejector 77 is actuated by means controllable from a keyboard, the extremities of said ejector bear against the projections 30$^c$ of said pawls 30 and force said pawls out of their respective slots 10$^d$, thus releasing the magazine carrier during the returning of the types from the type carriers to the magazine, and allowing of the shifting of said carrier. When said ejector 77 is returned to normal position subsequently to the shifting operations, springs 31 cause pawls 30 to again lock said magazine carrier in its new position.

The types, as shown in Figures 38, 39, 40 and 46, preferably have three characters, but may have two or even one. The type body is or may be of rectangular shape, and have a rectangular or other suitable chamber preferably enclosed by walls on all sides, said slot T$^1$ affording suitable means for slidably mounting the types on their respective stems either in the type magazine or upon the carriers. The slots or chambers of all types, irrespective of size, of said types, are or may be of similar size and shape, and the same applies to the type stems of the magazine or the type carriers. This uniformity of size and shape aims at simplification of the construction and the cheapening of the cost of manufacture of these parts. T$^2$ designates projections from the type upon which the characters are positioned, and which projections are arranged to move into corresponding openings in type feeder 35 when the type carrier is delivered into operative position.

The mechanisms for operating said magazine carrier and said ejector embrace the following elements: To each lug 10$^a$ of said carrier is pivotally attached a link 10$^e$, the other ends of each of said links being pivotally attached to a corresponding bell lever 10$^f$ which are keyed to a rocker shaft 10$^{sh}$ running transversely across the machine frame and journaled in said frame or in supports thereon. Links 10$^n$ are pivotally attached by one end to said bell levers 10$^f$, one link to each bell lever, and by their other ends they are pivotally mounted on a universal operating bar 78 joining the free ends of arms 78$^k$ which are keyed to a rocker shaft 79 running transversely across the machine frame and journaled therein or in supports thereon. Two hooked actuating levers 90$^g$ and 90$^r$ are shown in loose operative connection with said bar 78, each of said hooked levers being pivotally attached to a key lever—hooked lever 90$^g$ being pivoted to key lever 76$^{g1}$, and hooked lever 90$^r$ being pivotally attached to key lever 76$^{r1}$; a key 76$^g$ being connected by a stem with key lever 76$^{g1}$, and a finger key 76$^r$ being connected by a stem with key lever 76$^{r1}$. To said key lever 76$^{g1}$ is also attached pivotally a link 89$^g$, the other end of which is pivotally attached to a carrier 88$^g$ which it itself pivotally mounted upon a shaft $88^b$; said carrier having a one way trip actuator thereon pivoted at $88^c$; the movement of the said actuator $88^a$ being limited in one direction by a stud $88^d$ in said carrier $88^g$; said actuator being movable in the opposite direction against the resistance of a spring $88^s$ also attached to said carrier. The said one way trip actuator is normally maintained in operative connection by means of a loose joint with an ejector actuator $80^{kg}$ which is keyed to a shaft 80 running transversely across the machine frame and journaled therein or in supports thereon. The free end of said ejector actuator $80^{kg}$ is pivoted to a frame in operative connection with said ejector 77, and is adapted to actuate said frame for operating the said ejector to force the font of types on the carriers 8 to return to their respective positions on the type stems in the type magazine said frame comprising a bar $80^c$ to which said ejector actuator is pivoted, and two links $77^a$ pivoted by their lower extremities to said bar $80^c$, and by their upper ends being pivotally attached to lugs $77^b$ upon ejector plate 77—one link to each lug. A link $89^r$ is attached by one end to key lever $76^{r1}$, and by its other end it is pivoted to another carrier $88^{ar}$ which supports thereon a one way trip actuator $88^{ar}$, of similar construction and function to that above recited. The said one way trip actuator $88^{ar}$ is normally maintained in loose operative connection with a second ejector actuator $80^{kr}$ mounted upon said shaft 80, and which it is adapted to rock in its bearings for actuating said ejector plate 77; said ejector actuator $80^{kr}$ being also pivoted by its lower free end to bar $80^c$ and thus through said links $77^a$ with said ejector plate 77. A third ejector actuator $80^{ke}$ is shown mounted upon said rocker shaft 80, and by its lower end it is also pivotally attached to bar $80^c$ and thus through links $77^a$ it is connected operably with said ejector plate 77 for the purposes mentioned. A lever $90^{e1}$ is also pivoted upon said shaft $88^b$ upon which are mounted the two carriers above recited. Said lever $90^{e1}$ being arranged to operate the said ejector $80^{ke}$ and having operative connection therewith by means of a loose joint. A link $90^e$ is pivotally attached by one end to said lever $90^{e1}$ and by its other end to a key lever $76^{e1}$ which is connected by means of a stem with a key $76^e$. It may be noted that keys $76^s$ and $76^r$ control both the operation of the shifting bar 78 and the ejector actuating bar 80, while finger key $76^e$ controls the operation of the said ejector actuating bar only.

The reasons for this is that said shifting bar 78 is adapted to normally occupy a rest position and to be maintained in such position by the action of a spring $78^{sp}$. Being operably connected as above described with the type magazine carrier 10 which it is arranged to actuate, the said bar 78 when in its normal rest position tends to maintain said carrier in normal rest position with the font of types in common use upon the carrier stems $8^c$, and their respective magazine stems directly over them and in alinement with said types so that operation of the ejector blade 77 will immediately transfer the said font of types en masse from said carrier stems to said magazine stems. It is evident then that that font of type of the magazine which is most in use is delivered into position directly over slot $7^e$ and in alinement with their respective type carrier stems by the retracting operation of the shifting bar 78, said magazine being maintained in such position by the spring for maintaining said shifting bar in its normal rest position. The said font of types in common use may be designated by $T^e$, and the other two transient fonts of type, which may be used occasionally, may be designated respectively by $T^s$ and $T^r$. Finger key $76^e$ controls the devices for delivering the font $T^e$ into operative position, in the following manner: When one of the transient fonts of type—$T^r$ or $T^s$ of magazine 32 are upon the type carrier stems with the magazine carrier locked in position for maintaining their corresponding magazine stems in alinement with said types upon the carrier stems $8^c$, and it is desired to change from said transient font of types to font $T^e$ most commonly used, depression of finger key $76^e$ will produce the desired result in the following manner:—When said key is depressed, its key lever $76^{e1}$ operates lever $90^{e1}$ through link $90^e$, to in turn operate ejector actuator $80^{ke}$ and thus to cause said actuator to rock shaft 80 upon which it is mounted and the other ejector actuators thereon, for actuating ejector plate 77, and cause it to move in a direction for removing the types from said type carrier stems $8^c$ onto the type magazine stems $S^t$. During the ascent of said ejector for the purposes cited, the outer extremities of said ejector 77 bear against cam projections $30^e$ of pawls 30 and move said pawls out of engagement with type magazine carrier 10, thus releasing said carrier. Shifting bar 78, which has been actuated in the delivering of said transient type into operative position, is maintained in its operative position when pawl 30 locks carrier 10 in operative position, and spring $78^{sp}$ is held under tension. Now, when the magazine carrier is released by the operation of the mechanisms controlled from finger key $76^e$, shifting bar 78 returns to normal rest position under the impulse of its spring $78^{sp}$, and returns the magazine carrier to normal rest position for delivering the font of types most commonly used—$T^e$—onto the type carrier stems. When said finger key $76^e$ is then released, ejector plate 77 is caused to return to normal rest position by the retracting operations of its actuating means, and the pawls 30 are allowed to relock the magazine carrier against movement away from said normal rest position. With the magazine occupying this position, repression of the key 76$^e$ will cause ejector 77 to remove the types from the type carrier stems and deliver them into the magazine, and also actuate said pawls 30 for releasing the magazine carrier. No shifting operation, however, takes place, for the shifting bar 78 occupies its normal rest position and maintains the magazine carrier with which it is operably connected in its corresponding normal rest position. When it is desired to remove type magazine 32 from its carrier and from the machine for any reason, the depression of said key 76$^e$ in causing the returning of the font of types to the magazine and the release of the magazine carrier, allows of the removal of said magazine from its carrier and from the machine, and said magazine being arranged to move onto its covering plate 29 as it is being moved out of its carrier, and thereby preventing the spilling of the types. During the movement of the magazine into its carrier, said plate 29 encounters an elevation on plate guide 7$^a$ and is forced to uncover the types which are then protected against spilling by guide plate 7$^a$.

Finger key 76$^g$ controls the shifting of the font of types T$^g$ into operative position. When said key is depressed, and with the types T$^e$ in operative position on the type carriers, the initial operative event is the returning of the said types T$^e$ from the type carriers to the type magazine, and subsequently thereto occurs the shifting of the carrier for delivering the font of types T$^g$ into operative position, in alinement with slot 7$^e$ to allow of the movement of the types T$^g$ from their stems S$^t$ in the magazine onto their stems 8$^c$ upon the type carriers 8. With the font of types T$^r$ in operative position on said type carriers, however, the initial step is the returning of the said types into the magazine and the releasing of the magazine carrier by means of the ejector plate 77, the next step—now that the magazine had been released—is the returning of shifting bar 78 to normal rest position and thus of the magazine 32 to normal position with types T$^e$ in alinement with slot 7$^e$—said types T$^e$ being prevented by moving into operative position on their respective type carriers 8 by ejector 77 which is still held in its operative position within said slot 7$^e$, the final step in the series of operations being the actuating of said shifting bar 78 by means controllable by said finger key 76$^g$ for the delivering of the carrier 10 into position for bringing font T$^g$ into alinement with slot 7$^e$ when ejector 77 is released by its actuating means and allowed to return to normal position, and thereby allow of the movement of said types T$^g$ onto their respective type stems 8$^c$. To be more explicit:—depression of finger key 76$^g$ causes key lever 76$^{g1}$ to force one way trip actuator 88$^a$ to operate ejector actuator 80$^{kg}$ and thereby rocker shaft 80 to the end that ejector 77 is moved in its direction of operation by means of the frame connecting said ejector with said shaft 80; as said ejector 77 ascends, it removes types T$^r$ from the type carriers and returns them to their respective positions in the magazine; and also releases the magazine carrier by actuating pawls 30; said ejector 77 being maintained in its operative position within slot 7$^e$ by its operative means. Subsequently to the delivering of the type T$^g$ into the magazine and the releasing of said magazine carrier, shifting bar 78 having been held in operative position with its spring 78$^{sp}$ under tension while the magazine carrier was locked by pawls 30 with font T$^r$ in operative position on type carriers 8, said shifting bar 78 now that it is released returns to normal rest position under the impulse of its spring and returns the carrier 10 to normal rest position for the return of font T$^e$ to normal rest position. Normally, the said font T$^e$ would have immediately moved into operative position on the carriers through slot 7$^e$, but ejector 77 being maintained in its operative position within said slot 7$^e$ by the continued operation of the one way trip actuator 88$^a$ holding ejector actuator 80$^{kg}$ in operative position, the movement of said types T$^e$ through said slot 7$^e$ is prevented. During the above described events, hooked lever 90$^g$ is descending, and upon the returning of the magazine carrier to its normal rest position with said font T$^e$ in alinement with slot 7$^e$, the said hooked lever has reached close operative contact with shifting bar 78, which it actuates upon further descent, against the action of its spring 78$^{sp}$, and thus through the system of links, shafts and levers, shifts said magazine carrier a distance for delivering the type magazine in position with its type font T$^g$ in alinement with slot 7$^e$. During the operation of said bar 78 by said hooked lever 90$^g$, one way trip actuator 88$^a$ continues to move and to maintain ejector 77 in its operative position until type font T$^g$ is delivered in alinement with said slot 7$^e$, when the said one way trip actuator 88$^a$ releases ejector actuator 80$^{kg}$ and thereby allows it to return to normal rest position by the action of spring 80$^{sp}$ upon the rocker shaft 80; to the end that ejector plate 77 is returned to normal rest position and allows thereby of the locking of the magazine carrier by pawls 30 in the position to which it had been delivered, and further allows of the movement of type font T$^g$ from the magazine onto their respective type stems upon the type carriers. It is evident that in locking the magazine carrier, pawls 30 prevent the return of shifting bar 78 to normal rest position, said bar being thus retained in said operative position with reference to the operation of finger key 76$^g$, with spring 78$^{sp}$ held under tension as long as type font T$^g$ remains in operative position on the type carriers 8. When the finger key 76$^g$ is now released, hooked lever 90$^g$ returns to normal position of rest, and through link 89$^g$ carrier 88$^g$ moves the one way trip actuator 88$^a$ toward its normal position of rest and into operative relation with reference to said ejector actuator 80$^{kg}$; the said one way trip actuator being itself actuated against the action of its spring 88$^s$ as it is being returned to said operative position with reference to said ejector actuator, when by the action of spring 88$^s$ said one way trip actuator is returned to normal position with reference to its carrier 88$^g$.

When finger key 76$^r$ is depressed, the following occurs:—

1. When the font of types T$^e$ is in operative position upon the type carriers 8;— shifting bar 78 occupying a normal rest position:

The initial step in the depression of said finger key 76$^r$ is the removal of types T$^e$ from said carriers 8 and the delivering of said types to the magazine; and simultaneously with the returning of the types T$^e$ to the magazine occurs the releasing of the magazine carrier by pawls 30. These initial operations occur as the said key 76$^r$ in descending, actuates carrier 88$^{gr}$ to cause one way trip actuator 88$^{ar}$ to operate ejector actuator 80$^{kr}$ for moving ejector 77 into its operative position within slot 7$^e$. During said operations, the hooked lever 90$^r$ is caused to descend into operative contact with shifting bar 78, and upon the returning of the types T$^e$ to the magazine and upon the releasing of the magazine carrier in the above described manner, the said hooked lever 90$^r$, in continuing its descent, operates said shifting bar 78 for moving the magazine carrier a distance to deliver the font of types T$^r$ into operative position with reference to slot 7$^e$. During the operation of said shifting bar 78 by said hooked lever 90$^r$, one way trip actuator 88$^{ar}$ continues its operative movement upon said ejector actuator 80$^{kr}$, and maintains the said ejector actuator and thereby the ejector 77 in their respective operations, with ejector 77 holding a position within slot 7$^e$ and holding pawls 30 in operative position for releasing magazine carrier 10. Said operative position of ejector 77 prevents descent of types from the magazine through slot 7$^e$ during the movement of the magazine carrier by the operation of shifting bar 78. Upon the delivery, however, of the font of types T$^r$ into operative position with reference to slot 7$^e$, the obstruction, ejector 77, should be removed from within the slot 7$^e$ to allow of the movement of the types from the magazine onto the carriers 8. This is accomplished by the releasing of ejector actuator 80$^{kr}$ by one way trip actuator 88$^{ar}$ when it moves out of operative engagement with said ejector actuator, and allows it to return to normal rest position under the impulse of spring 80$^{sp}$ rocking shaft 80 for that purpose. The said releasing of said ejector actuator and the returning of ejector 77 to normal rest position, occur simultaneously with the delivering of the font of types T$^r$ to operative position with reference to slot 7$^e$, when complete depression of finger key 76$^r$ has occurred. Upon the releasing of the said ejector 77, pawls 30 return into locking position with reference to said magazine carrier to lock same in the operative position controlled by said finger key 76$^r$, said ejector 77 leaves slot 7$^e$ and returns to normal rest position; the path of movement for said types T$^r$ being now unobstructed, the said types descend from their stems S$^t$ within the magazine onto the stems 8$^c$ upon the type carriers 8; upon which carriers they remain removably mounted, and by means of which carriers the said types may be successively and individually delivered into printing position for performing the printing operation, by the operation of the various mechanisms of the machine as controlled from a keyboard.

2. With the font of types T$^g$ in operative position upon the type carriers, depression of finger key 76$^r$ for the delivering of types T$^r$ into operative position, operates as follows: The types T$^g$ are first returned to the magazine in the manner cited above, and the magazine carrier is simultaneously released or unlocked; said unlocking of the magazine carrier allowing of the returning of the shifting bar 78 to normal rest position by the action of its spring 78$^{sp}$; said bar having been held in the operative position and its spring placed under tension when types T$^g$ were delivered into operative position by the depression of finger key 76$^g$. As the shifting bar is returning to its inoperative position, it forces magazine carrier 10 to return to normal rest position for delivering types T$^e$ in alinement with slot 7$^e$, within which now lies ejector 77 and prevents movement of said types T$^e$ through said slot 7$^e$. While the said shifting bar is returning to normal position under the impulse of its spring 78$^{sp}$, hooked lever 90$^r$ moves into operative contact with said bar and then reoperates said shifting bar 78 against the action of spring 78$^{sp}$ for moving the magazine carrier a distance to deliver font of types T$^r$ into alinement with slot 7$^e$. Simultaneously with this event, said one way trip actuator moves out of operative engagement with ejector actuator 80$^{kr}$ and thus releases said actuator and allows of the returning of ejector 77 from within the slot 7$^e$ into normal rest position, and allows also of the relocking of said magazine carrier by pawls 30 in the said operative condition controllable by finger key 76$^r$. The path, now unobstructed, types T$^r$ descend by means of gravity onto their respective carrier stems 8$^c$, and are in a position to be individually and successively actuated for performing the printing operations.

It is conceivable that for a one font magazine, only one finger key will be required, no shifting bar will be necessary, since said font will normally occupy one operative position, the function of said key being only an expelling function, for the returning of the types from the type carriers to the magazine when it is desired to remove the magazine from the machine. Similarly, for a magazine having a plurality of fonts of types, a corresponding plurality of finger keys will be required. Three such finger keys are shown herein as controlling a three font magazine shown and described herein only by way of illustration and not by way of limitation. Of the three fonts of type, font designated as T$^e$ may have English characters, font T$^g$ may have German characters, and font T$^r$ may be Russian types. It is evident that with the least effort required, and with the same facility as is required for operating any other of the keys of the keyboard, one may change instantly from one language to another, such as from English to German or Russian, by merely depressing the key corresponding to the language font desired. Or, the difference may be in the faces of the types: T$^e$ may designate a font of plain roman types; T$^r$—italic types; and T$^g$— gothic types. It is evident that by the depressing of the finger key corresponding to the font controlled by the operation of said key, one may deliver into operative position different faced type instantaneously;—for common use, the roman types; and for occasional use, changing instantly, either to italic or gothic as desired. The fonts of type may differ in size of types: T$^e$ may designate pica or 12 point type, for common use; T$^g$ may designate 14 point for caption use; and T$^r$ may designate 6 point type. It is conceivable that by a mere touch of their corresponding finger keys, any of the three sizes of types may be instantly delivered into operative position on the type carriers 8. When a magazine is employed with different fonts of types of different sizes, it is evident that some provision must be made for changing the size of the steps taken by the carriage during its intermittent movements subsequently to the printing operations. A larger type will require a corresponding larger step movement to be made by said carriage during its intermittent step by step movement; and a smaller type requires a smaller step movement of the carriage. I have provided means therefor,

D.

*For adjusting the carriage feed mechanism for different size type.*

As has been shown herein, the carriage escapement mechanism includes two stops mounted preferably on actuating frame 72, for limiting the movements of the escapement bar in its operative and its inoperative directions respectively. Said stops 115 and 116, therefore, control the size of the step taken by the carriage during each intermittent movement of said carriage. When, during the operations of the mechanisms of the machine as controlled from a keyboard, escapement ratchet 71 is disengaged from the carriage rack after the said rack had been locked against movement by pawl 99, spring 94 impels the escapement bar in a direction a distance until the further progress of said escapement bar is arrested by escapement ratchet 71 encountering stop 116; the distance the said escapement bar is allowed to travel under the impulse of its spring is practically the distance between the two stops 115 and 116. For, when during the retracting operations escapement ratchet 71 is returned into engagement with carriage rack 16 and escapement pawl 99 releases the said rack, main spring 109 forces the carriage to move in a direction opposite to that taken by escapement bar under the impulse of its spring 94 when said escapement bar is disengaged from the carriage rack. Said main spring 109 causes the carriage to move a distance equal to the distance that has been previously traveled by said escapement bar; said bar being now returned to normal rest position by the movement of said carriage against the action of spring 94 until its further reverse movement is arrested by stop 115. It is evident then that if the distance between the stops is increased, the distance of travel of said escapement bar is increased and therefore its distance of travel in a reverse direction under the impulse of the intermittent movement of the carriage will be increased. The size of the step by step movement of the carriage will thus be increased. It may also be noted that if the distance between said stops is diminished, the size of step by step movements of the carriage will be correspondingly diminished. To be able to regulate the distance between the stops and thereby to regulate the size of the steps taken by the carriage during its intermittent movements, an important feature in a machine where interchangeable types of different sizes are employed, I have provided adjusting means controllable by an operator from the front of the machine for adjusting said stops for that purpose.

In discussing the noiseless features of the intermittent movements of the carriage it has been shown that one of said stops 115 is preferably fixedly mounted on escapement actuating frame 72, and the other of said stops 116 is or may be movably mounted on said frame 72, or rather on a guide projection 72[b] thereon; said stop 116 being mounted for slidable movement thereon. A shaft 117 is mounted for rotatable movement in stop 115 and is or may be further mounted for rotation in a bearing in the machine frame 1 or a support 117[c] thereon. The independent movement of said shaft 117 in a longitudinal direction is prevented by collars 117[a1]; and another collar 117[b] may also be provided for that purpose. The inner extremity 117[a] of said shaft 117 is preferably threaded and is mounted for rotatable movement in a threaded bearing or recess 116[b] in movable stop 116. Upon the outer extremity of said shaft 117 is or may be mounted a gear wheel 118 or other suitable means for driving said shaft 117. Another shaft 75[a] runs preferably to the front of the machine and is provided upon its outer extremity at the front of the machine, with a crank handle 75[b] and an indicator 75. At its inner extremity a threaded portion 75[a1] of said shaft 75[a] is in operative connection with said gear wheel 118 for driving shaft 117. Shaft 75[a] is mounted for rotatable movement in a bearing 1[ra] on machine frame 1, and its independent movement longitudinally is prevented by a collar mounted on said shaft 75[a]. It is evident that rotation of shaft 75[a] causes operation of gear wheel 118 by threaded portion 75[a1] and thus rotation of shaft 117 for adjusting the distance between stops 116 and 115 for different size types, when crank handle 75[b] is turned in one direction by the operator, the distance will be increased and in the opposite direction it will be diminished, and thus adjusted respectively for either larger or smaller types. I have provided a circular dial or scale at the front of the machine, which I have marked off to indicate the different size types, such as 6, 8 and up to 18 point types for which said stops may be adjusted by the turning of the crank handle in the required direction. The said crank handle is preferably pivoted at the centre of said dial 75[a], so that when said handle 75[b] is operated, the indicator 75 points to the size of types for which the said stops had been adjusted. For instance, should it be desired to make the adjustment for 8 point type, the crank handle is rotated in a direction for delivering indicator 75 at the point marked 8 on the said dial. It is conceivable that the adjustments may be made in but a fraction of a second, and the 8 point types having been delivered into operative position on the type carriers, operation of the keys will produce printing with 8 point characters. It may be noted that the markings shown on the dial are arbitrary, and are not indications of the exact distances the indicator would have to be moved for adjusting the stops for different size types indicated. Figure 103 shows another type of dial enclosing one similar to the dial shown in Figure 102. The markings are made for bold types—said bold types being wider than the usual size types:—a six point bold type may be equivalent in width to a ten point plain width type, etc. when bold types of varying sizes are employed in the machine, therefore, a dial of the type shown in Figure 103 would indicate the degree of adjustment for the different sizes, and particularly for the size of bold type that may be required for immediate use. The markings in this dial are also arbitrary, and should not be taken as a true measure of the distances of travel of the indicator 75 for adjustment of the stops for the particular size of types shown on the dial. The said dials are shown only by way of illustration.

E.

*The universal impression type holder and its type feeding device.*

The said universal type holder 6 is adapted to receive types—one at a time—from a type feeder 35, to which types are successively delivered by type carriers 8 by the operations of the mechanisms of the machine as controlled from a keyboard. After the type is delivered into proper printing position in said type holder 6, the said type holder 6 is operated by further means controlled from a keyboard as described herein. Said universal holder 6 is preferably of rectangular construction, having two vertical lateral standards, joined at their upper extremities by a cross-piece 6[t] and preferably attached by their lower extremities upon a short shaft 6[a] journaled in a support on the machine frame, or rather in a bearing 6[f] in said support. The inner faces of each of said lateral standards of said universal holder 6 are provided with guides for guiding the movement of type feeder 35 which is mounted for slidable movement therein. Anti-friction means, such as balls, may be provided for facilitating the movement of said feeder within said universal holder 6. Suspended from cross-piece 6[t] and fixedly attached to the lower face thereof is a universal type stem 6[d] whose lower free extremity is preferably beveled for facilitating the insertion of the types upon said universal stem 6[d]. Another cross-piece 6[o], a distance below upper cross-piece 6$^t$, also joins the lateral vertical standards and is adapted to fortify said universal type holder 6; said cross-piece 6$^e$ being of a construction to allow of the movement of the feeder 35 in and out of operative position within said universal type holder. Holder 6 is open in front and rear.

The lower extremity of said universal type stem 6$^d$ is or may be housed within a slot 35$^i$ in a head section 35$^h$ upon said type feeder 35; the said head section being adapted to slide upon said universal type stem during the movements of said type feeder within said universal type holder 6, and thereby maintain the said type stem 6$^d$ in rigid position. Said type feeder further comprises a body portion 35, having lateral standards 35$^s$, which are preferably beveled at their inner faces, and preferably form a groove or slot 35$^e$ between them, all for guiding the movement of the types into operative position with reference to said feeder, and a narrower slot 35$^d$ below, for receiving the inner extremity of the type carrier—or rather that part of said extremity upon which the type is not mounted. Said feeder 35 further embraces ledges 35$^j$, one on each side thereof, in which ledges may be bearings for anti-friction means, such as balls, which renders the movement within said universal holder free and extremely easy. With the exception of the head portion 35$^h$, said feeder is open in the front, where the two lateral plates diverge to form the said guides, and is closed mostly in the rear by a plate 35$^r$ having windows in the upper part thereof for receiving the type projections T$^2$ on the type T; each projection being arranged to move into its corresponding window in said back plate 35$^r$. For example, in types having three characters thereon, as shown in the drawing in Figure 39, one of the projections T$^2$ holds a capital, the second one holds a small character, and the third holds a figure. Say that the figure character is on the uppermost projection, the capital character is on the middle projection, and the small character is on the lowermost projection. It is evident that when the type carrier 8 is actuated, it will deliver the type thereon into operative position within said feeder, with the uppermost projection carrying the figure character moved into window 35$^a$, the middle projection bearing a capital character delivered into middle window 35$^b$ and the lowest projection having the small character thereon delivered into the lower window 35$^c$, and the unoccupied portion of the inner extremity of the type carrier occupying narrow slot 35$^d$ between the guide plates 35$^s$. When the type is delivered into operative position within said type feeder 35, the said projections T$^2$ of said type extend through said windows 35$^a$, 35$^b$ and 35$^c$, a distance beyond back plate 35$^r$ and also beyond the rear edges of the universal type holder 6, to allow of the inking and printing operations with said type.

When the type carrier is moved into operative position with the type on said carrier occupying the position described, the type stem 8$^c$ upon the carrier occupies a position in alinement with the universal type stem 6$^d$, and the chamber T$^1$ of said type T is thus also in alinement with said universal type stem 6$^d$; to the end that the type delivered into the operative position with reference to said feeder is arranged to be moved directly from the stem on the carrier onto the universal stem 6$^d$. With the type thus fixed by its projections in the windows of back plate 35$^r$, movement of type feeder 35 in its operative direction tends to move said type from off the stem on carrier 8 and onto the universal type stem 6$^d$ of the universal type holder; and reverse movement of said feeder tends to return said type from stem 6$^d$ to stem 8$^c$.

Mechanism in operative connection with impression control lever 68 is provided for primarily moving feeder 35 into operative position within said universal type holder 6, for delivering said type into position for printing, and subsequently thereto, for operating said universal type holder for performing the printing operation;—A link 36 is pivotally attached by one end to type feeder 35 at 35$^e$, and by its other end it is attached to a lever 37; said lever 37 being pivotally attached upon an arm 6$^c$ at 37$^a$, and having an arm member 37$^b$ extending to the rear of said pivotal point. To said arm 37$^b$ is or may be attached on a pivot member 70, to which member is also pivotally attached one end of a link 69, and thus being in operative connection with said lever 37 by what is commonly known as a universal joint. However, this mode of connection is not to be interpreted as a limitation—any other suitable manner of operably connecting said link 69 with lever 37 may be provided. The other end of said link 69 is pivotally attached to said impression control lever 68. Arm 6$^c$ is or may be attached to the fixed extremity of one or both of the lateral standards of the universal type holder, and thereby form a bell-crank lever with said lateral standard; or it may be keyed by one end to short shaft 6$^a$ which it is adapted to rock and thus operate the universal type holder for performing the printing operations. At its free extremity said arm 6$^c$ embraces a guide 6$^b$ within which said arm 37$^b$ of lever 37 is contained and is arranged to be guided during the movement of said lever against lateral displacement, and thus for relieving the constant strain upon its pivot at 37$^a$ to which said lever 37 is attached.

Now, without any further devices provided for controlling the operations of said feeder and said universal type holder, said impression control lever 68 upon being released and impelled in a direction, by spring 100, for operating said devices, the downward pressure upon lever 37 would have a tendency to operate simultaneously feeder 35 and universal type holder 6, and the said holder would be moved into operative position prior to the delivering of the type by the feeder into position for printing within said holder. The result would be no printing operation or a tearing of the paper by the movement of said feeder against the resistance of the platen roll. To prevent the operation of these two elements in unison or to prevent the operation of the universal type holder prior to the delivering of the type into position for printing within said holder by said feeder, I have provided means for locking said holder against movement away from its normal rest position during the operation of the type feeder for delivering of the type from its carrier stem to the universal stem and into position for printing; said means being adapted to release said universal type holder when the type had been delivered into its full operative position, and upon the continued operation of said impression control lever 68, lever 37 bears upon arm 6$^c$ and moves the universal type holder 6 into operative position for performing the printing operation. The said means for restricting the operation of said universal type holder 6, embrace a stud 35$^f$ in said feeder 35, and a guide slot 84 in a stationary support 81 into which said stud is adapted to be received, and along which said stud 35$^f$ moves during the movement of said feeder 35 toward and away from its operative position, within said universal type holder. It is evident that the said stud within the guide slot 84 tends to guide the movement of said feeder and simultaneously lock the universal type holder against movement away from its inoperative position. Means have been provided for allowing of the operation of said universal type holder when said feeder reaches its extreme operative position and the further upward movement of stud 35$^f$ within said slot 84 is arrested. A slot or exit 82$^a$ opening preferably into the rear of said slot 84 and of a size large enough to admit and allow of the passage of said stud 35$^f$ is provided opposite the extreme operative position to which the said stud may be delivered by the operation of the type feeder. Now, when the said type feeder had been thus operated individually by the means controlled by said impression control lever 68, and said feeder had delivered the said type into operative position with reference to the universal type holder, and during the movement of said feeder in its operative direction within said holder had locked said holder against movement by means of said stud and guide slot until the further progress within said slot of said stud had been arrested simultaneously with the delivering of the type in the extreme operative position within said universal type holder, the continued operation of impression control lever 68 forces lever 37 to actuate arm 6$^c$ for moving universal type holder in a direction away from its normal position and toward its printing position, said holder and feeder 35 being now operated in unison, and the further progress upward of stud 35$^f$ within slot 84 being arrested, it allows of the said united movement of said two elements by the movement of said stud 35$^f$ into said exit 82$^a$ a distance to allow of the printing operation. During the retracting operations, lever 37 forces arm 6$^c$ to return the universal type holder in unison with its feeder to the normal rest position of the holder, and thereby returns stud 35$^f$ from exit 82$^a$ to its extreme operative position within slot 84. Now that the movement of said holder in a retracting direction is arrested by said stud within said slot, said lever 37 causes type feeder 35 to return to normal rest position with reference to said universal type holder, and thus to return the stud 35$^f$ to normal rest position with reference to its slot 84.

It may be noted that the operation of the two elements is performed consecutively by means of the same control lever 68. Operation of said impression control lever 68 by its spring causing first the individual operation of the type feeder within the universal type holder until the said feeder reaches its operative position therein, and subsequently and consecutively thereto forcing said two elements to move in unison into operative position with reference to the platen roll 4 for performing the printing operation. Subsequently to the printing operation, as the segmental lever 114 continues its movement in the operative direction, it operates cam 104$^a$ and thus the shaft 104 and the means connected therewith, for disengaging escapement bar 71 from the carriage rack and simultaneously from its detent and instantly delivering said escapement bar into engagement with the device for retracting the said impression control lever 68 and forces said lever 68 to return to normal rest position and into engagement with its detent against the action of spring 100. During said retracting operation, said lever 68 forces the type feeder and the impression type holder to return to the normal position of rest occupied by said universal type holder; said two elements being retracted in unison, and the stud 35$^f$ being returned from exit 82$^a$ to slot 84; the final retracting operation forcing the type feeder to move individually and independently of said universal type holder, for the returning of said feeder into normal rest position with reference to said universal type holder, and for there turning of said stud 35$^t$ along said slot 84 into normal rest position with reference to said slot 84. These two elements controlling the printing operations having been operated and retracted in the manner recited, the final step in the operation of the machine is the intermittent movement of the carriage a step and the simultaneous operation of the retracting devices for the returning of the different mechanisms of the machine as controlled from a keyboard.

In a typewriting machine having typeheads embracing more than one character on each typehead, means must be provided for delivering into printing position that character on the typehead which is not normally reciprocated into operative position with reference to the platen. For example, the lower case character on each type head of the series of typeheads is normally delivered into alinement with the printing line on the platen, and the upper case character is not normally delivered into alinement with said printing line on the platen when the type carriers are successively reciprocated into operative position by the operation of the mechanisms of the machine as controlled from a keyboard. Therefore, means must be provided for shifting either the types, the type carriers and their segmental support, or for shifting the carriage, in order to bring the printing line into alinement with the upper case character reciprocated into printing position. Machines now in common use employ one of two shifting methods for that purpose: 1. shifting means controlled from a keyboard for shifting the platen roll vertically a distance for bringing the printing line into alinement with the upper case characters on the type carriers successively delivered into operative position; or, 2. means controlled from a keyboard for shifting the position of the segmental support and the type carriers thereon, for the above purpose. The construction of my machine embodying the present invention allows of the employment of novel shifting means, less cumbersome and unwieldy, less likely to get out of order, and requiring considerably less power for their operations:—

F.

*Type shifting mechanism controlled from shift keys.*

I have provided means controllable from shift keys for shifting the type heads individually after said type heads are severally delivered by their corresponding type carriers into operative position with reference to said type feeder. With the projections T$^2$ of the type T delivered within and extending a distance beyond the windows 35$^a$, 35$^b$ and 35$^c$ in back plate 35$^r$, the said type is adapted to be transferred from the carrier stem 8$^c$ to the universal type stem 6$^d$ by said type feeder 35 during its movement in its operative direction within the universal type holder. Normally, the type feeder is arranged to move into its extreme operative position—until its further progress is arrested by top plate 6$^t$ of holder 6—for delivering said typehead to the uppermost position upon the universal type stem, and thus bringing the lowest character upon said type head—that is, the small character—into operative position with reference to platen roll 4. To the end that with the consecutive operation of the universal type holder, the said small character is delivered into printing position for performing the printing operation.

If the machine were constructed for use with only one case type, the type would always be delivered into the same operative position upon the type stem 6$^d$ within the universal type holder 6. If two case type were employed in a machine of the construction shown in the appended drawing and described herein, it is conceivable that means would have to be provided for shifting the type delivered into operative position with reference to the type feeder, to a point upon the universal type stem 6$^d$, and means further provided for arresting the movement of the type beyond such point upon said stem, when it is desired to deliver into printing position that character of said type which is not normally delivered into such printing position.

In my machine as shown in Figure 9, three case type is employed, and the following means are provided for for delivering a capital character or a figure into printing position. The small characters are normally delivered into such position. As herein described, a stationary support 81 upon the machine frame 1, embraces a slot or groove 84, running preferably in a vertical direction with reference to the machine, adjoining preferably the universal type holder and to one side thereof; said slot embracing preferably a roof and a floor. A stud 35$^t$ is arranged to be taken into said slot 84 and is adapted for slidable up and down movement therein; the progress of said stud in its upward direction being arrestable by the roof of said slot, and its progress in a reverse direction being arrestable by the floor of said slot. As said stud is attached to the type feeder, it is adapted to move within said slot during the movement of said feeder within the universal type holder, and it is evident that the upward movement of said feeder within the holder will be arrested when the movement of said stud within the slot is arrested by the roof of the slot, and the movement of the feeder in the reverse direction is or may be arrested when the said stud encounters the floor of said slot upon its return trip within said slot. It is or may be arranged that when the feeder is reciprocated into its extreme operative position with said stud 35ᶠ abutting against roof of said slot 84, the lower case type or small character occupies a position on the type stem 6ᵈ which may be designated as its operative position with reference to platen 4, and is adapted to perform the printing operation when the universal type holder is actuated. It is evident that when it is desired to deliver a capital into operative position with reference to platen 4, for performing the printing operation with said capital character, that the typehead T must be moved by the type feeder to a different position on stem 6ᵈ than that occupied by said typehead normally when the small character of said typehead is required to perform the printing operation. And likewise when it is required to print a figure character of said type head; the feeder must deliver said type head to a third position upon said universal type stem 6ᵈ, which places said figure character in operative alinement with platen roll 4, and upon operation of the universal type holder is adapted to print said figure. I have therefore provided means controllable from shift keys for arresting the operative progress of the type feeder 35 when it is moved in its operative direction by means controllable from a keyboard, and for thus arresting the progress of the typehead delivered to said feeder by a type carrier, so that the type head will occupy a definite position upon the universal type stem; said type head being adapted to occupy a different position upon said stem when the operative progress of said type feeder is arrested by a different stop.

One of said stops is the stationary stop designated as the roof of guide slot 84 which allows of the delivering of the type head into the extreme operative position of the feeder within the universal type holder, for printing a small character. A movable stop 82, preferably of rectangular construction, is or may be mounted in said stationary support 81 and is adapted for slidable movement therein; said movable stop being operably connected with a shift key for capitals. The inner extremity of said stop normally forms part of the outer wall of said slot 84; said stop 82 being adapted to move into said slot 84 when the shift key Cᵃᵖ is depressed, for arresting the movement of said stud 35ᶠ in said slot 84 during the movement of the type feeder for delivering the type head into position on universal type stem with the capital character in operative position with reference to platen roll 4. Stop 82 is or may be positioned directly below the stationary stop or roof of guide slot 84.

Another stop, 83, is mounted in said frame support 81 and is also adapted for slidable movement therein; its inner edge also preferably forming part of the outer wall of guide slot 84; said stop 83 being also adapted for movement into and out of said guide slot, and preferably controls the shifting operation for printing figures, being in operative connection with shift key Fⁱᵍ. When said shift key is depressed, stop 83 is moved into slot 84 and is thus placed as an obstruction in the path of movement of stud 35ᶠ as it is moved in the operative direction within the slot by the type feeder. As said stud encounters the lower edge of said stop 83, its further progress is arrested, and as the further progress of the type head upon the universal type stem is thus arrested, it is maintained in such position with the figure character occupying the operative character with reference to the platen roll.

Normally and during the movement of the type feeder within the universal type holder, stud 35ᶠ cooperates with slot 84 for locking said holder and the feeder against movement into operative position with reference to the platen roll, and for maintaining said two elements in normal rest position. During the feeding operations, this restriction of movement is necessary to prevent the movement of said elements into printing position prior to the delivering of the type into printing position within the universal type holder. When, however, the required character had been brought by the feeder into a position on the universal type stem where upon operation of the universal type holder the said character will be forced to perform the printing operation, the said holder and its feeder must be released to allow of their operation in unison for performing the said printing operation. I have provided, therefore, three exits in said guide slot 84; each of said exits being wide enough to admit and allow of the passage of the stud 35ᶠ, and being preferably "true" to the size of the stud, for obtaining perfect alinement of the printing. Said three exits open preferably into the rear wall of said slot 84, one exit being provided to each stop, and are or may be positioned directly under their corresponding stops. An exit 82ᵃ is or may be positioned directly under the stationary stop or roof of slot 84; an exit 82ᵇ being positioned directly under movable stop 82 when stop is moved by its corresponding shift key into slot 84; and exit 83ᵃ is or may be positioned directly under the inner extremity of movable stop 83 when said stop is moved by its shift key into said slot 84. Exit 82ᵃ is or may be always maintained open and adapted to allow of passage of stud 35ᶠ when it is moved into its extreme operative position within slot 84; and the further progress of said stud is arrested by the roof of said slot 84. Slots 82ᵇ and 83ᵃ, however, are normally closed by means of sliding doors preferably; said doors being preferably in operative connection with their respective stops 82 and 83 and are adapted to be actuated by said stops when the said stops are actuated by their corresponding shift keys from the keyboard. Sliding door 87 normally closes exit 82$^b$, and sliding door 87$^k$ is adapted to close and normally does close exit 83$^a$. Sliding door 87 is operably connected with stop 82 preferably by means of an arm 87$^b$ preferably pivoted at its centre on frame 81, and being operably connected in a suitable manner by one end with said stop 82 and by its other end with sliding door 87 adapted for normally closing exit 82$^b$; to the end that when the shift key C$^{ap}$ is depressed, said stop 82 is caused to move into operative position within slot 84, and during said movement into said slot, the said stop 82 actuates said arm 87$^b$ upon its pivotal point for removing said sliding door 87 from exit 82$^b$. Said stop 82 is now occupying a position within slot 84 and said sliding door a position outside of exit 82$^b$, to allow of the printing of a capital character. Similarly, a sliding door 87$^k$ for normally closing the exit 83$^a$ is in operative connection with its corresponding stop 83 preferably by means of an arm 87$^c$ likewise pivoted at its center and connected in a suitable manner with said stop by one end and with said sliding door by its other end. To the end that when shift key F$^{ig}$ is depressed, stop 83 is forced to enter slot 84 for restricting the distance of travel of stud 35$^t$, and during its movement into said slot, said stop 83 actuates said arm 87$^c$ for removing sliding door 87$^k$ from exit 83$^a$ to allow of the printing of a figure character. The said sliding doors are preferably positioned below and to the rear of their corresponding stops, since the said exits occupy positions below and to the rear of the slots in support 84 wherein the stops are mounted for slidable movement.

The reason for the three exits has been explained herein, as requisite for allowing of the printing operations subsequently to the delivering of the type required into its operative position within the universal type holder. The reason for the stops has been made evident; but the object sought in providing said two sliding doors for normally closing said exits 82$^b$ and 83$^a$ respectively, has not been clearly pointed out:—With the machine constructed for use with only single case type, that is, in a machine of the construction disclosed herein, it is evident that only one exit, such as 82$^a$ will be necessary for allowing of the printing operations; the said exit being positioned opposite the extreme operative point to which said stud 35$^t$ is delivered during the movement of the type feeder. The said stud, during its operative movement, is forced to bear against the rear wall of slot 84, until it reaches said extreme point opposite exit 82$^a$, and is caused to enter said exit while the universal type holder is being reciprocated into printing position. When, however, more than one case type is employed, such as three case type in the present invention, thus necessitating the provision of more than one exit—that is three exits—in said slot 84, and since the stud is made to bear against the rear wall of said slot, into which said exits preferably open, it is evident that means must be provided for preventing said stud 35$^t$ from entering the exit which it is not intended it should enter, prior to reaching its proper destination. Should such an event occur, the result would be the printing of the wrong character. For example, if by the operation of a key it is intended to print the small character of the corresponding type head, and the feeder during its movement in the operative direction carries stud 35$^t$ in the direction of stationary stop, or roof of slot 84, should said stud enter the first or the second exit within said slot instead of the last, the result would be the delivering of the character not desired for printing into operative position for performing the printing operation, and thus would occur the printing of the wrong character. To obviate such an eventuality, I have provided said sliding doors, which normally close the first two exits, for preventing the entrance of the stud into one of said exits should it be desired to deliver said stud into extreme operative position within the slot, and opposite exit 82$^a$, to allow of the printing of a small character. When it is desired to print a capital, exit 82$^b$ is opened and exit 83$^a$ remains closed, said stop 82 arresting the progress of the stud opposite said exit which it then enters during the printing operation. Exit 83$^a$ is opened when a figure is to be printed, and as stop 83 is simultaneously moved into operative position within said slot 84, the movement of stud 35$^t$ beyond exit 83$^a$ is prevented, and thereby allows of the printing of the figure character on the typehead.

Said stops and sliding doors, as described, are in operative connection with corresponding shift keys: stop 82 with sliding door 87 being connected with shift key C$^{ap}$, and stop 83 with sliding door 87$^k$ being connected with shift key F$^{ig}$. Said shift keys are pivoted by their inner extremities at P$^v$ through their respective key levers C$^{ap1}$ and F$^{ig1}$, to which they are respectively connected by means of stems. Said shift key levers respectively have free extremities extending a distance beyond said stems, each having an upper operative edge, and a lower edge rounded to form a cam surface. A spring is provided, such as F$^{issp}$, for maintaining said key levers and the shift keys in their respective retracted positions. A bell crank lever 85, operably connected with stop 82, is pivoted at 85$^b$. A link 85$^c$ is pivotally attached to said bell lever 85 by one end, and by its other end said link 85$^c$ is pivotally attached to shift key lever C$^{ap1}$. A bell crank lever 86 is operably connected with stop 83, and is pivoted at 86$^b$. A link 86$^c$ is attached by one end to said bell crank lever 86 and by its other end to shift key lever F$^{ig1}$. A novel shift lock is provided for locking said shift keys when necessary. A slide 165, having two spaced-apart projections, 166 and 167, and a stud 165$^b$, is mounted in a support 167 on the machine frame 1, wherein it is adapted for slidable movement, its movement being guided within said supported, and restricted in one direction by a stop 167$^a$ and in the opposite direction by a stop 167$^b$. A hand lever S$^h$ is pivoted on the machine frame at S$^{h1}$, and is preferably provided with a forked lower extremity, and is adapted to receive said stud 165$^b$ between its prongs S$^{h2}$. To the end, that when the lever S$^h$ is manipulated, it coacts with said stud for moving said slide with its spaced-apart projections within its frame 167. Slide 165 normally occupies a position within its guide support with its projection 167 and 166 directly in front of and underneath the anterior extremities C$^{ap2}$ and F$^{ig2}$ respectively of their corresponding shift key levers C$^{ap1}$ and F$^{ig1}$; said projection 167 being adapted to lock shift key C$^{ap}$, and said projection 166 being arranged to cooperate with shift lever F$^{ig1}$ for locking said shift key F$^{ig}$. When it is desired to lock the shift key for capitals, for instance, shift key C$^{ap}$ is depressed, and hand lever S$^h$ is subsequently manipulated for moving said slide 165 in the direction of its stop 167$^b$ for delivering projection 167 into a position over said shift key lever projection C$^{ap2}$ to cooperate therewith for locking said shift key C$^{ap}$. To unlock said shift key, actuate hand lever S$^h$ in a direction for moving slide 165 toward its stop 167$^a$. For locking shift key F$^{ig}$, subsequently to its depression, actuate lever S$^h$ for moving slide 165 in the direction of stop 167$^b$, for delivering said projection 166 into a position over said shift key lever projection F$^{ig2}$ to cooperate therewith for locking said shift key F$^{ig}$. The said anterior extremities C$^{ap2}$ and F$^{ig2}$ of shift key levers C$^{ap1}$ and F$^{ig1}$ respectively, are each preferably provided with an upper edge which is arranged to cooperate with their corresponding projections on the slide for locking their respective shift keys, and are rounded anteriorly and below to form a cam surface, for cooperating with said projections on the slide to move said projections out of the path of movement of said shift keys when they are depressed, should the slide inadvertently be moved out its normal position prior to the descent of the shift key into operative position. This means prevents the locking of the shift keys in their respective normal positions, which would then prevent the movement of the slidable stops within slot 84. Depression of one of the shift keys would cause said slide to be moved out of the path of movement of said shift key.

F$^2$.

*Changeable means for regulating the operative force of the universal type holder to perform a variable impression.*

The device shown and described herein, is an improvement on that shown and described in my co-pending application, No. 335,857, filed November 5th 1919. An L shaped support 111 is or may be attached to the machine frame 1, and embraces a bearing or recess 111$^d$ in the horizontal leg 111$^c$ of said L shaped support, and a guide projection 111$^b$ upon the vertical part of the L. A frame 112 is mounted upon the said projection on support 111, being provided with a groove 112$^b$ which is adapted to receive said projection 111$^b$, and upon which guide projection the said frame 112 is adapted for slidable movement. At its lower extremity said frame preferably terminates in a projection running substantially horizontal, said projection having an opening or bearing 112$^d$ in alinement with bearing 111$^d$ in support 111. At its upper extremity frame 112 embraces a top 112$^a$ which is or may be parallel to projection 111$^c$, with the free edge of the former projecting a distance beyond the free edge of the latter. Said top 112$^a$ is arranged to function as a stop for arresting the operative movement of impression control lever 68, and is preferably lined or composed entirely of matter that tends to deaden the noise of impact, such as fibre. A rotatable shaft having a non-threaded portion 113$^a$ and a threaded portion or worm section 113$^c$, is mounted for rotatable movement in said support 111 and also in said slidable frame 112; said non-threaded part of the shaft being mounted in the bearing 111$^d$ of said support 111, and threaded part or worm 113$^c$ is mounted in threaded bearing 112$^d$ in frame projection 112$^c$. A collar 113$^b$ upon said shaft prevents independent movement longitudinally of said shaft. Said shaft upon rotation is adapted to move changeable member 112 away from or toward leg 111$^c$ of support 111, by sliding said member along said guide projection 111$^b$. As said stop 112$^a$ is adapted to cooperate with member 68$^e$ upon impression control lever 68 for restricting the operative movement of said lever, it is conceivable that an increase in the distance between said stop and said member 68ᶜ will allow said lever 68 to travel a greater distance in its operative direction, and that diminishing the distance between said elements causes a corresponding diminuation in the distance of travel of the impression control lever. Upon the free end of said shaft 113ᵃ is mounted a gear wheel 113 which is adapted to rotate said shaft for increasing or diminishing the distance between said stop 112ᵃ and member 68ᶜ upon lever 68. A shaft 27ᵃ, running preferably to the front of the machine and journaled in bearings therein, is or may be provided with a crank handle 27ᵇ by means of which said shaft 27ᵃ may be rotated by an operator; said handle being preferably attached to the outer extremity of said shaft. The inner extremity of said shaft 27ᵃ is or may be threaded and be adapted for engagement with gear wheel 113, which it is adapted to actuate for the purpose stated. Upon movement of the crank handle in one direction the stop may thus be moved in a direction toward impression lever 68 and the distance between them diminished, and upon movement of the handle in the reverse direction, the distance between said elements may be increased. To the end that since the distance of travel of lever 68 determines the force with which the universal typeholder performs the printing operation, it is conceivable that by adjusting the distance between stop 112ᵃ of changeable means 112 and member 68ᶜ of impression control lever 68, the operative force of said universal type holder 6 may be regulated for making a variable impression.

It may be noted that such a device is of advantage for regulating the operative force of the impression mechanism for different thicknesses of paper, or for manifolding a number of sheets at one time. For stencil cutting, it is obvious, the operative force of the impression must be increased, which forces the types to successively strike the stencil paper with sufficient force to cut a perfect stencil. Variable size types require a variable impressing force; a larger type requiring greater impressing force for making the proper impression upon the paper than is required for a smaller type. The changeable means are therefore provided for regulating the operative force of the impression mechanism for performing a variable impression.

G.

*Novel line spacing mechanism controlled from a keyboard.*

I have provided improved line spacing mechanism arranged to be operated from a line spacing key on the keyboard, and means also preferably on the keyboard and in close proximity to the key to restrict the operative movement of said line spacing key for regulating the variable feed of the platen roll. Said line spacing key Lˢ does or may occupy a position on the keyboard adjoining a back spacing key for returning the carriage one step at a time, and a long distance back spacing key arranged to return the carriage either to its initial printing position or to any intermediate position between the final printing point and said initial printing position. The local back spacing key Bˢ is not in direct operative connection with the mechanism provided for returning the carriage one or more steps in the direction of the initial printing point; said key being in operative connection with the long distance back spacing key Rˢ which it is arranged to actuate for returning the carriage one step at a time. When said local back spacing key is depressed it causes the said long distance key to operate the back spacing mechanisms for the returning of the carriage in the direction of the initial printing point, one step at a time. The long distance back spacing key is or may be operated individually of said local back spacing key, or of the line spacing key; said line spacing key being arranged to be operated in unison with said long distance key when it is required to return the carriage to an initial printing position simultaneously with the operation of the line spacing mechanism. The local back spacing key may be actuated in unison with the line spacing key when it is desired to return the carriage a step and to simultaneously operate the line spacing mechanism for feeding a fresh surface of said platen roll into a position for printing a new line. This feature is of some advantage as a time-saving device, when it is required to print vertical borders, or for printing any of the other characters in vertical alinement with each other;—such as a column of figures. In machines now in common use, the method for accomplishing the said object is to first actuate the back spacing key for returning the carriage a step after the first character had been printed and it is desired to print the second character directly underneath and in alinement therewith, and subsequently to the back spacing operation, the line spacing lever upon the carriage must be actuated for operating the line space mechanism. The operation of two mechanisms so far apart before it is possible to actuate the key for printing the character in vertical alinement with a previously printed character, wastes time and taxes the patience of the operator. In the present invention the line spacing and single back spacing operations are performed simultaneously by actuating the corresponding keys in unison with two fingers of one hand, and upon subsequent depression of the required key, the corresponding character is printed in vertical alinement with the previously printed character. Time and energy is thus saved.

Line space key $L^s$ is mounted upon a stem $L^{sa}$, for connecting said key with a line space lever $L^{sb}$ pivotally attached at $L^{sp}$, and having a part thereof extending to the rear of said pivotal point, a spring $L^{sc}$ being preferably attached to said rear part for maintaining the lever $L^{sb}$ in its normal rest position. A link 156 is attached by one extremity to the inner extremity of said line space lever $L^{sb}$, and by its other end to an arm 154 which is or may be pivotally attached at 155. To the free end of said arm 154 is pivoted one end of a link 153, upon the other end of which is mounted a collar 152, which may be provided with anti-friction means $152^a$. A bar 151 is mounted within said collar and adapted for slidable and pivotal movement therein. Said bar 151 connects the two rear extremities of arms 149 and $149^a$; said arms being attached upon a rocker shaft 150 running transversely across the carriage frame and journaled therein. Arm 149 preferably extends a distance beyond and to the front of said shaft 150, and is pivotally attached by its inner extremity to one end of a link $23^a$, the other end of which is pivotally attached to a bell crank lever 23; said bell lever being mounted upon axle 12 of platen roll 4. To the free upper end of said lever 23 is or may be pivotally attached an actuator pawl $23^p$, in operative connection with and adapted to operate line space wheel 22; said line space wheel being keyed to said axle 12 of platen roll 4, and is adapted to feed said roll for printing a new line. A detent roll 148 is attached to one end of a spring $148^a$, the other end of which is attached to the carriage frame or a support thereon. Said line space wheel embraces ratchet teeth cut in its periphery for cooperation with the feed pawl $23^p$ and also for cooperation with said detent 148 for maintaining said wheel in normal rest position. Said detent roll or ball presses against the teeth of line space wheel 22 by the action of its spring $148^a$, and thereby normally maintains said wheel and the platen against movement away from the position they had been delivered to by the operation of the line space mechanism. During the intermittent movement of the carriage, bar 151 is adapted to slide within said collar 152, without operably affecting the line space wheel.

Near its inner extremity and projecting from its lower edge, line space lever $L^{sb}$ embraces tops for limiting the operative movement of said line space key in varying positions. One of said stops $L^{s1}$ being preferably level with the lower edge of said line space lever, and arranged to allow of the operative movement of said line space lever the longest distance required; another stop $L^{s2}$ occupying a position below said stop $L^{s1}$ to allow of the operative movement of said lever a shorter distance; and a stop $L^{s3}$ occupying a still lower position with reference to said lever, allowing of the operative movement of said line space lever the shortest distance. It is conceivable that more or less stops may be provided, and that the said stops may be positioned elsewhere than in the position cited, for restricting the movements of said lever in its operative direction. An adjusting device is or may be provided in close proximity to said line space key on the keyboard for regulating the feed of the platen roll by regulating the operative movements of said line space lever. It is evident that the distance of feed of the platen roll corresponds with the distance of travel of the line space lever in its operative direction.

The said adjusting device embraces a frame 120 preferably mounted upon the machine frame 1, and having a slot $120^c$ and a bearing $120^{a2}$. A hand lever $120^a$ lies within said slot and is pivotally attached to said frame by means of a stud $120^{a1}$ journaled in said bearing $120^{a2}$. Said hand lever has an upper arm for manual manipulation and a lower arm, to the free extremity of which is pivotally attached one end of a link $120^k$, the other end of which link is pivotally attached to a slide $120^d$, mounted in guide supports $120^g$ and adapted for slidable movement within said guides. Projecting from about the middle of its upper edge, said slide has a plate $120^e$ which is or may be vertically disposed thereto, and carries upon its upper extremity, an indicator $120^b$; said plate $120^e$ lying within said slot $120^c$ and arranged to move along said slot with the movements of said slide upon which it is mounted. A scale 1—2—3 shows the position to which said indicator $120^b$ must be delivered for varying the degree of feed of the platen roll; 1 designating platen roll feed for single spacing; 2, for double spacing; and 3, for triple spacing. These are arbitrary positions and are shown only by way of illustration and not with the object of limiting myself. A projection $120^f$ projects from the inner face of slide $120^d$, and is or may be disposed substantially vertical thereto, and is adapted to move in the direction of movement of said slide. Said projection $120^c$ normally occupies a position directly under the anterior extremity of the line space lever and a definite distance away therefrom and is in operative association with said stops. When the hand lever $120^a$ is actuated for moving the indicator to 1 on the scale, the adjusting device moves into position to deliver projection $120^f$ directly under and in operative position with reference to stop $L^{s3}$ upon the line space lever. To the end that when the line space key is depressed, its operative movement is limited to the distance between lever stop $L^{s3}$ and projection $120^f$—the shortest distance of travel, and arranged to feed the platen roll a distance for single spacing. When by the operation of the hand lever, indicator $120^b$ points to 2 on the scale, projection $120^f$ is brought into operative position with reference to stop $L^{s2}$, which allows of double spacing; and when the indicator points to 3 on the scale, the projection $120^f$ occupies a position directly underneath highest stop $L^{s1}$ to allow of the operation of the line space mechanism for triple spacing. It is evident therefore, that operation of the hand lever of the adjusting device delivers its stop projection in variable positions with reference to the stops of the line space lever and cooperates with each and any of them for restricting the operative movement of said line space lever and for regulating the variable feed of the platen roll. It is further obvious that the position of the adjusting device in close proximity to the line space lever allows of rapid adjustment of the device and operation of said line space lever. Said adjusting slide $120^d$ is or may be provided with ratchet teeth $120^t$. A detent roller or ball mounted in one end of a spring $120^p$ and constituting a pawl, presses against said ratchet teeth and thus maintains said slide and the adjusting stop $120^f$ in the position to which they had been delivered by the operation of handlever $120^a$.

H.

*Local and long distance back spacing backspacing mechanism controllable from a keyboard.*

Local back spacing key $B^s$ is connected to back spacing lever $B^{s1}$ through stem $B^{sa}$; said lever being pivoted on a shaft $B^{rs}$ running transversely across the machine frame or between supports on said frame. There is no direct operative connection between said back space lever $B^{s1}$ and any of the mechanisms for directly operating the back-spacing devices. The back space lever $B^{s1}$ embraces at its anterior extremity a projection $B^{s2}$ preferably disposed at an angle thereto. The long distance back space key $R^s$ occupies preferably an adjoining position to said back spacing key $B^s$, and is connected by means of a stem $R^{sa}$ with a lever $R^{s1}$ pivoted at $R^{s4}$, a part of said lever extending to the rear of said pivotal point; said rear member of the lever being in operative connection with all of the mechanisms for back spacing the carriage one or more steps at a time. A spring $R^{sp}$ is adapted to maintain lever $R^{s1}$ and long distance key $R^s$ in normal rest position. Projecting from its lower edge and at an angle thereto, the said lever $R^{s1}$ is or may be provided with a plate $R^{s2}$ at its anterior extremity; said plate $R^{s2}$ being adapted to bear up on projection $B^{s2}$ of said local back space key $B^s$, and tends to maintain said back space lever $B^{s1}$ and its key in normal rest position by the action of spring $R^{sp}$ maintaining lever $R^{s1}$ in such position. A changeable stop $B^{s4}$ is or may be positioned in the path of arm $B^{s3}$ of back space lever $B^{s1}$ or in any other position suitable for restricting the operative movement of said local back space lever. To the end that when said local back space key is depressed, it causes the long distance back spacing key to move in its operative direction, a distance equal to the normal distance between local back space lever $B^{s1}$ and its stop $B^{s3}$; said operation being performed by causing projection $B^{s2}$ to bear down on plate $R^{s2}$ against the action of spring $R^{sp}$. Upon release of the local back space key, the said spring causes the long distance back space key to return to normal rest position, and by means of its plate $R^{s2}$ cooperates with projection $B^{s2}$ upon the back space lever $B^{s1}$ for the returning of said lever and the local back space key to normal rest position and for maintaining said key in such position.

A rocker shaft 158 runs transversely across the carriage frame and is journaled therein. Arms $16^c$ and $16^d$ are attached to said rocker shaft, one near each extremity thereof. A bar 16 connects the free ends of said arms $16^c$ and $16^d$, and has attached to its posterior edge, preferably, a rack $16^a$ which is or may be positioned upon its upper surface and disposed vertically thereto. Running longitudinally along said bar 16 and preferably projecting from about the middle of its lower surface, said bar 16 embraces another rack $16^b$, which divides the rack into two parts longitudinally, an anterior and a posterior part. Said rack $16^b$ is meshable with and normally in engagement with escapement bar 71. Rack $16^a$ is meshable with and normally not in mesh with a ratchet wheel 18. Said ratchet wheel is or may be mounted for revoluble movement upon the machine frame 1; said ratchet wheel being keyed to a shaft which it is adapted to drive and by means of which shaft it may be driven, when said shaft is driven by another toothed wheel 17 keyed upon said shaft $18^a$ journaled in the machine frame or in a support thereon. Said ratchet wheel 17 preferably has teeth cut in its periphery. A bar 132 having a tooth $132^t$ is forced to press against said ratchet wheel by means of a spring $132^{sp}$ for maintaining said tooth $132^t$ normally in engagement with the teeth of said ratchet wheel. Said pawl tends to allow of the revoluble movement of said ratchet wheel 17 in one direction, and tends to prevent its revoluble movement in the reverse direction. Means are provided for disengaging said pawl from said ratchet wheel to allow its revoluble movement in said reverse direction when required, as during the operation of the tabulating keys. Upon a frame 19$^a$ is mounted an arcuate ratchet 19, engageable with and normally disengaged from said toothed wheel 18. Said frame 19$^a$ is keyed to a short shaft 19$^{sh}$, journaled loosely in a recess or bearing in the machine frame, to allow of the movement of said arcuate ratchet 19 into and out of engagement with said wheel 18. A flange 19$^{fl}$ on the outer end of short shaft 19$^{sh}$ and a collar 19$^k$ upon said shaft maintain said shaft in operative engagement with said recess or bearing 1$^v$; an opening 1$^{v2}$ being left in said recess, to allow of the movement of said shaft in a direction for delivering the arcuate ratchet in engagement with said wheel 18, and further allow of its pivotal movement therein subsequently to the engagement of said arcuate ratchet with said toothed wheel.

Said arcuate ratchet and its frame 19$^a$ are or may be positioned to the rear of the double carriage rack 16$^a$—16$^b$. A stud 19$^b$ is or may be fixedly mounted in frame 19$^a$; said stud being in engagement with rack bar 16 and positioned underneath said bar and to the rear of rack 16$^b$. Stud 19$^b$ is adapted for moving rack 16$^b$ out of engagement with the escapement bar 71 and to deliver rack 16$^a$ into instant engagement with toothed wheel 17, when by the operation of the back space keys, arcuate ratchet 19 is moved by its frame 19$^a$ into engagement with wheel 18 for operating shaft 18$^a$ and thereby force ratchet wheel 17 to cooperate with rack 16$^a$ for returning the carriage one or more steps. During said back spacing of the carriage 2, rack bar 16 moves slidably along said stud 19. To facilitate the movement, anti-friction means, such as a wheel 19$^{b1}$ may be rotatably mounted on said stud. A spring 19$^{sp}$ tends to maintain said rack and frame 19$^a$ in its normal position with reference to said toothed wheel 18, and tends to return said rack frame to its retracted rest position subsequently to the back spacing operations. A bar 139 is pivotally mounted on said shaft 19$^{sh}$ and is adapted to move said shaft in the direction within its loose bearing 1$^{v2}$ for delivering rack 19 into engagement with toothed wheel 18. A link 140 is pivotally attached by one end to said actuating bar 139, and by its other end it is pivotally attached to a bar 140; said bar 140 connecting two arms 141 and 141$^a$ which are keyed to a rocker shaft 143 running transversely across the machine frame and journaled therein or in supports thereon—one arm near each extremity thereof. Arm 141 preferably extends a distance beyond its connecting point with bar 142. A lever 160 is pivotally attached to back space lever R$^{s1}$ at $x$, and embraces two arms;—one, 160, above said pivotal point; and the other arm, 160$^a$, below said pivotal point. Said upper arm 160 embraces a guide 160$^c$ at its free extremity for effecting operative engagement of the lever 160 with arm 141 which it is adapted to actuate. A stud 160$^b$ in said arm 160$^a$ of lever 160 is adapted to be received in a cam slot 161$^a$ in plate 161 attached to the machine frame. Said stud and slot are arranged to cooperate for guiding the movement of lever 160 and force said lever to operate arm 141 for delivering rack 19 into engagement with wheel 18, and during the operation of said rack and wheel for back spacing, said stud and slot tend to maintain said lever 160 in operative engagement with said arm 141, to move along said arm, for maintaining said arm and rack 19 in their respective operative positions, while other means are actuated by back space lever R$^{s1}$ to force said rack 19 to perform the back spacing operations.

A link 138$^c$ is pivotally attached by one end to said lever R$^{s1}$ and by its other end to another lever 138$^b$, the other end of which is pivoted to a lever 138 pivotally attached at 138$^a$. Another link 137 pivotally connects lever 138 with an arm 136 keyed to a rocker bar 135 journaled in bearings on the machine frame. To the other end of said bar 135 is keyed an arm 134, in the free end of which is fixed a stud or projection suitable for actuating 19$^a$; said stud being normally not in operative engagement with said frame, and being adapted to move into operative engagement therewith subsequently to the reciprocating of rack 19 into engagement with wheel 18, when by the continued depression of the back space key that may be operated, said stud forces rack frame 19$^a$ to move in a direction for performing the back spacing operation.

The operation is as follows:

When the long distance back space key R$^s$ is depressed, it causes lever 160 to move arm 141 into operative position for impelling actuating bar 139 in a direction to move rack 19 into engagement with wheel 18 and thus rack 16$^a$ with wheel 17. During this reciprocating operation, lever R$^{s1}$ also actuates through said links and levers in operative connection therewith, said arm 134, for delivering said arm and its stud into operative position with reference to said rack frame 19$^a$, and upon continued depression of said finger key, the said arm 134 is forced to move said rack frame in a direction for operating wheel 18 and thereby causing ratchet wheel 17 to cooperate with carriage rack 16$^a$ for returning the carriage to the initial printing position or to any intermediate point depending upon the distance to which said finger key is moved in its operative direction. During said operation of rack frame 19ª, said lever 160 continues to move along arm 141 without exercising any operative effect thereon, functioning only as a means for maintaining said rack 19 in engagement with wheel 18, and carriage rack 16ª in engagement with ratchet wheel 17, during the back spacing operations. The back spacing operations are performed against the action of spring 19ˢᵖ which is thus placed under tension. When the finger key Rˢ is released, the initial retracting movement is the returning of arm 134 to normal rest position, while said rack frame 19ª and rack 19 remain in the operative position to which they had been delivered, and are locked against reverse movement by the engagement of said rack 19 with said wheel 18 during the maintaining operations of lever 160. During said retracting of arm 134, lever 160 is also being returned to normal rest position; said lever releasing arm 141 when it reaches its retracted state, and under the impulse of a spring 143ˢᵖ rocker shaft 143 is forced to return arm 141 to normal rest position, and thus cause bar 142 to retract actuating bar 139 for returning said rack frame 19ª to normal rest position and thus disengaging rack 19 from wheel 18. Spring 19ˢᵖ, having been held under tension, now that rack 19 is released from wheel 18, causes said rack frame 19ª to return to retracted rest position. When subsequently to the back spacing operations, arm 134 is returning to its normal rest position, and thus releases rack frame 19ª, said rack frame and its rack continue to remain in their operative position against the action of spring 19ˢᵖ which has a tendency to move it toward and maintain it in its normal rest position, until said rack is moved out of engagement by the releasing of its reciprocating means. The object of such an arrangement is, that the pawl 132 allows of the revoluble movement of wheel 17 in a direction for performing the back spacing operations, but locks said wheel against movement in the reverse direction. To the end that when said back spacing rack 19 had been impelled into the operative position for performing said back spacing operation, it remains locked against reverse movement by the action of pawl 132 tending to prevent reverse movement of wheel 17, and not until said back space rack 19 is released from engagement with wheel 18, can it return to rest position under the impulse of said spring 19ˢᵖ. If rack 19 were allowed to return to rest position before its disengagement from said wheel 18, spring 19ˢᵖ in returning frame 19ª to normal rest position would force the back spacing rack to undo the operation it had performed by reversing the revoluble movement of ratchet wheel 17 and thereby causing said wheel to cooperate with rack 16ª for again returning said rack to its original position. But in postponing the retracting operation of said rack frame 19ª until said frame is allowed to disengage rack 19 from wheel 18, and thus allows of the disengagement of rack 16ª from wheel 17 for instantly engaging rack 16ᵇ with the escapement bar, the operation of the machine mechanisms as controlled from the keyboard may be resumed, and the operation performed by the back spacing mechanisms remains undisturbed.

In operating the long distance back space key, said key may be moved in its operative direction a distance sufficient for returning the carriage to the desired printing point. It may be returned but one step or an entire series of steps at one time, up to a full line—to the initial printing point. For back spacing one step at a time, however, it is more advisable to use the back space key provided for that purpose. Upon depressing said key a distance up to stop Bˢ³, it causes said long distance back space key to move a similar distance in its operative direction, for delivering rack 19 into engagement with wheel 18 and for thus delivering carriage rack 16ª into engagement with wheel 17, and to subsequently move said rack a distance sufficient to move the carriage back one step. When it is desired to simultaneously return the carriage to the initial printing position and to deliver a fresh printing line of said platen roll into printing position, said key Rˢ may be operated simultaneously with key Lˢ. Likewise, with the back space key, as has been fully described herein.

The said changeable stop Bˢ⁴ is mounted on a guide support 1ᵇˢ and is operably connected with the means for adjusting the carriage feed mechanism for producing a variable spacing. A threaded shaft 118ᵇ is mounted to rotate in recess in stop Bˢ⁴ and is arranged to be operated by a wheel 118ª on the shaft 117, to the end that both the forward and backward spacing mechanisms may be adjusted in unison for producing variable forward and backward spacing.

I.

*Improved tabulating mechanism controlled from a keyboard.*

Without a tabulating mechanism a typewriting machine is not complete. In the commercial world such a mechanism occupies a position of importance not inferior to that occupied by any of the other important elements that enter into the make-up of a good typewriter. I have therefore provided my machine embodying the present invention, with a tabulating device, and more particularly with a device of that kind that is capable of arresting the carriage at predetermined points in its travel with the greatest speed possible, that is positive in its action, and not likely to get out of order, and that is preferably controlled from a keyboard by a plurality of keys, each key corresponding to a position at which the tabulating device cooperates with a stop for arresting the movement of the carriage. I have attempted to simplify the construction of this device, and thus increase the efficiency thereof.

I have provided marginal stops 14 and 14$^d$, one at each end of the tabular rack 13. Said rack embraces notches for receiving a pawl 15 attached to each stop for normally maintaining said stop in the position required. A scale on said tabular rack corresponds with the markings of a scale preferably positioned in front of the platen roll, and the arrest of movement of the carriage at a certain marking on the scale of said tabular rack is indicated by an indicator 3$^a$ on the carriage pointing to a corresponding marking on the scale 5 at the front of the platen roll. Said marginal stops may therefore be set at a predetermined point on the tabular rack for leaving margins at either edge of the paper corresponding to the markings selected on the scale 5.

Besides said marginal stops, one or more tabular stops may be mounted for movement on said tabular rack. Three such stops are shown: 14$^a$, 14$^b$ and 14$^c$ positioned at definite points on said tabular rack 13. However, the number and their position are given only by way of illustration and not by way of limitation.

I have so arranged that the two marginal stops are of equal height and a step taller than the tallest of the tabular stops; the said tabular stops being of different heights;—increasing gradually a step in height. The first tabular stop is or may be the shortest, the second a step taller, the third a step taller than the second one; and finally, the right marginal stop, a step taller than the third tabular stop.

A tabular bar 20 is mounted in an actuating frame 21, and is adapted for slidable movement therein; means may be provided for counteracting friction. Said tabular bar embraces a projection 20$^b$ at its upper extremity; said projection preferably extending anteriorly thereto and is adapted to occupy a position directly over the tabular rack and a definite distance away from said rack. A stop 20$^c$ extends from the anterior edge of said projection 20$^b$ and when said tabulating bar occupies its normal position of rest, said stop 20$^c$ is adapted to cooperate with only the right marginal stop for arresting the movement of the carriage at a point corresponding to said marginal stop, and does not come into operative contact with any of the tabular stops. When the carriage is returned to the initial printing position, said stop 20$^c$ again cooperates with the left marginal stop for arresting the movement of the carriage at that point, and again avoids contact with any of said tabular stops; said stop 20$^c$ when in its normal rest position occupying a higher plane than the tallest of the tabular stops and a lower plane than the top of said marginal stops. To arrest the movement of the carriage in its operative direction by the tallest of said stops 14$^a$, the said bar 20 must be caused to descend for bringing said stop 20 to a level below the top of said stop 14$^a$ and above the next tabular stop 14$^b$; then upon the releasing of the carriage by said tabular devices as controlled from the keyboard, said stop 20$^c$ will coact with stop 14$^a$ for arresting the carriage movement at that point. Likewise, for arresting the carriage movement at stop 14$^b$, tabular bar 20 must descend to bring stop 20$^c$ to a level lower than that occupied by the top of stop 14$^b$, and higher than the top of stop 14$^c$, when the movement of the carriage will be arrested by the cooperation of stop 20$^c$ with tabular stop 14$^b$. For arresting the carriage movement at tabular stop 14$^c$, tabular bar 20 must descend the distance for delivering stop 20$^c$ to a level lower than the top of said stop 14$^c$, when the movement of the carriage will be arrested by the cooperation of said stops 20$^c$ and 14$^c$. As said stop 20$^c$ and the tabular and marginal stops are faced with or are entirely composed of matter, such as fibre, that tends to deaden the noise of impact of said structures, the tabulating operations are rendered as noiseless as possible.

The said tabular bar 20 is actuated by means controlled from the tabulating keys on the keyboard, namely, S$^1$, S$^2$ and S$^3$. Said tabular key S$^1$ may control the arrest of movement of the carriage at tabular stop 14$^c$; key S$^2$ controls the mechanism for arresting the carriage movement at tabular stop 14$^b$; and key S$^3$, for arresting the carriage movement at tabular stop 14$^a$. To the lower extremity of tabular bar 20 is pivotally attached one end of a link 129, the other end of which link is attached to an arm 128, attached to a rocker shaft 124, journaled in the machine frame or in supports thereon. A spring 124$^{sp}$ thereon tends to maintain said rocker shaft 124 in normal rest position, and thus arm 28 and tabular bar 20 is maintained in normal position of rest by the action of said spring. Upon said rocker shaft are or may be also mounted shaft actuator arms 121, 122 and 123, which are adapted for individually rocking said shaft 124 against the action of its spring 124$^{sp}$ to cause arm 128 to deliver stop 20$^c$ into cooperative position with reference to the tabular stop for arresting the carriage movement at the point controlled by the operations of the corresponding shaft actuator arm. Each shaft actuator arm is provided preferably with an arm extending preferably to the rear of said shaft 124 for arresting the operative movement of said arm. Arm 123 embraces stop arm 123$^a$; 122 has stop arm 122$^a$; and 121 has a stop arm 121$^a$. A stop 127, attached to the machine frame, embraces three steps on different levels; highest step 127 coacting with stop arm 123$^a$ for arresting the operative movement of arm 123, and thereby arresting the descending movement of tabular bar 20; and steps 127$^a$ and 127$^b$ being adapted to respectively cooperate with arms 127$^a$ and arms 127$^b$ for arresting their respective operative movements for a similar purpose. Key S$^1$ is connected with tabular key lever S$^a$, pivoted at S$^{a2}$, maintained in normal position of rest by a spring S$^{a1}$, and has an actuating arm extending to the rear of its pivotal point; said arm being in loose operative engagement with shaft actuator arm 121 which it is adapted to operate for delivering stop 20$^c$ of tabular bar 20 into cooperative position with reference to tabular stop 14$^c$ to arrest the carriage movement at that point. Tabular key S$^2$ is connected with a lever S$^b$ pivoted at S$^{b2}$ and having an arm to the rear of said pivotal point which is or may be in loose operative connection with shaft actuator arm 122, and it is adapted to actuate said actuator arm for delivering tabular stop 20$^c$ of tabular bar 20 into cooperative engagement with stop 14$^b$ on tabular rack 13 for arresting the carriage movement at that point. Tabular key S$^3$ is connected to a lever S$^c$ pivoted at S$^{c2}$ and having an actuating arm extending to the rear of said pivotal point which is in loose operative connection with shaft actuator arm 123 which it is adapted to actuate for delivering said stop 20$^c$ of tabular bar 20 into cooperative position with reference to stop 14$^a$ for arresting the carriage movement at that point.

Subsequently to the operation of said tabular bar and the delivering of said stop 20$^c$ into the operative position controlled by the tabular key operated, means must be operated for releasing of the carriage rack to allow of the movement of the carriage by its power means, a distance, until said movement is arrested by the cooperation of the tabular stop and stop 20$^c$. A rocker shaft 125, running transversely in the machine frame and journaled in bearings therein or supports on said frame, is maintained in normal rest position by means of a spring 125$^{sp}$. Arms 125$^a$ and 125$^b$ are attached to said shaft, one near each extremity thereof, and are connected at their free ends by a bar 126, which occupies a position directly overhanging the rear extremities of levers S$^a$, S$^b$ and S$^c$, with which said bar is normally not in contact. A link 131 is pivoted by one end on said bar 126, and by its other end to a pawl and rack actuating bar 130. Said bar 130 embraces a projection at its upper extremity in operative contact with said pawl and is adapted to disengage said pawl from ratchet wheel 17; and it further embraces preferably an actuator wheel 130$^c$ mounted on a projection 130$^b$ thereon; said wheel 130$^c$ being in operative contact with the lower surface of rack bar 16 and lying preferably to the front of rack 16$^b$. To the end that when the said pawl rack actuating bar is actuated, its wheel 130$^c$ and its projection 130$^a$ respectively move rack 16$^a$ into engagement with wheel 17 after disengaging same from the escapement bar, and simultaneously disengage rack 132 from said wheel 17 to allow of the movement of the carriage by its power means, a distance, until its further progress is arrested by the cooperation of the stop 20$^c$ with the tabular stop with which it had been delivered into cooperative position.

I$^2$.

I have provided a margin release key MR to allow of printing operations beyond the marginal stops; said key being in operative connection with frame 21 wherein tabular bar 20 is mounted for slidable movement. Said frame is mounted upon a rocker shaft 144 journaled in a bearing in the machine frame. An arm 145 is attached to the shaft by one end, and is pivoted by the other end to a link 146, the other end of which link is pivotally attached to the rear extremity of margin release lever MR$^1$, pivoted at MR$^2$, and maintained in normal position by means of a spring MR$^s$; said lever being connected by means of a stem with said margin release key MR. Lever MR$^1$ is in operative connection with universal bar 52 and is arranged to operate said bar for actuating the various mechanisms of the machine whose operation is controlled by said universal bar, and simultaneously with the operation of the universal bar, said lever MR$^1$ operates arm 145 through link 146 for rocking shaft 144 and thereby force frame 21 to move tabular bar 20 and its stop 20$^c$ out of the path of movement of marginal stops 14 or 14$^d$, to allow of the printing beyond the marginal point. When the margin release key is then released, the universal bar and the mechanisms controlled thereby return to normal rest position and said tabular and its stop 20$^c$ return to normal rest position—in operative relation with tabular rack 13 and the stops thereon. Since the tops of the marginal stops occupy a higher plane than stop 20$^c$ of the tabular bar 20, said stop 20$^c$ would cooperate with the marginal stop for preventing the return of the carriage. To obviate this contingency, I have provided the stops 14 and 14$^d$ with a beveled edge 14$^t$ with which upon the returning of the carriage, stop 20$^c$ cooperates for moving said stop 20$^c$ and the tabular bar out of the path of movement of the marginal stops, and after stop 20$^c$ again occupies a position to the inner side of said stops 14 and 14$^d$ it returns into operative position with reference to rack bar 13.

J.

*A power operated spacing device for moving the carriage one step at a time in its direction of travel.*

A space bar 58 is connected by means of stems 58$^b$ with a spacing control lever 58$^a$ pivoted upon a bar 57$^s$. A power operated lever 42$^s$ is pivoted at 42$^s$ and has a part extending beyond said pivotal point, terminating in an extremity 42$^{s1}$ bearing a stud 42$^{s2}$ which is or may be received into a slot 101$^d$ in a cam 101$^c$ which is connected to a stop lever 101 pivoted at 101$^b$ and having a projection or tooth 101$^a$. A spring 43$^s$ tends to move lever 42$^s$ away from its normal position wherein said lever is maintained by a detent 56$^s$ against the action of said spring; said detent being in operative connection also with spacing control lever 58$^a$. Detent 56$^s$ embraces the double function of supporting both lever 42$^s$ and lever 58$^a$; the latter of which it is arranged to return to normal position of rest when said space bar 58 is released. The construction and operation is similar to that of the other power operated means. Upon depression of space bar 58, lever 58$^a$ causes the detent to release lever 42$^s$, and spring 43$^s$ operates said lever for projecting stop lever 101 into the path of movement of impression control lever 68, and said lever 42$^s$ simultaneously operates universal bar 52 for actuating the various mechanisms of the machine controlled thereby, and thus moving the carriage a step at a time without performing any printing operations. During said operations, lever 42$^s$ tends to maintain stop lever 101 in its operative position for preventing operation of lever 68 by spring 100, and during the intermittent movement of the carriage, the operation of the retracting devices causes said lever 42$^s$ and the other mechanisms to be returned to normal rest position, and stop lever 101 to move out of engagement with impression control lever 68.

When the said space bar is released prior to the completion of the retracting operations, operating lever 42$^s$ is forced by the operations of the retracting mechanism to return into engagement with detent 56$^s$ against the action of spring 43$^s$ which is thus placed under tension. If the space bar is not released prior to the completion of the retracting operations, power lever 42$^s$ cannot and does not engage with its detent, and the spring having been placed under tension by the operations of the retracting devices, subsequently to the release of said lever by the retracting means, said spring 43$^s$ repeats the operation of said lever 42$^s$ and the various mechanisms in operative connection therewith, for moving the carriage another step without performing any printing operation. To the end that by retaining the finger on space bar 58, or depressing same by any other method, one can repeat the spacing operations, for moving the carriage in its operative direction, one step at a time, without the necessity for re-operating said space bar. An entire line of single step spacing movements of the carriage may be performed without lifting the finger from the space bar. This feature of the machine embodying my invention operates as a time and energy saving device.

J$^2$.

*The inking system.*

Any suitable inking mechanism may be applied to the machine embodying the present invention: such as an inking ribbon or a pad, or the like. The preferred inking device is one of the type commonly applied to printing machines, and which is disclosed in my two co-pending applications, filed respectively November 10th 1919, and January 10th 1920, and of which the respective serial numbers are, 336,810 and 350,519. The present invention is more particularly an improvement on the latter of said inventions, as it is or may be a multi-color inking mechanism arranged to cooperate with the other mechanisms of the machine for inking the types as they approach the printing position. The inking mechanism in the present invention differs from the previous invention in some of the details of construction.

The said inking device embraces a frame 66 mounted for shiftable movement on a track T$^r$. A link 26$^d$ is pivotally attached to the frame by one end, and by its other end it is pivotally attached to an arm 26$^c$ upon a rocker shaft 26$^a$, running preferably to the front of the machine and journaled in a bearing 1$^r$ in machine frame 1. Upon the outer extremity of shaft 26$^a$ is mounted an arm 26, to which keys 26$^b$ and 26$^r$ are connected; said arm being mounted at about its middle, and said finger keys, one at each extremity of said arm. To the end that depression of one finger key tends to move said frame 66 a distance in one direction, and depression of the other finger key tends to move it in the reverse direction.

A fountain F, divided into two separate chambers, constituting two separate fountains, is mounted in said frame 66; said fountain being arranged to carry different colored inks, a different colored ink in each compartment,—F¹ and F². Fountain rolls, F³ and F⁴ are mounted in said fountain and adapted for intermittent rotation therein; said fountain rolls being mounted upon a shaft F^{r2} journaled in the lateral standards of the fountain, and carrying a toothed wheel F^{r1} which coöperates with means in operative connection with and controlled from a keyboard, for intermittently rotating said rolls, and thus conveying ink from the fountain to an inker, a different colored ink being conveyed by each fountain roll. A distributing cylinder 59, having two sections or two separate cylinders C^a mounted upon a common shaft C², is mounted for revoluble movement upon flanges 66^a and 66^b upon said frame 66. Connected with said cylinder is a cylindrical member embracing a grooved collar $c^1$ preferably running obliquely around its circumference. Said sectional cylinder is arranged to cooperate with other members of the inking mechanism for smoothing out the ink evenly during the inking operations, each section of said cylinder cooperating with a corresponding section of another member for smoothing out said inks. A sectional distributer roll D^{ra}—D^{rb} is operably connected with a slidable member D^r. Rolls D^{ra}—D^{rb} are mounted for rotatable movement upon a shaft D^s, said slidable member being mounted upon a substantially square portion D^{s1} of said shaft D^s, and is adapted to slide a distance along said shaft D^s. A stud D^{r1} in said slidable member D^r is or may be adapted to be received in said grooved slot C¹ of distributing cylinder 59, and is arranged to cooperate therewith for imparting a to and fro movement to said distributer rolls—that is, to slide said rolls back and forth on said shaft D^s during the rotation of said distributer rolls by frictional contact with the rotating cylinder.

Two sectional inkers I, are shown mounted upon separate shafts, two corresponding sections of said inkers being in operative contact with a corresponding section of said distributing cylinder, and the other two sections, in operative contact with the other section of said cylinder. Each pair of sections of said inking rolls having different colored inks, and conveying said inks to their corresponding distributing cylinder for smoothing out the inks during the operation of the inking mechanism. Each inker is practically composed of two separate rolls mounted upon the same shaft, and each corresponding pair of rolls are adapted to carry different colored inks, a different colored ink on each pair of corresponding rolls. The said inkers I may be of similar structure to that of said distributer roll D^r and may thus be adapted for a combined rotary and slidable to and fro movement along their corresponding shafts.

The modified type of mechanism shown in Figure 98, is or may be of a construction similar to that shown in my copending application, filed January 10th 1920, Serial No. 350,519. As shown, it embraces a fountain, a fountain roll for conveying different colored inks from said fountain, a distributing cylinder and an inker for different colored inks in frictional contact with said cylinder. In Figure 97 is shown another type of inking system, including in addition to the above elements, a distributer roll D^r, and an extra inker, I, in operative connection with the other inker; both of said inkers being in frictional contact with said cylinder, and being adapted to ink the types as they severally approach the printing position.

Upon a shaft F^c running through a bearing in the cylinder, and journaled in bearings in the frame 66, is mounted a cam F^{c1}, to one end of which is pivotally attached a link 65^{a2}, the other end of said link being pivoted to an arm 65^{a1} upon a shaft 65^a journaled in bearings in frame 66 or in both said frame and the machine frame. To the other end of said shaft is keyed a toothed wheel 65, in mesh with a toothed spur wheel 64. Said wheel 64 is or may be of smaller diameter than wheel 65, and of a thickness sufficient to allow of the shifting of the inking mechanism without moving wheel 65 out of operative connection with said wheel 64. Wheel 64 is also mounted upon a shaft 64^a, and is adapted to operate wheel 65 and said shaft 64^a, to the other end of which is keyed another toothed wheel 63 preferably of larger diameter than wheel 64, and adapted to be driven by shaft 64^a when said shaft is driven by spur wheel 64. Wheel 64 is in turn in mesh with a toothed wheel 62 which it is adapted to drive. Wheel 62 is also of a thickness to allow of maintaining said wheel 62 and said wheel 63 in operative engagement with each other during the shifting operations, and is keyed to a shaft 62^a which it is adapted to drive. To the other end of said shaft is keyed another toothed wheel 61 engaging with another wheel 60 upon distributing cylinder. Said shaft 62^a is arranged to drive wheel 61, for revolubly moving said distributing cylinder. Shafts 62^a and 65^a are arranged to move longitudinally with the shifting of the inking mechanism, and causing their respective wheels, 62 and 65 to move longitudinally along their corresponding wheels with which they are in engagement, and without moving out of operative engagement with said wheels.

A lever, pivoted at 46^a, has an arm 46^c extending to the rear of said pivotal point, and an arm 46^b to the front thereof. An arcuate ratchet 46 is mounted upon the inner extremity of said arm 46^c, and is in operative engagement with spur pinion 64, which it is adapted to actuate, for operating the different members of the inking mechanism. To the free end of arm 46ᶜ is pivotally attached one end of a link 45, the other end of which is pivotally attached to an operating lever 44, pivoted at 44ᵃ, and having an anterior arm 44ᵇ and a posterior arm 44ᶜ. A spring 47 tends to move said lever 44 away from its normal rest position, and is normally held under tension, by means of a detent 54 pivoted at 54ᵇ. One arm of said detent 54 occupies a position in supporting relation to lever part 44ᵇ, for maintaining said lever 44 in normal rest position with spring 47 held under tension; said arm also maintaining said position in operative relation with universal bar 52, and is adapted to be actuated thereby for releasing said lever 44, during the operations of the various mechanisms of the machine as controlled from a keyboard. The other arm of said detent 54 is spring pressed, a spring 55 tending to maintain said arm, and thus the detent in its operative position with reference to said lever 44 and also with said universal bar 52. A stop 54ᵃ prevents movement of the detent beyond its operative position. The rear extremity of said operating lever 44 is or may be positioned directly under retracting bar 48, which is adapted to bear down upon said lever 44 and cooperate therewith for the returning of said lever to normal rest position against the action of spring 47, and into engaging position with reference to detent 54. Simultaneously with the retracting of lever 44 to its normal position of rest, the said retracting mechanism causes lever 42 also to return to its normal rest position, and into engagement with its detent 56, as has been fully set forth herein.

The operation of the type of machine shown in Figure 9, is as follows:

Upon the depression of a finger key 57ᵇ, key lever 57 causes the release of lever 42, and allows spring 43 to impel lever 42 in a direction for reciprocating type carrier 8 into operative position with reference to type feeder 35. Simultaneously with this reciprocating movement, lever 42 actuates universal bar 52. As said bar descends, it actuates detent 54 for releasing lever 44, to allow said lever 44 to operate the inking mechanism for delivering its inker into inking position. As said universal bar continues it movement, subsequently to the releasing of lever 44 and the delivering of the retracting device 48 into operative position, it first causes escapement pawl 99 to move into engagement with the carriage rack to lock said rack against movement, and releases the impression control lever 68, to allow its spring 100 to impel said lever in a direction for actuating type feeder 35 for moving the type into operative position with reference to the universal type holder. The inker is adapted to arrive at the inking position as said type is being carried by the feeder past said inking position and into said operative position. The final operation of said impression control lever, subsequently to movement of the type into operative position and after they had been inked, is to force said universal type holder to perform the printing operation. Continuing its movement in an operative direction, said universal bar causes the escapement bar to be moved out of engagement with carriage rack 16ᵃ and into engagement with the device for retracting the impression control lever for the retracting of said lever, under the impulse of spring 94. The final step in the operative movement of the universal bar, as it is being actuated under the impulse of power operated lever 42 is, to cause the successive releasing of arms 104ᵃ and 103ᵃ to allow of the retracting operations of the other mechanisms, all as has been fully described herein.

In Figure 10 is shown a machine of the type disclosed in my co-pending application, filed November 5th 1919, Serial No. 335,857. The present machine is an improvement in that it embraces the power operated means for actuating the various mechanisms of the machine as controlled from a keyboard, such as has been described herein. The types are delivered in a similar manner to that described in my previous invention, and likewise with the impression bar, and its manner of performing the printing operation. But the spring operated means are similar to that described in type of machine shown in Figure 9, and require a similar retracting mechanism for returning the mechanisms to normal rest position.

Figure 11 shows a positive acting machine of the type shown in Figure 9, wherein the operations are performed direct from finger keys. No spring powered operating levers are employed—a key lever 57 operating the different mechanisms of the machine upon being actuated by the depression of the key.

Having thus fully described this invention, what I claim as new and desire to secure by Letters Patent, is:

1. In a typewriting machine, a universal type holder, types adapted to be severally received by said type holder, means for delivering said types, one at a time, to said holder, and mechanical means controllable from a keyboard for actuating said universal type holder and forcing said holder to move the type into printing position for performing the printing operation.

2. In a typewriting machine, a universal type holder, a feeding device, types movable to a common point within said feeding device, and means controllable from a keyboard causing said feeder to convey the type to said holder, and for subsequently forcing said type holder to perform the printing operation.

3. In a typewriting machine, a universal type holder, a feeding device adapted to feed types, one at a time, to said type holder, a series of types movable to a common position within said feeder, and means controllable from a keyboard for causing said feeding device to deliver types successively to said holder, and for subsequently operating said type holder to force said holder to perform the printing operation.

4. In a typewriting machine, a universal type holder, a type feeder adapted to feed individual types to said holder, a series of types movable severally to a common point into said type feeder, means for reciprocating said types, one at a time into said type feeder, and mechanical means controllable from a keyboard for primarily moving said feeder into operative position within said holder, and for subsequently causing said holder to carry said type delivered thereto by said feeder into a position for performing the printing operation.

5. In a typewriting machine, a universal type holder, a feeding device mounted in said holder and adapted for movement therein, a series of types movable to a common position within said feeding device, means for delivering said types, one at a time, into said feeding device, and mechanical means controllable from a keyboard, for moving said feeding device with the type therein, a distance within said type holder, and subsequently thereto to cause said universal type holder to move said type into printing position for performing the printing operation.

6. In a typewriting machine, a universal type holder, a type feeder movably mounted therein, a series of types movable to a common point, means for delivering said types individually to said common point within said type feeder, and means controllable from a keyboard for actuating said type feeder individually of said holder, for delivering the type within the feeder into operative position with reference to said universal type holder, and for subsequently actuating said feeder and said type holder in unison for delivering the type into printing position for performing the printing operation.

7. In a typewriting machine, a universal type holder, a type feeder movably mounted therein, a series of types movable to a common point, means for successively delivering said types to said common point within the type feeder, and mechanical means controllable from a keyboard for automatically moving the feeder and the type therein into operative position within the type holder, and independently of said holder, and subsequently to the individual movement of said feeder the said mechanical means upon continued operation cause said type holder to move in unison with said feeder for performing the printing operation.

8. In a typewriting machine, a universal type holder, a type feeder movably mounted therein and adapted to feed individual types to said holder, a series of types movable to a common point into said type holder, means for moving said types severally to said common point, and automatic means for actuating said feeder individually of said universal type holder, and for subsequently moving said feeder and said type holder in unison to perform the printing operation.

9. In a typewriting machine, a universal type holder, a type feeder movably mounted therein and adapted to move individual types into operative position with reference to said type holder, types movable to a common position into said feeder, means for delivering said types, one at a time, into said feeder, and means controllable from a keyboard for automatically actuating the type feeder and for subsequently moving said universal type holder and the feeder toward the platen roll for performing the printing operation, means being provided for maintaining said type holder in normal rest position during the operation of the feeder and prior to the delivering of the type therein into operative position with reference to said type holder.

10. In a typewriting machine, a universal type holder, a type feeder mounted in said holder and adapted for slidable movement therein, means for guiding the movement of said feeder within said type holder, a series of types movable to a common point within said feeder, means for delivering said types, one at a time, into said feeder, means for guiding the movement of said types into said feeder, and means for automatically moving said type feeder and the type therein into operative position with reference to the type holder, and individually of the movement of said holder, and for subsequently moving the feeder and the type holder in unison to force said elements to cooperate with the platen roll for performing the printing operation.

11. In a typewriting machine, a universal type holder and a type feeder movably mounted therein and adapted to deliver individual types into operative position with reference to said holder, types, means for delivering said types successively into said feeder, means for guiding the movement of said types as they are approaching the common point within said feeder, and mechanical means for first moving said feeder and the type therein individually of said type holder, and for subsequently moving said type holder, and said feeder to deliver the type therein into printing position for performing the printing operation.

12. In a typewriting machine, a universal type holder mounted for movement on the machine frame, a type feeder mounted for movement within said type holder and adapted to convey types, successively, to an operative position with reference to said type holder, types movable to a common point within said type feeder, means for delivering said types severally into said common point, and means controllable from a keyboard for moving said type feeder and the type therein independently of said type holder for delivering the type into a position for printing, and subsequently thereto for actuating said feeder and said type holder in unison to force said type to perform the printing operation.

13. In a typewriting machine, a universal type holder movably mounted on the machine frame, a type feeder movably mounted therein, and adapted to move into and out of operative position with reference to said type holder, mechanical means controllable from a keyboard for reciprocating said type feeder into operative position with reference to said type holder, and to subsequently cause the universal type holder and said feeder to move in unison for performing the printing operation, means being provided in association with said type feeder for co-operating with other means to prevent the movement of said type holder away from its normal rest position during the reciprocating movement of said feeder individually, and to release said type holder as said feeder reaches its operative position and thereby to allow of the united movement of said feeder and said holder into printing position.

14. In a typewriting machine, a universal type holder, a type feeder movably mounted therein, types movable to a common point in said type feeder, means for moving said types, one at a time, into said common point, and means for automatically reciprocating said feeder and the type contained therein into operative position with reference to said type holder, and for subsequently operating said type holder and said feeder in unison for performing the printing operation, means being provided in association with said feeder coacting with stationary means for maintaining said type holder in normal rest position during the reciprocating movement of said feeder, said maintaining means being adapted to release said feeder and said type holder when said feeder arrives at its operative position within said type holder.

15. In a typewriting machine, a type holder, a feeder mounted for movement therein, types movable to a common point within said feeder, mechanical means controllable from a keyboard for actuating said feeder independently of said holder, and for subsequently actuating said feeder and said holder in unison to move said elements into printing position, a stud in said feeder, stationary means having a slot for receiving said stud and to coact therewith for preventing movement of said type holder away from its position of rest during the reciprocating movement of said feeder, and for releasing said holder when the feeder is delivered into its operative position within the holder, to allow of the movement of said holder and said feeder in unision.

16. In a typewriting machine, a universal type holder, a type feeder movably mounted therein and adapted to feed individual types thereto, types movable to a common point within said feeder, means for moving said types successively into said feeder, and means controllable from a keyboard for first moving said type feeder into operative position with reference to said type holder, and for subsequently moving said type holder and said feeder in unison for performing the printing operation, means in association with said feeder being provided for coacting with means in a stationary device to prevent operation of said type holder prior to the delivering of said feeder into said operative position with reference to the type holder, and a stop for arresting the movement of said feeder in its operative direction, and another stop for restricting its movement in the reverse direction.

17. In a typewriting machine, a universal type holder, a type feeder movably mounted therein, types movable to a common point within said feeder, means for reciprocating said types successively into said common point, mechanical means controllable from a keyboard for reciprocating said feeder into operative position with reference to said type holder and independently thereof, and for subsequently operating said feeder and said type holder in unison for performing the printing operation; a stop in said feeder, a stationary device having a slot for receiving said stud in the feeder to cooperate therewith for restricting the movement of the type holder away from its normal rest position during the reciprocating movement of said feeder, and stops in said slot for arresting the movement of the feeder in its operative direction and in the reverse direction.

18. In a typewriting machine, a universal type holder, a type stem attached thereto, a type feeder movably mounted in said type holder and adapted to deliver types successively on said type stem, types movable to a common point within said feeder, means for reciprocating said types, one by one, into said common point, and means for subsequently operating said feeder independently of said type holder for the moving of said type by said feeder onto the type stem, and for then operating both feeder and typeholder at once for moving said elements into printing position.

19. In a typewriting machine, a universal type holder having a universal type stem, a type feeder mounted for slidable movement within said type holder, means in said feeder into which said stem is arranged to be received, types movable to a common point in said type feeder, means for reciprocating said types successively into said common point, and means for first actuating said feeder to cause said feeder to move said type into operative position onto said universal type stem, said movement of the feeder being performed independently of said type holder, and for subsequently moving said type holder and the feeder into printing position for performing the printing operation.

20. In a typewriting machine, a universal type holder, a type feeder movably mounted therein, types having projections and adapted to move successively to a common point within said type feeder, guide plates in said feeder for guiding the movement of said types into said feeder, one or more windows in said type feeder, means for moving said types successively into said common point with said projections passing through and extending beyond said windows, a universal type stem fixedly mounted in said holder and passing through a head member on said feeder, and mechanical means forcing said type feeder to move the type from said common point into operative position onto said universal type holder, said feeder being actuated independently of said type holder, and for subsequently moving said type holder and said feeder for performing the printing operation.

21. In a typewriting machine, a universal type holder, a type feeding device mounted therein and adapted for slidable movement therein, a series of types movable to a common point within said feeding device, means for moving said types severally into said common point to engage with other means in said feeding device, a stationary fixture on the machine frame, a slot therein, a stationary stop therein, a stud in the feeding device arranged to be received in said slot, and mechanical means controllable from a keyboard for causing said type feeding device to deliver the type in engagement therewith to move into operative position with reference to said universal type holder, and to move the stud in said slot until its further progress is arrested by the stationary stop in said slot, and thus arresting the further operative movement of said feeding device within the type holder, an exit in said slot allowing of the movement of said stud out of the slot and of the movement of the type holder away from its normal rest position, being maintained in such position by the cooperation of said stud with said slot during the individual movement of said feeding device, and upon continued operation of said key-controlled means and subsequently to the delivering of the type to said operative position, said stud is caused to move into said exit and said universal type holder, to move into printing position for performing the printing operation.

22. In a typewriting machine, a universal type holder, a type feeding device movably mounted therein, types adapted to move into engaging position within said feeding device, means for moving said types into engagement with said device, one type at a time, key-controlled means causing said type feeding device to move said type in engagement therewith into operative position within said universal type holder, a stationary stop for arresting the movement of said feeding device in its operative direction, and for thus restricting the movement of said type, and one or more movable stops cooperating with said feeding device for restricting the movement of said device in its operative direction, at points corresponding to said stops, and thus allowing of the delivering of the type in variable operative positions within said type holder, said movable stops being controllable from shift keys under the control of an operator and are adapted to position the type for printing a character other than the one normally printed when the progress of the type is arrested by said stationary stop, and subsequently to the delivering of the type by said feeding device into operative position, said key-controlled means, upon continued operation, forcing said type holder to move the type into printing position.

23. In a typewriting machine, a universal type holder, a type feeding device, said device being adapted for slidable movement within said type holder, a series of types adapted for movement to a common point in said feeding device to engage therewith, means for successively reciprocating said types into engaging position in said type feeding device, key-controlled means for causing said feeding device to deliver the type in engagement therewith into variable operative positions with reference to said universal type holder, and for subsequently forcing the type holder to move said type into printing position, a stationary fixture, a slot therein, a stud in the type feeding device adapted to be received into said slot in the fixture, a stationary stop in said fixture for restricting the movement of said stud in said slot and of said type feeding device in said universal type holder, a movable stop controlled from a shift key and arranged to move into and out of said slot, said shift key upon being actuated causing the movement of said movable stop into said slot for arresting the movement of said stud in the feeding device and of the feeding device to allow of the delivering of the type in a position within said type holder for printing that character thereon which is normally not delivered for printing when said shift key is not actuated, said slot being provided with exits, one for each stop, to allow of the movement of said stud out of said slot and thus allow of the movement of said type holder away from its normal position and into position for performing the printing operation.

24. In a typewriting machine, a universal type holder, a type feeding device movably mounted therein, a series of types adapted for movement to a comon point into said type feeding device, means for moving said types severally into said common point in engagement with said feeding device, and key-controlled means for causing said feeding device to deliver the type in engagement therewith into a normal operative position with reference to said type holder, shifting means being provided controlled from a keyboard allowing of the movement of said type to operative positions within the universal type holder to which said type is normally not delivered when said shift keys are not actuated, and subsequently to the movement of the type into said operative position, continued operation of said key-controlled means causing said universal type holder and said feeding device to move said type into printing position.

25. In a typewriting machine, a series of types movable to a common point, said types having a plurality of characters on each type, means for reciprocating said types, one at a time, into said common point, a device for moving said type into a normal operative position, and key-controlled means for moving said type into printing position for performing the printing operation, shifting means, controllable from a keyboard, for delivering said type into an operative position other than the one to which said type is normally delivered, said type being arranged to print a certain character when it is moved into said normal operative position, and to print another character thereon when said shifting means are actuated at the will of an operator.

26. In a typewriting machine, a universal type holder, a type feeding device movably mounted therein, types movable to a common point into said type feeding device, each type having a plurality of characters, and is adapted to engage with said type feeding device, key-controlled means for moving said types successively into said type feeding device, and additional means for causing said feeding device to move said type into a normal operative position with reference to said universal type holder, and for subsequently moving said feeding device and said holder into printing position, a stationary fixture having a slot, a stud in said feeding device arranged to be received into said slot, said stud cooperating with said slot for preventing the movement of said universal type holder away from its normal rest position during the operation of said type feeding device, a stationary stop in said fixture for restricting the movement of the stud in its operative direction and thus allow of the delivering of the type to a normal operative position with reference to said universal type holder, shifting means controllable by an operator, a movable stop in operative connection with said shifting means, said movable stop being mounted for movement in said fixture and arranged to move in and out of said slot, said shifting means upon being actuated, causing the movement of said movable stop into said slot for obstructing the path of movement of said stud and of said feeding device in their respective operative directions, said movable stop cooperating with said stud to allow of the movement of said type feeding device a distance within said type holder for delivering the type thereon in a position for printing the character on said type that is not normally delivered into printing position when said stud is allowed to move a distance for cooperating with said stationary stop.

27. In a typewriting machine, a series of types movable to a common position, each type having a plurality of characters, means, for moving said types successively into said common position, means controllable from a keyboard for subsequently moving said type into a normal operative position, and a stationary stop for arresting the movement of said type at that point to allow of the printing of that character upon said type which is normally printed, shifting means being provided for moving said type into a position for printing that character thereon which is normally not delivered into printing position, said shifting means embracing a movable stop arranged to be moved into position, by actuating of a shift key, for arresting the movement of said type in a position for delivering the desired character thereon into printing position.

28. In a typewriting machine, a universal type holder, a type feeding device movably mounted therein and adapted to feed types thereto, one at a time, a series of types movable to a common position, key-controlled means for moving said types successively into said common position into engagement with said type feeding device, and mechanical means forcing said type feeding device to move said type into a normal operative position for printing a certain character, and for causing said type holder to move said feeding device and said type therein into printing position, a stationary fixture, a slot therein, a stud in said feeding device adapted to be taken into said slot and adapted to prevent the movement of said type holder away from its normal position of rest during the movement of said feeding device into operative position with reference to said type holder, a stationary stop in said fixture for restricting the movement of said stud in its operative direction and the movement of said feeding device in the direction for delivering the type into operative position within said type holder, and a plurality of movable stops in respective operative connection with shift keys and arranged to be individually moved by said shift keys into the path of movement of said stud for arresting the moving type in variable operative positions within said type holder, for printing characters of said type that are not normally delivered into printing position, and exits in said slot, one to each stop, allowing of the movement out of said slot of said stud, and thus of the operation of said universal type holder for performing the printing operation.

29. In a typewriting machine, a series of types movable to a common printing position, each type having a plurality of characters, a stationary stop for normally arresting the movement of the type at a position for normally printing one of said characters, a plurality of movable stops being provided for arresting the movement of said types, as they are being individually moved into printing position to allow of the printing of that character on said type that is normally not delivered into printing position when the type is arrested by said stationary stop, shift keys in operative connection with said movable stops and adapted to move their corresponding stop into position to allow of the delivering of the type into a position for printing a corresponding character of said type, and key controlled means for moving said type into said printing positions.

30. In a typewriting machine, types movable to a common point, each type having a plurality of characters thereon, means for severally moving said types into said common position and for subsequently moving said type to a normal operative position for printing one of said characters of the type, and a shifting mechanism controlled from a shift key allowing of the movement of said type into an operative position for printing that character thereon that is not normally delivered into printing position.

31. In a typewriting machine, a series of types adapted for movement to a common point, each type having a plurality of characters thereon, key-actuated means for successively delivering said types into said common point and for subsequently moving said type into a normal operative position for printing one of the characters of said type, and a shifting mechanism controlled from a shift key for restricting the movement of the type when said type reaches a position for printing the character that is normally not delivered into printing position, means controlled by an operator being provided for locking said shifting mechanism to allow of the successive printing with characters controlled by said shifting mechanism.

32. In a typewriting machine, a series of types adapted for movement to a common point, a universal type holder, a type feeder movably mounted therein and adapted to feed types, one at a time, to said type holder, means for delivering types successively to said common point into engagement with said type feeder, and means controllable from a keyboard causing said type feeder to reciprocate the type into normal operative position with reference to said type holder, and for subsequently forcing said type holder to move the type into printing position, a stud in said feeder, a stationary fixture having a slot, said stud being adapted to be taken into said slot and to prevent the movement of said type holder away from its normal rest position during the operative movement of said type feeder, a stationary stop in said fixture for cooperating with said stud to restrict the movement of said feeder after delivering the type into normal operative position for printing a certain character of said type, and a movable stop mounted for movement in said fixture, arranged to move into a position within said slot and into the path of movement of said stud to cooperate with said stud for restricting the movement of said feeder to a position for delivering the type to a point within said type holder that allows of the printing of another character of said type that is normally not delivered into such position, exits in said slot—one to each stop—allowing of the movement of said stud out of said slot and thus of the movement of said type holder into printing position, said exit to the stationary stop being always maintained open, and said exit to the movable stop being normally closed by means of a door for preventing egress of said stud from said slot during its movement to cooperate with the stationary stop for allowing of the delivering of the type into normal printing position, said door being in operative connection with said movable stop which normally occupies a position outside of said slot, and a shift key in operative connection with said movable stop for moving said movable stop into an obstructive position into said slot and for simultaneously causing said door to open said exit by moving said door out of said exit, to allow of the cooperation of said stud with said movable stop for restricting the movement of said type feeder to a position for delivering the type into a printing position to which it is not normally delivered, and then to allow said stud to move into said exit and thereby allow of the movement of said type holder into printing position, a shift lock being provided for locking said shift key and the shifting devices into a position allowing of the subsequent printing of the character controlled by said shifting devices.

33. In a typewriting machine, a series of types movable to a common printing position, each type having a plurality of characters, means for moving said types individually to a common printing position, and shifting mechanism controllable from a keyboard for controlling the printing of that character of said type which is normally not delivered into printing position, one or more shift keys for actuating said shifting mechanism, and a shift lock for locking said shift key and said mechanism to allow of the subsequent printing in the characters controlled by said shifting mechanism, said shift lock embracing a slide having one or more projections thereon and movable in a support adapted to guide its movements into and out of locking position, a hand lever pivoted on the machine frame or on a support thereon, and in operative connection with said slide; said hand lever being arranged to move said slide into engagement with the shift key that has been moved into operative position for locking said shift key and thus the shifting mechanism, said shift key comprising means that tends to cooperate with said slide and its projections for preventing said projections from obstructing the path of movement of said shift key in its operative direction, and a detent cooperating with said locking device for maintaining said device in the position to which it has been delivered by the operation of said hand lever.

34. In a typewriting machine, types movable to a common point, means for successively moving said types into said common position, each type having a plurality of characters thereon and being normally adapted to print one of said characters, and shifting means controllable from shift keys for controlling the printing of that character of said types which is not normally delivered into printing position, a slide having a projection arranged to cooperate with said shift key for locking said shift key in its operative position and for thus locking said shifting mechanism, a hand lever movably mounted on the machine frame and in operative connection with said slide for causing said slide to move into engagement with said shift key, and a detent cooperating with said locking device for maintaining said device in any position to which it may be delivered by the operation of said hand lever.

35. In a typewriting machine, a universal type holder, a type feeder movably mounted therein, types movable to a common point within said type feeder, means for delivering said types, one at a time, into engaging position within said feeder, said type holder being movably mounted on the machine frame and having an arm in operative association therewith for actuating said holder, a lever pivotally attached to said arm, said lever being operably connected with said type feeder which it is adapted to actuate, and with key-controlled means in operative connection with said lever forcing said lever to primarily cause said type feeder to move said type into operative position within said type holder and independently of said type holder, and for subsequently causing said lever to force said arm to operate the universal type holder for performing the printing operation.

36. In a typewriting machine, a universal type holder, a type feeder movably mounted therein and adapted to deliver individual types thereto, types movable to a common position within said type holder, means for successively reciprocating said types into said common position and into engagement with said type feeder, an arm in operative association with said type holder, a lever pivotally attached to said arm, a link operably connecting said lever with said type feeder, means further connecting said lever with an impression control lever, and key-actuated mechanism for releasing said impression control lever and impel said lever in a direction to force said feeder lever to first move said feeder for delivering the type therein into operative position with reference to said type holder, and for subsequently causing said feeder lever to actuate said arm and cause the universal type holder and said feeder to move in unison into a position for performing the printing operation.

37. In a typewriting machine, a universal type holder, a type feeding device movably mounted therein, types movable to a common point in said feeding device, means for moving said types successively into said common position and into engagement with said feeding device, an arm in operative association with said type holder, a lever movably mounted on said arm, a link connecting said lever with said feeding device, an impression control lever, means connecting said control lever with said device lever, means cooperating with said impression control lever for maintaining said control lever in normal rest position, manually operated mechanism for releasing said control lever to allow of the printing operation, a spring for impelling said control lever in a direction to force said feeding device lever to move said type feeding device in the operative direction for delivering the type held in engagement therein into operative position with reference to said type holder, said device moving independently of said type holder, and subsequently to cause said device lever to operate said arm for moving said type holder and said feeding device in unison into a position for performing the printing operation.

38. In a typewriting machine, a universal type holder, a type feeder movably mounted therein, types movable to a common position into said type feeder, means for delivering types, one at a time into said common position and into engagement with said feeder, an impression control lever, means cooperating with the lever for maintaining said lever in normal rest position, manually operated mechanism for releasing said lever to allow of the printing operation, and a spring for impelling said lever in a direction to force said type feeder to deliver the type therein into operative position with reference to said type holder, and for subsequently causing said type holder to move said type feeder and the type therein into printing position for performing the printing operation, means being provided for the returning of said impression control lever and said type holder and the type feeder to normal rest position.

39. In a typewriting machine, a universal type holder, a type feeder movably mounted therein, a series of types movable from individual rest positions to a common point in said type feeder, means for successively moving said types into said common position, and an impression control lever, means cooperating with said lever for maintaining the lever in normal rest position, manually operated means for releasing of said lever to allow of the printing operations, and a spring normally held under tension for impelling said lever in a direction to cause the feeder to deliver the type therein into operative position with reference to said type holder, and for subsequently causing said type holder to move into a position for performing the printing operation, carriage escapement mechanism, a retracting device in operative connection therewith for returning said lever into normal rest position and into engagement with its maintaining means subsequently to the printing operation, and thus placing said spring again under tension.

40. In a typewriting machine, a universal type holder, a type feeder movably mounted therein, types movable to a common position in said type feeder, means for moving said types individually into said common position and into engagement with said type feeder, an impression control lever, a spring for impelling said lever in a direction for performing the printing operations, a detent cooperating with said lever for maintaining the lever and said type holder and the feeder in normal positions of rest, manually operated means for releasing said lever to allow of the printing operation, said lever first causing said feeder to deliver the type into operative position with reference to said type holder and for subsequently causing said feeder and said type holder to move in unison into a position for performing the printing operation, a retracting mechanism for returning said lever to normal rest position and into engagement with said detent, and means in operative connection with said manually operated means for rendering said lever irresponsive to the retracting operations of said manually operable means.

41. In a typewriting machine, a universal type holder, a type feeder movably mounted therein, a series of types movable to a common point within said feeder, means for severally moving said types into said common point, an impression control lever, a detent cooperating with said lever for maintaining the lever in normal rest position, manually operable means for releasing of the lever to allow of the printing operations, a spring for impelling said lever in a direction to cause said type feeder to move the type therein into operative position with reference to said type holder and for subsequently causing said type holder to move into a position for performing the printing operation, and a retracting mechanism cooperating with said lever for the returning of the lever, the type holder, and the type feeder to their respective normal rest positions, said releasing means being arranged to move out of operative engagement with said detent to allow of the returning of said detent prior to the retracting operation, and means for rendering said detent and said lever irresponsive to the retracting operations of said manually operable means.

42. In a typewriting machine, a universal type holder, a type feeder movably mounted therein, types movable to a common point within said type feeder, means for moving said types successively into said common point, an impression control lever, a detent cooperating with said lever for maintaining the lever in normal rest position, a spring normally held under tension for impelling said lever in a direction to cause the independent movement of said type feeder with reference to said type holder for delivering the type therein into operative position, and for subsequently forcing said universal type holder to move the feeder and the type into printing position for performing the printing operation, manually operable means for actuating said detent to allow of the operation of the lever and the said mechanisms in operative connection therewith, and a retracting device cooperating with said lever for the returning of the lever and said mechanisms to normal rest position and to force said lever to re-engage said detent, and thus place said spring again under tension, said manually operable means including a carrier and a one way trip actuator arranged to move out of operative engagement with said detent to allow of the returning of said detent to normal rest position prior to the retracting operation of said lever, said lever, said detent and said impression mechanism being rendered irresponsive to the operations of said one way trip actuator.

43. In a typewriting machine, a universal type holder, a type feeder movably mounted therein, a series of types movable to a common point in said type feeder, means for reciprocating one type at a time into said common point, and an impression control lever adapted to actuate said feeder and said holder for performing the printing operations, a spring tending to move said lever away from normal rest position, a detent cooperating with said lever for maintaining the lever in normal rest position, a finger key, a carrier in operative connection therewith, a one way trip actuator upon said carrier in operative connection with said detent for actuating said detent and releasing said lever to allow said spring to impel the lever in a direction to cause said feeder to deliver said type into operative position within the type holder, and for subsequently forcing the type holder to perform the printing operation, and a retracting device cooperating with said lever for the returning of the lever, the holder and the feeder to normal rest positions, said one way trip actuator being arranged to move out of operative engagement with said detent for releasing said detent and allow it to return to normal rest position prior to the retracting operation of said lever for allowing of the re-engagement of said lever with said detent under the impulse of said retracting device and for thus replacing said spring under tension, said lever and said detent being rendered irresponsive to the retracting operations of said one way trip actuator.

44. In a typewriting machine, a universal type holder, a type feeder movably mounted therein, types movable to a common position in said feeder, means for successively delivering types, one at a time, to said feeder, and means controllable from a keyboard for primarily causing said feeder to move the individual types into an operative position with reference to said type holder, and for subsequently forcing said type holder to move said feeder and said type into a position for performing the printing operation, a changeable stop being provided for regulating the operative force of said type holder to perform a variable impression.

45. In a typewriting machine, a universal type holder, types movable to a common position, means for successively delivering types to said type holder, one type at a time, and mechanical means for causing said type holder to perform the printing operation, a changeable stop being provided cooperating with said mechanical means for regulating the operative force of said universal type holder to cause said type holder to perform a variable impression, said changeable stop being under the control of an operator for the purposes recited.

46. In a typewriting machine, a universal type holder, types movable to a common position, means for reciprocating said types severally into said type holder, mechanical means for operating said type holder to cause holder to move said types into printing position, a stop movable upon a support, means controllable by an operator for moving said stop and varying its position with reference to said mechanical means, said changeable stop being adapted to regulate the operative force of the universal type holder for performing a variable impression.

47. In a typewriting machine, a universal type holder, types movable to a common position, means for reciprocating said types, one at a time into said type holder, and an impression control lever for actuating said type holder to cause said holder to perform the printing operation, a changeable stop for arresting the movement of said control lever in its operative direction and thereby restrict the movement of the universal type holder in its operative direction, said stop being adapted to regulate the operative force of said type holder for performing a variable impression, and means controllable by an operator for changing the distance between said stop and said control lever for the purposes set forth.

48. In a typewriting machine, a universal type holder, a series of types movable to a common point, means for moving said types, one at a time, from said common point into an operative position with reference to said type holder, an impression control lever forcing said type holder to move said type into a position for performing the printing operation, a changeable stop movably mounted upon a support and adapted to restrict the movement of said lever in its operative direction to regulate the operative force of said universal type holder for performing a variable impression, a rotatable shaft journaled in said support and operably connected with said stop for moving said stop toward and away from said control lever, and means controlled by an operator for operating said rotatable shaft for the purposes set forth.

49. In a typewriting machine, a power operated universal type holder, a series of types movable to a common point, means for reciprocating said types, one at a time, into said common point, and means for releasing the power means to allow said power means to force said type holder to perform the printing operation.

50. In a typewriting machine, a main operating lever, means cooperating with said operating lever for maintaining the lever in normal rest position, manually operable means controllable from a keyboard for releasing said lever to allow of the printing operations, mechanical means for impelling said lever in a direction for operating the various mechanisms of the machine to perform the printing act, and mechanism independent of said manually operable means for returning said main operating lever to normal rest position.

51. In a typewriting machine, a main operating lever, a detent cooperating with said operating lever for maintaining the lever in retracted rest position, means controllable by an operator for releasing said lever to allow of the operation of the mechanisms of the machine as controlled from said keyboard, a spring normally held under tension for impelling said lever in a direction for operating said mechanisms for performing the printing operation, and mechanism independent of the operator cooperating with said main operating lever for the returning of the lever into normal rest position into re-engagement with its detent, and for placing said spring again under tension.

52. In a typewriting machine, a main operating lever, a key lever, a detent cooperating with said operating lever for maintaining said lever in normal rest position, said detent also coacting with said key lever for maintaining the key lever in normal rest position, a spring normally held under tension arranged to operate said main operating lever, a finger key for actuating said key lever and in turn to actuate said detent for releasing said main operating lever to allow said spring to impel said main operating lever in a direction to operate the various mechanisms of the machine for performing the printing operations, and retracting means independent of said key-actuated means cooperating with said main operating lever for the retracting of said lever to normal rest position and into engagement with its detent for placing said spring again under tension.

53. In a typewriting machine, a main operating lever, a key lever, a detent cooperating with said levers for maintaining the levers in normal rest positions respectively, a finger key causing said key lever to actuate said detent for releasing said main operating lever, a spring for impelling said lever in a direction for operating the various mechanisms of the machine for performing the printing operations, and a universal retracting bar cooperating with said operating lever for the returning of said lever and the various mechanisms to normal rest positions, said operating lever being returned into engagement with said detent, and said spring being again placed under tension.

54. In a typewriting machine, a main operating lever, a detent cooperating with said operating lever for maintaining the lever in normal rest position, manually operable means for releasing said lever to allow of the printing operations, a universal operating bar adapted to be actuated by said operating lever, a spring for impelling said lever in a direction for actuating the printing instrumentalities, and for causing said universal operating bar to operate the remaining mechanisms of the machine to allow of the retracting operations, and a universal retracting bar cooperating with said main operating 'ever for the returning of said lever to normal rest position into engagement with its detent, and to allow of the retracting operation of the universal operating bar and the mechanisms in operative connection therewith.

55. In a typewriting machine, a main operating lever, a detent cooperating therewith for maintaining said lever in normal rest position, a type carrier in operative connection with said operating lever, a universal operating bar adapted to be actuated by said operating lever, spring means for impelling said lever in a direction for moving said type carrier into operative position, and to cause said universal operating bar to actuate the various mechanisms in operative connection therewith, all for performing the printing operations and for releasing the carriage to allow of the retracting operations, and a universal retracting bar cooperating with said main operating lever for the returning of said lever and the mechanisms in operative connection therewith to normal rest position, means being provided for maintaining all of said mechanisms in their respective retracted positions.

56. In a typewriting machine, a plurality of main operating levers, a plurality of key levers, one for each main operating lever, a plurality of detents, one for each main operating lever and each key lever, said detents being arranged to cooperate with their corresponding main operating levers and also to cooperate with the corresponding key levers for maintaining said main operating levers and said key levers in their respective normal positions, a plurality of type carriers in operative connection with said main operating levers, one type carrier with each operating lever, a universal operating bar in loose operative connection with all of said main operating levers and adapted to be actuated by each and any one of said main operating levers, mechanism in operative connection with said universal operating bar, finger keys, one for each key lever, to force said key levers to release said main operating levers successively and individually, a spring normally held under tension—one spring to each main operating lever, for impelling its lever in a direction for reciprocating its corresponding carrier into operative position, and for simultaneously operating said universal operating bar to cause said bar to operate the different mechanisms in operative connection therewith, and thereby through the operation of all these mechanisms to perform the printing operations and allow of the retracting operations, a universal retracting bar cooperating with each and any of said main operating levers for the returning of said lever into normal rest position into engagement with said detent, and for placing said spring again under tension.

57. In a typewriting machine, a series of main operating levers, a detent for each operating lever to cooperate with said operating lever for maintaining the lever in normal rest position, printing instrumentalities in operative connection with said main operating levers, a universal operating bar, mechanisms in operative connection therewith, manually operable mechanism for releasing said main operating lever to allow of the operation of said printing instrumentalities and of the universal operating bar for performing the printing operations and to allow of the retracting operations, and a universal retracting bar cooperating with each and any of said main operating levers for the returning of said levers and the mechanisms in operative connection therewith to their respective retracted positions, and a retracting mechanism for operating said universal retracting bar for the purposes set forth.

58. In a typewriting machine, a main operating lever, said lever being one of a series of such levers, a detent cooperating with said lever for maintaining said lever in normal rest position, a type in operative connection with each lever, a universal operating bar arranged to be actuated by said main operating lever, manually operable means for releasing said operating lever to allow of the printing operations, spring means for impelling said operating lever in a direction for reciprocating said type into operative position and for operating said universal operating bar, a universal retracting bar cooperating with said main operating lever for the returning of said lever to normal rest position, a retracting device coacting with said universal retracting bar for performing said retracting operations, and means controllable from a keyboard for operating the said retracting device for the purposes set forth.

59. In a typewriting machine, a main operating lever, said lever being one of a plurality of such levers, printing instrumentalities in operative connection with said levers, means cooperating with said operating lever for maintaining the lever in normal rest position, manually operable means for the releasing of said lever to allow of the printing operations, spring means for impelling said main operating lever in a direction for operating the various mechanisms operably connected therewith, a universal operating bar arranged to be actuated by said lever for operating various mechanical devices in operative connection with said universal operating bar, a universal retracting bar cooperating with said operating lever for the returning of said lever to normal rest position into engagement with its detent and for placing said spring again under tension, a retracting mechanism normally occupying a resting position, a carrier therefor, and means controllable from said universal operating bar causing said carrier to move said retracting mechanism into operative position for actuating said universal retracting bar for the purposes set forth.

60. In a typewriting machine, a main operating lever, a detent cooperating with said lever for maintaining said lever in retracted rest position, printing instrumentalities, manually operable mechanisms for the releasing of said operating lever to allow of the printing operations, a spring for impelling said lever in a direction for performing said printing operations, a traveling element or carriage adapted for intermittent movement, means for moving said carriage, driving mechanism in operative connection with said means for moving the carriage, a universal retracting bar cooperating with said main operating lever for the returning of said lever to normal rest position into engagement with its detent and for replacing said spring under tension, a retracting device, a carrier therefor, means controlled from said main operating lever causing said carrier to move said retracting device into operative engagement with said driving means to allow said driving means to force said retracting device to actuate said universal retracting bar for the purposes set forth, during the intermittent movements of the carriage.

61. In a typewriting machine, a power operated lever, means cooperating therewith for maintaining the lever in normal rest position, manually operable means for releasing said lever to allow said power means to impel said lever in a direction for performing the printing operations, a carriage or traveling element adapted for intermittent movement, power means independent of said manually operable means for moving said carriage, a driving device in operative connection with said independent power means and adapted to be driven thereby, a retracting mechanism normally occupying a retracted rest position and arranged to be operated by said driving device and normally not in engagement therewith, a carrier for said retracting mechanism, and means controlled from a keyboard causing said carrier to move said retracting mechanism into operative engagement with said driving device to force said retracting device to perform the retracting operation for the returning of said power operated lever and the mechanisms operably connected therewith to normal rest positions.

62. In a typewriting machine, a main operating lever, a spring tending to move said lever away from its normal rest position, a detent cooperating with said main operating lever for maintaining the lever in normal rest position against the action of said spring, manually operable means for releasing said lever to allow of the printing operations, a universal operating bar arranged to be operated by said lever, said spring impelling said lever in a direction for operating printing instrumentalities and said universal operating bar, a retracting device normally occupying a retracted rest position, a universal retracting bar adapted to be actuated by said retracting device for cooperating with said main operating lever for the returning of said lever to normal rest position subsequently to the printing operations, driving means for operating said retracting device, a carriage or traveling element adapted for intermittent movement, a spring drum for moving said carriage, a toothed wheel associated with said spring drum and in engagement with said driving means to cause said driving means to operate said retracting device for the purposes set forth.

63. In a typewriting machine, a main operating lever, a detent cooperating with said lever for maintaing said lever in normal rest position, manually operable means for releasing said lever to allow of the printing operations, printing instrumentalities adapted to be actuated by said operating lever, a universal operating bar adapted to be operated by said lever, a spring for impelling said lever in a direction for performing the printing operations, a traveling element or carriage, a spring drum for moving said carriage, a toothed wheel associated therewith, toothed wheel, a retracting mechanism pivoted upon a carrier, means for actuating said retracting mechanism with reference to said carrier, said actuating means being engageable with but normally disengaged from said driving means, a spring for maintaining said retracting mechanism in normal rest position with reference to said carrier, and means controlled from the keyboard causing said carrier to move said retracting mechanism to deliver its actuating means into engagement with said driving means, a universal retracting bar adapted to be operated by said retracting mechanism and cooperating with said lever for the returning of said lever to normal rest position, and a spring for returning said universal retracting bar to normal rest position subsequently to the said retracting operations, and for maintaining said bar in such position.

64. In a typewriting machine, a main operating lever, means cooperating with said lever for the maintaining of the lever in normal rest position, manually operable mechanism for releasing said lever to allow of the printing operations, a spring for impelling said lever in a direction for performing the printing operations, a universal operating bar adapted to be actuated by said lever, a carrier operably connected with said operating bar, a retracting device movably mounted upon said carrier, a spring for maintaining said retracting device in normal position with reference to said carrier, a toothed wheel associated with said retracting device and arranged to actuate said retracting device against the action of its spring, a traveling element or carriage, power means for moving said carriage intermittently—one step at a time, a toothed wheel in operative association with said power means, a short shaft, a toothed driving wheel upon said shaft meshing with said toothed wheel associated with the power means and arranged to be operated thereby for driving said shaft, another wheel on said shaft arranged to be driven by said shaft, said wheel associated with the retracting device being engageable but normally not in engagement with said driven wheel, and means in operative connection with said universal operating bar for moving said carrier to cause it to deliver the retracting device into operative position with its operating wheel into engagement with said driven wheel, and a universal retracting bar operably connected with said retracting device and arranged to be operated thereby for cooperating with said operating lever to return said lever to normal rest position.

65. In a typewriting machine, an operating control lever, a universal operating bar, means cooperating with said operating control lever for maintaining said lever in norerative connection with said universal operating bar, a retracting device normally occupying a retracted rest position, driving means therefor, a universal retracting bar operably connected with said retracting device, a carriage or traveling element adapted for intermittent movement, step-by-step carriage feed mechanism, power means for moving the carriage, said driving means being operably connected therewith, manually operable means for releasing said operating control lever to allow of the printing operations and of the retracting operations, and power means for impelling said operating control lever in a direction to operate said universal operating bar and other mechanisms for performing the printing operations, and to cause said bar in addition to move said actuating lever in a direction for delivering said retracting device into engagement with its driving means and to maintain said retracting device in such position during the operation of the mechanisms of the machine, and then to cause one of the members of said carriage feed mechanism to lock the carriage, and finally to move another of said mechanisms out of operative engagement with said carriage, and subsequently to the operation of said members continued movement of said actuating lever is adapted to release said two members to allow of the movement of the carriage by its power means and of the simultaneous operation by said carriage power means of said driving means to force said retracting device to actuate said universal retracting bar to cause said bar to cooperate with said operating control lever for the returning of said control lever to normal rest position, and thereby allow of the returning of said universal operating bar to its normal rest position for the retracting of the said actuating lever to its normal rest position to allow of the retracting operations of the other mechanisms of the machine.

66. In a typewriting machine, an impression mechanism, a series of types movable to a common point, means for moving said types severally into said common point, an impression control lever, means cooperating therewith for maintaining the control lever in normal rest position, a spring tending to move said control lever away from its normal position and normally held under tension, a carriage, an escapement pawl engageable with said carriage and normally disengaged therefrom, an escapement bar normally engaged with said carriage, a retracting mechanism adapted to be actuated by said escapement bar, independent automatic means for moving said carriage intermittently, a universal retracting device arranged to be actuated by said independent automatic means, a plurality of power operated levers controlled from a keyboard, a universal actuating device adapted to be actuated when said levers are severally released, said power means impelling each and any of said power operated levers in a direction to cause said universal actuating device to move said universal retracting device into operative position, then to actuate means for releasing said control lever to allow of the printing operation and for delivering said escapement pawl into engagement with said carriage, and to finally cause said escapement bar to move out of engagement with said carriage and into engagement with said retracting mechanism to cause said mechanism to cooperate with said control lever for the returning of said lever to normal rest position, and subsequently thereto the said universal actuating device is adapted to move out of operative engagement with the means for operating said escapement bar to allow of the returning of said bar into engagement with the carriage, and then to move out of engagement with the means controlling the movements of said escapement pawl to allow of the returning of said pawl to normal rest position and to allow said independent automatic means to move the carriage a step and to simultaneously operate said universal retracting device for the returning of said power operated lever and the said universal actuating device to normal rest position.

67. In a typewriting machine, a universal actuating device, a retracting mechanism, driving means therefor, said retracting mechanism being engageable with and normally disengaged from said driving means, a carriage or traveling element, step-by-step carriage feed mechanism, said feed mechanism comprising a pawl normally disengaged from said carriage and an escapement bar in engagement with said carriage, said bar being adapted to move out of engagement with said carriage, and having automatic means for moving it in a direction opposite to the intermittent movements of the carriage, printing instrumentalities, mechanism for actuating said retracting mechanism for delivering said mechanism into engagement with said driving means, means for moving the pawl into locking engagement with said carriage, mechanism for actuating said escapement bar, and key controlled means for impelling said universal actuating device in a direction for causing said retracting mechanism to move into engagement with its driving means, and to subsequently cause said pawl to lock the carriage, and finally to disengage said escapement bar from said carriage to allow of its movement a step under the impulse of its automatic means, and subsequently to the operation of said mechanism by said universal actuating device, the said device is adapted to continue its movement for releasing first the said mechanism for actuating the escapement bar to allow of its returning into engagement with the carriage, and subsequently to release the means for actuating the pawl to allow of the unlocking of the carriage from said pawl, said key-controlled means actuating said printing instrumentalities for performing the printing operations, and subsequently to said printing operations, power means for moving the carriage a step and returning said escapement bar to normal rest position and causing said retracting mechanism to return said key-controlled means and said universal actuating device to normal rest position, said carriage feed mechanism being rendered irresponsive to the retracting operations of said universal actuating device.

68. In a typewriting machine, printing instrumentalities, an actuating lever having a plurality of operative segments—a long, a shorter and a shortest segment, a carriage adapted for intermittent movement, an escapement bar in operative connection with said carriage, and adapted to move out of engagement with said carriage, a rocker shaft in operative connection with said escapement bar, a one way trip actuator on said rocker shaft and adapted to actuate said shaft for disengaging said bar from the carriage, means for normally maintaining said shaft in normal rest position and for maintaining said actuator in normal rest position with reference to said shaft, an escapement pawl engageable with and normally disengaged from the carriage, a rocker shaft operably connected with said pawl, and having a one way trip actuator, means for maintaining said shaft in normal rest position and other means for maintaining said actuator in normal rest position with reference to said rocker shaft, a retracting mechanism, driving means therefor, said retracting mechanism being engageable with and normally disengaged from said driving means, power means for moving said carriage, said driving means being adapted to be actuated by said power means, and key-controlled means for actuating said printing instrumentalities for performing the printing operations, and for causing said actuating lever to move in a direction to force its long segment to cause the delivering of the retracting device into engagement with its driving means and to maintain said device in such engagement during the entire operative and retracting movement of said actuating lever, and subsequently thereto to cause said shorter segment to operate the one way trip actuator to rock the shaft in operative connection with the carriage pawl for moving said pawl into locking engagement with said carriage, and subsequently thereto to cause said shortest segment to operate the one way trip actuator for rocking the shaft in operative engagement with said escapement bar for disengaging said bar from the carriage, and allow of the movement of said bar a step in a direction opposite to the travel of the carriage, and upon continued movement of said actuating lever subsequently to the operation of the said mechanisms, the said shortest segment is arranged to release the one way trip actuator for allowing of the return of said shaft in engagement with the escapement bar to normal rest position and thus returning said escapement bar into engagement with said carriage, and subsequently thereto the said shorter segment for releasing said one way trip actuator controlling the pawl, for moving said pawl out of engagement with said carriage, and thereby to allow of the movement of said carriage by said power means a step, and to simultaneously cause said driving means to actuate said retracting mechanism for the returning of said key-controlled means and said actuating lever to their respective normal rest positions, said escapement bar and said pawl being rendered irresponsive to the operation and their respective actuating means being rendered irresponsive to the retracting operations of said actuating lever.

69. In a typewriting machine, printing instrumentalities, means for actuating said printing instrumentalities for performing the printing operations, a traveling element or carriage adapted for intermittent movement, a carriage rack, step-by-step carriage feed mechanism comprising an escapement lever or pawl and an escapement ratchet and an actuating frame therefor, said escapement ratchet being movably mounted in said frame and said actuating frame being movably mounted on the machine frame or on a support thereon, a spring normally held under tension tending to move said escapement ratchet away from its normal rest position subsequently to the disengagement of said bar from the carriage rack, a detent cooperating with said escapement ratchet for maintaining said ratchet in normal rest position against the action of said spring, means controllable from a keyboard for moving said escapement pawl into engagement with the carriage rack, and for subsequently causing said actuating frame to move said escapement ratchet out of engagement with said rack and said detent to allow said spring to impel said escapement ratchet in a direction a distance opposite to the travel of the carriage, a stop for limiting the movement of said ratchet in its operative direction and another stop for limiting its movement in the opposite direction, means being provided for rendering the impact of said escapement bar against said stops practically noiseless, retracting means for disengaging said pawl from said rack and for causing said actuating frame to re-engage said escapement ratchet with said rack, and means for moving the carriage a distance equal to the distance between said stops and returning said escapement ratchet to normal rest position into engagement with its detent and thus placing said spring again under tension.

70. In a typewriting machine, printing instrumentalities, means for actuating said printing instrumentalities for performing the printing operations, a traveling element or carriage adapted for intermittent movement, a carriage rack, an escapement pawl engageable with and normally disengaged from said rack, an escapement ratchet normally in engagement with said rack, an actuating frame for said ratchet, said actuating frame being movably mounted on the machine frame or upon a support thereon, and said escapement ratchet being mounted in said frame and adapted for slidable movement therein, key-actuated means for moving said pawl into engagement with said rack and for subsequently causing said actuating frame to move said escapement ratchet out of engagement with said rack, a detent cooperating with said escapement ratchet for maintaining said ratchet in normal rest position, said ratchet being simultaneously disengaged from said rack and said detent, a spring for impelling said escapement ratchet a distance in a direction opposite to the travel of the carriage, a stop for arresting its movement in said direction, means associated with said escapement ratchet coacting with means associated with said stop for breaking the force of the impact between said ratchet and said stop and thus rendering the impact practically noiseless, another stop for arresting the movement of said escapement ratchet in the reverse direction, means being provided associated with said ratchet coacting with means associated with said other stop for rendering their impact practically noiseless, and means for moving the carriage subsequently to the disengagement of said pawl from the rack and of the re-engagement of said ratchet with said rack, for the returning of said ratchet to normal rest position in engagement with its detent and for placing said spring again under tension, said carriage being arranged to move a step of a size equal to the distance between said stops.

71. In a typewriting machine, a series of types adapted for movement to a common printing position, key actuated means for moving said types severally to said common printing position for performing the printing operations, a traveling element or carriage adapted for intermittent movement, a carriage rack, an escapement lever or pawl engageable with and normally disengaged from said carriage rack, an actuating frame movably mounted on the machine frame or upon a support thereon, an escapement bar mounted in said frame and adapted for slidable movement therein, said actuating frame being adapted to maintain said bar normally in engagement with said carriage rack, a detent cooperating with said escapement bar in normal rest position with reference to said actuating frame, a spring tending to move said bar away from said normal rest position and normally held under tension, key actuated means for moving said pawl into engagement with said carriage rack and for subsequently forcing said actuating frame to disengage said escapement bar from said carriage rack and from said detent to allow the said spring to impel said escapement bar in a direction opposite to the travel of said carriage, a stop for restricting the movement of said escapement bar in its operative direction, a cylindrical bearing or recess in said stop, a plunger or piston in said escapement bar adapted to be received in said bearing or recess and adapted for longitudinal movement therein, said piston moving therein against the resistance of a cushion of air and other means for breaking the force of impact between said bar and said stop and thus rendering the impact practically noiseless, retracting means for returning said escapement bar into engagement with said carriage rack, and for subsequently disengaging said escapement pawl from said rack to allow of the movement of the carriage, power means for moving the carriage a step and for the returning of said escapement bar to normal rest position against the action of its spring and for delivering said bar into engagement with its detent, a second stop being provided for restricting the movement of said bar in its retracting direction, a cylindrical bearing or recess in said stop, and a piston or plunger in said escapement bar adapted to be taken into said stop, said piston being movable longitudinally in said bearing or recess against the resistance of a cushion of air and other means for breaking the force of impact between said escapement bar and said second stop to render said impact practically noiseless.

72. In a typewriting machine, printing instrumentalities, key controlled means for actuating said printing instrumentalities for performing the printing operations, a carriage, a carriage rack, an escapement pawl, an escapement bar, said key controlled means for moving said pawl into engagement with said rack, and for subsequently moving said escapement bar out of engagement with said rack, a detent for maintaining said bar in normal rest position, said means being adapted to move said bar simultaneously out of engagement with said detent and said rack, a spring for impelling said bar in a direction opposite to the travel of the carriage, a stop for restricting the movement of said bar in said direction, a cylindrical recess in said stop, a valve normally shutting one of the openings of said recess, a plunger in said escapement bar arranged to be taken into said recess and to move longitudinally therein against the resistance of a cushion of air for compressing said air to cause said compressed air to force said valve out of said opening and allow of the escape of said air through said opening, said valve being adapted to return to normal rest position subsequently to the escape of said air, said means cooperating to render the impact of said bar and said stop practically noiseless, retracting means for re-engaging said escapement bar with said rack and for subsequently disengaging said pawl from said rack, and power means for moving the carriage a step to force the rack to return said escapement bar to its normal rest position and into engagement with its detent, a second stop being provided for restricting the movement of said bar in its retracting direction, said stop being provided with similar means for cooperating with said bar to render the impact in the retracting direction, practically noiseless, the distance of the step movement of the carriage being equal to the distance between the two stops.

73. In a typewriting machine, types movable to a common point, means for moving said types into printing position, a traveling element or carriage, a carriage rack, a pawl, an escapement bar, key controlled means for moving said pawl into engagement with said rack, and for subsequently disengaging said escapement bar from said rack, a spring for moving said bar in a direction opposite to the travel of the carriage, a stop for restricting the movement of said bar in said direction, retracting means for re-engaging said escapement bar with said rack and for subsequently disengaging said pawl from said rack to allow of the movement of the carriage, and power means for moving said carriage a step and cause said bar to return to normal rest position against the action of its spring, a second stop being provided for restricting the movement of said bar in its retracting direction, means associated with said stops being provided for adjusting said stops with reference to each other to allow of the movement of said bar a variable distance and thereby allow of the intermittent movement of the carriage a variable step.

74. In a typewriting machine, a series of types movable to a common printing position, means for moving said types severally into printing position, a carriage, a carriage rack, an escapement pawl, an escapement bar, key controlled means for engaging said pawl with said rack and for disengaging said bar from said rack, a spring for moving said bar in a direction a distance opposite to the travel of the carriage, a stop for limiting the movement of said bar in its operative direction, retracting means for re-engaging said bar with the rack and for disengaging the pawl from said rack, power means for moving the carriage a step to return said escapement bar to normal rest position against the action of its spring, a second stop for limiting the movement of said bar in its retracting direction, and changeable means controllable from a keyboard for adjusting said stops with reference to each other to regulate the distance between said stops for producing a variable step-by-step movement of the carriage, and thereby adjust said movements for different size types.

75. In a typewriting machine, a plurality of type carriers, detachable types on said carriers, said carriers being arranged to move said types to a common point, means controllable from a keyboard for reciprocating said carriers severally into operative position for delivering said types into said common point, a universal type holder, means for detaching said types from the carrier occupying an operative position for delivering said types, one at a time, into an operative position within said universal type holder, and mechanism controllable from a keyboard for actuating said universal typeholder to cause said types to perform the printing operations.

76. In a typewriting machine, a plurality of type carriers having interchangeable types, each carrier having an interchangeable type, means being provided for removing all of the types in unison from said carriers, and means controllable from a keyboard for successively reciprocating said type carriers into operative position for delivering the types successively into a common operative point, and means coacting with said types for performing the printing operations.

77. In a typewriting machine, a plurality of type carriers having interchangeable types, each carrier having an interchangeable type, means controllable from a keyboard for reciprocating each and any one of said carriers into operative position to allow of the printing operations, and an ejector controllable by an operator for removing said types from the carriers to allow of the insertion of another set of types upon said carriers.

78. In a typewriting machine, a plurality of type carriers having interchangeable types, key-controlled means for reciprocating said type carriers into operative position, one type carrier at a time, to allow of the printing operations, a type magazine adapted to hold types therein, means for normally moving said types from said magazine into operative position on the carriers, and an ejector controllable by an operator for moving said types from the carriers into said magazine to allow of the replacement of said set of types by another set.

79. In a typewriting machine, a plurality of type carriers, types on the operative extremities of said carriers, one on each type carrier, said types being removable, means for actuating said type carriers for delivering said types successively into a position to allow of the printing operations, a type magazine having a plurality of type stems— one stem to each corresponding type carrier, said stems being adapted to hold removable types for normally moving said types onto said carriers, and an ejector controllable from a keyboard for transferring the font of types from the carriers onto the stems in the magazine to allow of the interchanging of another font of types upon said carriers.

80. In a typewriting machine, a plurality of type carriers having a font of detachable types, one type on each carrier, key-controlled means for moving said type carriers into operative position to allow of the printing operations, a type magazine having a plurality of type stems carrying a font of types, said magazine being movable into a position for delivering said font of types into operative alinement with said carriers to normally allow of the movement of said font into operative position on said carriers, and an ejecting device controllable from a keyboard for returning said font of types from said carriers to said stems in the magazine, to allow of the changing from the present font to the required font of types.

81. In a typewriting machine, a plurality of type carriers holding a font of interchangeable types, key-controlled means for reciprocating said type carriers into operative position to allow of the printing operations, a type magazine holding a plurality of fonts of types, one of said fonts normally occupying an operative position on said carriers, type stems in said magazine upon which said types are severally removably mounted, one set of said type stems being normally in alinement with said font of types on the carriers, one stem being in alinement with its corresponding type, and means controllable from a keyboard for first removing said font of types from said carriers and returning them to their corresponding stems in said magazine, and for subsequently moving said magazine for delivering the desired font of types into alinement with the operative end of said carriers to allow of the movement of said required font of types onto said carriers, and thereby allow of the printing operations with this new font of types.

82. In a typewriting machine, a carrier movably mounted therein, a type magazine removably mounted in said carrier, a plurality of type carriers arranged to carry interchangeable types, each carrier having an operative extremity affording removable mounting to a type, a font of types in said magazine, means controllable by an operator for moving said carrier to a position for delivering said font of types into alinement with the operative extremities of said type carriers to allow of the movement of said types onto their corresponding type carriers, key-controlled means for moving said carriers severally into operative position to allow of the printing operations, means being provided for guiding the movements of said type carriers and for preventing displacement of the types on said carriers during their several movements into and out of operative position, and ejecting means controllable by said operator for returning said font of types from said type carriers to said magazine.

83. In a typewriting machine, a carrier movably mounted therein, a type magazine removably mounted in said carrier, said magazine holding a plurality of fonts of types, one of said fonts of types normally occupying an operative position, a plurality of type carriers having operative extremities adapted to hold interchangeable types, one on each type carrier, means controllable from a keyboard for normally maintaining said carrier in a position to allow of the movement of said font of types onto said carriers, said font being normally mounted upon said carriers and adapted to be returned to its corresponding position within said magazine, key-controlled means for reciprocating said type carriers severally into operative position to allow of the printing operations, an ejector, means for actuating said ejector to cause it to return said font of types from said type carriers to their corresponding positions in the magazine, additional means for causing said carrier to deliver into operative position the required font of types subsequently to the returning of the font of types on the carriers into said magazine, said ejector being arranged to return to normal rest position upon the delivering of said required font of types into said operative position to allow of the movement of said required font of types onto said carriers, and means for maintaining said carrier in such position, and means for guiding the movements of the type carriers as they severally move in and out of operative position.

84. In a typewriting machine, a type magazine having a plurality of fonts of types, said magazine normally occupying a retracted rest position, a plurality of type carriers, each of said carriers having a type carrying end, and adapted to move to an operative position, means for moving said carriers individually into operative position to allow of the printing operations, a normal font of types normally removed from said magazine and occupying operative positions on said carriers, said types on the carriers being in alinement with their corresponding holders in the magazine, a finger key, a key lever connected therewith, an ejector in operative connection with said key lever, shifting means in operative connection with said magazine and adapted to move said magazine, said finger key first causing said ejector to return the font of types from the type carriers into the type magazine, and for subsequently shifting said magazine for delivering the required font of types into operative position, said ejector being arranged to move out of operative position and into normal rest position to allow of the movement of the types from the required font onto said type carriers, and means for maintaining said magazine into such operative position with the types on the carriers in alinement with their respective holders in the magazine.

85. In a typewriting machine, a magazine carrier movably mounted therein, a type magazine removably mounted in said carrier, more than one font of types therein, rows of type holders on said magazine for holding said types, said carrier normally occupying a retracted rest position and thus maintaining said fonts of types in their respective normal rest positions, a plurality of type carriers having type carrying ends and adapted to reciprocate types severally into operative position to allow of the printing operations, one of said fonts of types being normally removed from said magazine onto said carriers and occupying operative positions on said carriers, the corresponding row of type holders in the magazine being maintained in alinement with said types upon the carriers, each of said holders with its corresponding type upon the carrier, one or more detents for locking said carrier in any operative or normal rest positions, an ejector mounted for movement in the machine frame or in a support thereon, key levers in operative connection with said ejector and said carrier, each type font being controlled by a corresponding key lever, each key lever being operably connected with said ejector, mechanism connecting said ejector with each of said key levers, shifting mechanism in operative connection with said carrier holding the magazine and adapted to normally maintain said carrier in retracted rest position with one of the fonts of types in alinement with the operative ends of the type carriers to allow of their movement into operative position on said carriers, said shifting mechanism being in operative connection with the key levers controlling the shifting of those fonts of types normally not occupying a position in said alinement with the type carriers, and a finger key—one to each font of types—corresponding to the required font forcing its corresponding key lever to cause said ejector to remove said font of types from the type carriers and return said types onto their respective holders in the type magazine and to simultaneously actuate said detents for unlocking the carrier, and subsequently to said operations of the ejector to cause the shifting mechanism to move the magazine carrier a distance for delivering the required font of types into operative position with said types in alinement with their corresponding type carriers, said means actuating the ejector being adapted to release said ejector upon the delivering of the required font of types into said operative position and thereby allowing the movement of said required font of types into operative position on said type carriers, as said ejector is returning to its normal rest position and thus allowing of the relocking of said carrier by said detents in the position to which said shifting means had delivered said font of types.

86. In a typewriting machine, a machine frame, a magazine carrier movably mounted therein, a plural font magazine mounted in said carrier, a plurality of type carriers adapted to hold interchangeable types, one of the fonts of types from the magazine being normally upon said carriers, type holders mounted in said magazine being maintained in alinement with their corresponding types on the type carriers, key levers—one to each font of types, an ejector movably mounted in the machine frame or in a support thereon, a rocker frame operably connected with said ejector, ejector actuators for rocking said frame, means connected with said key levers for operating said ejector actuators, a shifting bar operably connected with said magazine carrier and adapted to maintain said carrier and the magazine in normal rest position with one of the fonts of types normally occupying said position upon the type carriers and in alinement with their corresponding type holders of the magazine, shift bar actuators operably connected with said key levers, one to each key lever controlling the shifting of the font not normally occupying said normal position, and a finger key corresponding to each key lever for causing said key lever to operate said ejector actuator for rocking said rocker frame to cause said ejector to return the types on the type carriers into the magazine and for unlocking said carrier to allow of the shifting operations, and for subsequently causing said shifting bar to move the magazine carrier a distance to deliver the required font of types into operative position with reference to said type carriers, means being provided for releasing said ejector actuators to allow of the returning of said ejector to normal rest position and to allow of the relocking of the magazine carrier upon the shifting of said required font into said operative position, to allow of the movement of said required font of types onto said type carriers and for maintaining said carrier in such operative position, said locking means being adapted to maintain said shifting bar in said operative position against the action of mechanical means tending to maintain said bar in normal rest position, said ejector being rendered irresponsive to the retracting operations of its actuating means.

87. In a typewriting machine, a machine frame, a magazine carrier, a type magazine movably mounted in said carrier, said carrier being movably mounted in the machine frame, type holders fixedly mounted in said type magazine, said holders being arranged to hold removable types, one on each holder, said types being arranged in fonts or sets in said magazine, a plurality of type carriers adapted to hold interchangeable types and to move said types successively into a common position to allow of the printing operations, a shifting bar operably connected with said magazine carrier, a spring for maintaining said shifting bar in normal rest position, said shifting bar being adapted to maintain said magazine carrier in normal rest position, a normal font of types normally removed from the magazine and occupying operative positions on said carriers with the types on the carriers in alinement with their respective holders in the magazine, transient fonts of types arranged to be delivered into operative position on said type carriers by the operation of said shifting bar, an ejector, ejector actuators in operative connection with said ejector, one actuator to each type font, key levers—one to each type font, each key lever being operably connected with a corresponding ejector actuator, the key levers corresponding to said transient type fonts being further operably connected with said shifting bar, the key lever corresponding to the normal font not being operably connected with said shifting bar, and finger keys for actuating their corresponding key levers for the purposes substantially set forth herein, depression of the finger key corresponding to the normal font when said normal font is in operative use, causing its corresponding key lever to operate the corresponding ejector actuator for moving said ejector in a direction for removing the types from the type carriers and delivering them into their corresponding positions in the magazine and also for unlocking of said magazine carrier to allow of the removal of the magazine from the carrier without exerting any operative effect on the carrier, depression of said finger key with one of the transient fonts in use, causing first the returning of the transient font of types into said magazine and the unlocking of the carrier from its detents to allow of the returning of said carrier to normal rest position under the impulse of the retracting operation of the shifting bar which had been locked in operative position by said detents, depression of one of the finger keys controlling a corresponding transient font of types when said normal font is in operative use causing first the ejection of said normal font from said carriers into said magazine and unlocking of the magazine carrier to allow of the shifting operation, and subsequently to cause said shifting bar to move said carrier to a position for delivering the corresponding transient font into operative position when said ejector is released and returns to normal rest position to allow of the movement of said transient font onto the type carriers and further allows of the locking of said magazine carrier, depression of the finger key controlling another font of transient types with said other font of transient types in operative use causing the removal of said other font of transient types from said carriers into said magazine and the unlocking of said magazine carrier, and subsequently thereto causing the shifting bar to return said carrier to normal rest position under the impulse of its spring and finally to actuate said shifting bar for moving the required font of transient types into operative position with reference to said carriers, means being provided for releasing said ejector to allow of the movement of said transient font onto said type carriers and for locking said magazine in such operative position and maintaining thereby said shifting bar in its operative position.

88. In a typewriting machine, a type magazine having a plurality of type fonts, type carriers adapted to move into operative position, means controlled by an operator for moving said type magazine into a plurality of operative positions corresponding to each type font in the magazine, for the delivering of any of said type fonts into an operative position with reference to said type carriers to allow of the movement of said font of types into operative position on said carriers, means being provided for returning said font of types in use to said magazine and interchanging therefor another font of types, as substantially set forth.

89. In a typewriting machine, a main operating lever, said lever being one of a plurality of such levers, a detent cooperating with said lever for the maintaining of said lever in normal rest position, a key lever arranged to actuate said detent, said detent also cooperating with said key lever for maintaining said key lever in normal rest position, printing intrumentalities, a universal retracting mechanism, and a finger key forcing said key lever to actuate said detent for releasing said main operating lever, a spring normally held under tension for impelling said lever in a direction actuating said printing instrumentalities and performing the printing operations, and said retracting device for returning said main operating lever to normal rest position and into engagement with said detent and for placing said spring again under tension, the said retracting device being arranged to return to normal rest position upon the delivering of said operating lever into said normal rest position, the said spring being adapted to reoperate said operating lever a desired number of consecutive times and for therefor performing a desired number of consecutive printing operations, if upon the returning of the operating lever by said retracting means to normal rest position the said lever is not delivered into engagement with its detent.

90. In a typewriting machine, printing instrumentalities, power operated means controllable from a keyboard for actuating said printing instrumentalities, and automatic means independent of the operator for returning said power operated means and the printing instrumentalities to normal rest position against the action of said power means, said power means being adapted to repeat the consecutive printing of a character without the necessity of repeating the operations of the corresponding finger key, the mere depression of said finger key and maintaining said key in such position being sufficient to cause said consecutive printing operations, the said operations ceasing upon the releasing of said finger key.

91. In a typewriting machine, printing instrumentalities, power means for actuating said printing instrumentalities, a finger key for releasing said power means to allow of the printing operations, and retracting means for automatically returning said printing instrumentalities to normal rest position and for placing said power means under tension, said power means being arranged to repeat the consecutive printing of the corresponding character when the continued depression of said finger key prevents the re-engagement of said power means with its maintaining means, the consecutive printing of said character being performed a desired number of times by maintaining said finger key in operative position the required length of time.

92. In a typewriting machine, a main operating lever, said lever being one of a plurality of levers, a detent cooperating with said lever for maintaining said lever in normal rest position, manually operable means for releasing said lever to allow of the printing operations, a type carrier holding removable type, said type carrier being one of a plurality of such carriers, a bell lever in loose operative connection therewith, a lever in loose operative connection with said bell lever, a link operably connecting said lever with said main operating lever, impression mechanism, and a spring for impelling said main operating lever in a direction for causing said bell lever to reciprocate the type carrier into a position for delivering its type to said impression mechanism for performing the printing operations, stops being provided for restricting the movement of said bell lever and said type carrier in their operative positions and the reverse direction, said stops tending to deaden the noise of impact of said elements.

93. In a typewriting machine, a main operating lever, said operating lever being one of a plurality of such levers, a detent cooperating with said main operating lever for maintaining said lever in normal rest position, a series of types movable to a common point, manually operable means for releasing said lever to allow of the printing operations, a spring for impelling said lever in a direction for performing the printing operations, an inking control lever, a detent cooperating therewith for maintaining said inking control lever in normal rest position, an inking device, a spring for operating said inking control lever, a universal operating bar adapted to release said inking control lever, said main operating lever being adapted to actuate said universal operating bar for releasing said inking control lever to allow its spring to cause the operation of said inking device for the performing of the inking operations and ink the types as they severally approach the printing position, a retracting mechanism cooperating with said inking control lever for the returning of said lever to normal rest position, and a universal retracting bar adapted to be actuated by said retracting mechanism for the returning of said main operating lever to normal rest position, said retracting operations occurring during the intermittent movements of the carriage and under the impulse of the power means for moving said carriage.

Signed at New York this 12th day of November, 1920.

ALEXANDER BLOCK.

Witnesses:
  EDITH BLOCK,
  ALBERT BLOCK.